US007425005B2

(12) United States Patent
Smith et al.

(10) Patent No.: US 7,425,005 B2
(45) Date of Patent: Sep. 16, 2008

(54) SUSPENSIONS FOR LOW FLOOR VEHICLES

(75) Inventors: Earl Dallas Smith, Roachdale, IN (US); Judson Smith, Greencastle, IN (US)

(73) Assignee: Aloha, LLC, Indianapolis, IN (US)

( * ) Notice: Subject to any disclaimer, the term of this patent is extended or adjusted under 35 U.S.C. 154(b) by 97 days.

(21) Appl. No.: 11/409,614

(22) Filed: Apr. 24, 2006

(65) Prior Publication Data
US 2006/0237941 A1 Oct. 26, 2006

Related U.S. Application Data

(63) Continuation of application No. PCT/US2004/035218, filed on Oct. 25, 2004.

(60) Provisional application No. 60/613,664, filed on Sep. 28, 2004, provisional application No. 60/519,353, filed on Nov. 11, 2003, provisional application No. 60/514,290, filed on Oct. 24, 2003.

(51) Int. Cl.
*B60G 3/20* (2006.01)

(52) U.S. Cl. .................. 280/124.111; 280/124.135; 280/124.136; 280/124.141; 280/124.151; 280/124.157

(58) Field of Classification Search .......... 280/124.125, 280/124.134, 124.135, 124.136, 124.141, 280/124.111, 124.11, 124.157, 124.151, 280/93.512
See application file for complete search history.

(56) References Cited

U.S. PATENT DOCUMENTS 0,496,663 A 5/1893 Miller 0,844,615 A 2/1907 Palmer (Continued)

FOREIGN PATENT DOCUMENTS

BE 623587 10/1962

(Continued)

OTHER PUBLICATIONS

Chondros, T.G. et al.; Vehicle Dynamics Simulation and Suspension System Design; SAE Technical Paper Series, International Congress & Exposition, Detroit, MI Feb. 24-27, 1997.

(Continued)

*Primary Examiner*—Ruth Ilan
(74) *Attorney, Agent, or Firm*—John V. Daniluck; Bingham McHale, LLP

(57) ABSTRACT

A low profile chassis and suspension system for a road vehicle. The chassis supports a payload section or cargo compartment, such as for a delivery truck, ambulance, or shuttle bus. The chassis includes a largely planar frame having a top surface which is located beneath the rotational axes of the rear wheels. The wheel suspension system is particularly compact and close to the road surface. In some embodiments each wheel is suspended from the vehicle by a pair of pivotal support arms. Preferably, one arm is located above the other arm, and both arms pivot along pivot axes that are generally perpendicular to the rotational axis of the supported wheel. A spring urges one of the arms apart from the frame. In other embodiments, the spring is placed beneath the rotational axis of the wheel. In some embodiments both of the pivoting support arms are located beneath the rotational axis of the wheel.

28 Claims, 74 Drawing Sheets

U.S. PATENT DOCUMENTS

| | | |
|---|---|---|
| 0,889,960 A | 6/1908 | Palmer |
| 1,128,770 A | 2/1915 | Gilliland |
| 1,165,784 A | 12/1915 | Klingelsmith |
| 1,244,783 A | 10/1917 | Ruckes |
| 1,833,053 A | 11/1931 | McManus |
| 1,857,249 A | 5/1932 | Marcum |
| 1,902,712 A | 3/1933 | Leipert |
| 1,930,208 A | 10/1933 | Marcum |
| 1,940,914 A | 12/1933 | Marcum |
| 1,981,593 A | 11/1934 | Fageol |
| 2,001,846 A | 5/1935 | Ledwinka |
| 2,002,377 A | 5/1935 | Mayne |
| 2,009,963 A | 7/1935 | Matthaei |
| 2,024,148 A | 12/1935 | Dahl |
| 2,050,693 A | 8/1936 | Favary |
| 2,060,015 A | 11/1936 | Barnes et al. |
| 2,062,233 A | 11/1936 | Poirier |
| 2,069,399 A | 2/1937 | White |
| 2,072,044 A | 2/1937 | Widman |
| 2,085,662 A | 6/1937 | Johnson |
| 2,097,309 A | 10/1937 | Sanders, Jr. |
| 2,110,819 A | 3/1938 | Poirier |
| 2,121,862 A | 6/1938 | Dodge |
| 2,127,618 A | 8/1938 | Riemenschneider |
| 2,172,173 A | 9/1939 | Peterman |
| 2,173,515 A | 9/1939 | Eklund |
| 2,175,562 A | 10/1939 | Frohlich |
| 2,194,199 A | 3/1940 | Ash |
| 2,194,323 A | 3/1940 | Peterman |
| 2,194,964 A | 3/1940 | Wilson |
| 2,205,723 A | 6/1940 | Hansen |
| 2,208,601 A | 7/1940 | Ronning |
| 2,212,453 A | 8/1940 | Perkins |
| 2,217,817 A | 10/1940 | Ronning |
| 2,226,100 A | 12/1940 | Larison |
| 2,227,762 A | 1/1941 | Ronning |
| 2,236,695 A | 4/1941 | Peterman |
| 2,239,849 A | 4/1941 | Judd |
| 2,240,022 A | 4/1941 | Saives |
| 2,253,217 A | 8/1941 | Wenthe |
| 2,254,552 A | 9/1941 | Tjaarda |
| 2,270,022 A | 1/1942 | Price |
| 2,277,615 A | 3/1942 | Townsend |
| 2,286,609 A | 6/1942 | Ledwinka |
| 2,297,465 A | 9/1942 | Froehlich |
| 2,308,969 A | 1/1943 | Rissing |
| 2,336,814 A | 12/1943 | Suter |
| 2,349,289 A | 5/1944 | Larison |
| 2,386,988 A | 10/1945 | Sullivan |
| 2,395,640 A | 2/1946 | Pearson |
| 2,411,885 A | 12/1946 | Lanson |
| 2,453,388 A | 11/1948 | Schramm |
| 2,455,429 A * | 12/1948 | Lucien .................. 296/178 |
| 2,457,567 A | 12/1948 | Kuns |
| 2,465,098 A | 3/1949 | Inskeep |
| 2,490,311 A | 12/1949 | Levesque du Rostu |
| 2,497,072 A | 2/1950 | Cooper |
| 2,507,980 A | 5/1950 | Knapp |
| 2,540,279 A | 2/1951 | Mosier |
| 2,554,261 A | 5/1951 | Munger |
| 2,566,393 A | 9/1951 | Wolfe |
| 2,575,065 A | 11/1951 | Merry |
| 2,576,824 A | 11/1951 | Bush |
| 2,597,122 A | 5/1952 | Mullen et al. |
| 2,607,431 A | 8/1952 | Buckendale |
| 2,609,212 A | 9/1952 | McMurtrie |
| 2,609,217 A | 9/1952 | Hess |
| 2,612,387 A | 9/1952 | Ronning |
| 2,621,942 A | 12/1952 | Getz |
| 2,631,842 A | 3/1953 | Oppenlander et al. |
| 2,632,655 A | 3/1953 | King et al. |
| 2,641,464 A | 6/1953 | Linn |
| 2,684,237 A | 7/1954 | Kayler |
| 2,706,009 A | 4/1955 | Schramm |
| 2,706,113 A | 4/1955 | Hickman |
| 2,730,375 A | 1/1956 | Reimspiess et al. |
| 2,740,640 A | 4/1956 | Schaefer |
| 2,760,787 A | 8/1956 | Muller |
| 2,779,602 A | 1/1957 | Kimbro et al. |
| 2,794,650 A | 6/1957 | Schilberg |
| 2,806,710 A | 9/1957 | Mascaro |
| 2,807,381 A | 9/1957 | Tegeler |
| 2,822,100 A | 2/1958 | Pesta |
| 2,822,186 A | 2/1958 | Lires |
| 2,825,578 A | 3/1958 | Walker |
| 2,861,811 A | 11/1958 | Lassen |
| 2,862,635 A | 12/1958 | Christenson et al. |
| 2,862,724 A | 12/1958 | Stover |
| 2,865,031 A | 12/1958 | Maloney |
| 2,870,928 A | 1/1959 | Haggard et al. |
| 2,876,466 A | 3/1959 | Baldwin |
| 2,876,922 A | 3/1959 | Holiday |
| 2,877,010 A | 3/1959 | Gouirand |
| 2,892,634 A | 6/1959 | Leroy |
| 2,914,339 A | 11/1959 | Gouirand |
| 2,916,296 A | 12/1959 | Muller |
| 2,964,331 A | 12/1960 | Sherman |
| 2,977,132 A | 3/1961 | Bainbridge |
| 2,988,374 A | 6/1961 | Boyles |
| 3,031,203 A | 4/1962 | Christenson et al. |
| 3,054,636 A | 9/1962 | Wessells |
| 3,063,737 A | 12/1962 | Coughran |
| 3,078,104 A | 2/1963 | Chalmers |
| 3,096,085 A | 7/1963 | Owens |
| 3,108,836 A | 10/1963 | Deckert |
| 3,113,686 A | 12/1963 | Sundin |
| 3,130,688 A | 4/1964 | Gutridge et al. |
| 3,140,880 A | 7/1964 | Masser |
| 3,147,023 A | 9/1964 | Raymo |
| 3,149,856 A | 9/1964 | Schlberg |
| 3,171,669 A | 3/1965 | Barenyi |
| 3,180,510 A | 4/1965 | Moller |
| 3,181,877 A | 5/1965 | McHenry |
| 3,201,142 A | 8/1965 | Dangauthier |
| 3,210,047 A | 10/1965 | Jackson |
| 3,214,047 A | 10/1965 | Moye |
| 3,246,884 A | 4/1966 | Prichard et al. |
| 3,254,899 A | 6/1966 | Voorhies |
| 3,271,046 A | 9/1966 | Evans et al. |
| 3,271,077 A | 9/1966 | Timmer et al. |
| 3,277,975 A | 10/1966 | Van Winsen |
| 3,282,603 A | 11/1966 | Barth |
| 3,314,685 A * | 4/1967 | Bothwell ................. 280/6.151 |
| 3,331,627 A | 7/1967 | Schoder |
| 3,332,701 A | 7/1967 | Masser |
| 3,345,104 A | 10/1967 | Ulicki |
| 3,356,386 A | 12/1967 | Taylor |
| 3,361,443 A | 1/1968 | Wolf |
| 3,384,384 A | 5/1968 | Diehl |
| 3,405,778 A | 10/1968 | Martin |
| 3,473,821 A | 10/1969 | Barenyi et al. |
| 3,477,738 A * | 11/1969 | Manning .................. 280/86.5 |
| 3,534,977 A | 10/1970 | Wessel |
| 3,563,596 A | 2/1971 | Davis |
| 3,573,882 A | 4/1971 | Van Winsen |
| 3,578,352 A | 5/1971 | Heine |
| 3,601,424 A | 8/1971 | Badland |
| 3,601,426 A | 8/1971 | Hury |
| 3,610,653 A | 10/1971 | Derrwaldt et al. |
| 3,661,419 A | 5/1972 | Mitamura et al. |
| 3,662,647 A | 5/1972 | King |
| 3,672,698 A | 6/1972 | Froumajou |
| 3,685,853 A | 8/1972 | Goldsmith |
| 3,689,103 A | 9/1972 | Meulendyk |

| | | | | | |
|---|---|---|---|---|---|
| 3,704,029 A | 11/1972 | Bailleux | 4,465,298 A | 8/1984 | Raidel, Sr. |
| 3,704,898 A | 12/1972 | Buelow | 4,468,739 A | 8/1984 | Woods et al. |
| 3,713,665 A | 1/1973 | Gouirand | 4,470,615 A | 9/1984 | Scheuerle |
| 3,736,002 A | 5/1973 | Grosseau | 4,473,238 A | 9/1984 | Antoine |
| 3,737,173 A | 6/1973 | Boissier et al. | 4,483,546 A | 11/1984 | Brearley |
| 3,746,383 A | 7/1973 | Borns | 4,488,736 A | 12/1984 | Aubry et al. |
| 3,751,061 A | 8/1973 | Scheuerpflug | 4,509,790 A | 4/1985 | Nagamoto et al. |
| 3,752,493 A | 8/1973 | McWhorter | 4,527,486 A | 7/1985 | Baird et al. |
| 3,752,496 A | 8/1973 | Meinecke, Jr. | 4,530,515 A | 7/1985 | Raidel |
| 3,763,950 A | 10/1973 | Rockwell | 4,541,653 A | 9/1985 | Raidel |
| 3,773,348 A | 11/1973 | Davis | 4,558,886 A | 12/1985 | Straub |
| 3,778,082 A | 12/1973 | Grosseau | 4,580,798 A | 4/1986 | Roelofs |
| 3,779,576 A | 12/1973 | Malcolm | 4,580,808 A | 4/1986 | Smith-Williams |
| 3,781,032 A | 12/1973 | Jones | 4,593,930 A | 6/1986 | Davis |
| 3,784,218 A | 1/1974 | Stone | 4,596,304 A | 6/1986 | Teshima |
| 3,788,683 A | 1/1974 | Rumell | 4,615,539 A | 10/1986 | Pierce |
| 3,794,343 A | 2/1974 | Hickman | 4,619,578 A | 10/1986 | Routledge |
| 3,797,850 A | 3/1974 | Stout et al. | 4,623,162 A | 11/1986 | Weitzenhof et al. |
| 3,807,752 A | 4/1974 | Mauck | 4,630,840 A | 12/1986 | Masuda et al. |
| 3,811,697 A | 5/1974 | Armstrong | 4,666,181 A | 5/1987 | Wegner |
| 3,820,813 A | 6/1974 | Moulton et al. | 4,671,525 A | 6/1987 | Ribi |
| 3,822,908 A | 7/1974 | Gouirand | 4,673,328 A | 6/1987 | Shiels |
| 3,829,118 A | 8/1974 | Gouirand | 4,674,770 A | 6/1987 | Inagaki |
| 3,831,210 A | 8/1974 | Ow | 4,677,263 A | 6/1987 | Hamilton et al. |
| 3,866,935 A | 2/1975 | Nelson | 4,685,858 A | 8/1987 | Manning et al. |
| 3,868,129 A | 2/1975 | Grosseau | 4,705,133 A | 11/1987 | Christenson et al. |
| 3,873,120 A | 3/1975 | Lecomte et al. | 4,708,361 A | 11/1987 | Takada et al. |
| 3,880,445 A | 4/1975 | Chieger | 4,718,692 A | 1/1988 | Raidel |
| 3,884,502 A | 5/1975 | Wagner | 4,725,074 A | 2/1988 | Stevens |
| 3,891,231 A | 6/1975 | Snoberger | RE32,647 E | 4/1988 | Wilson |
| 3,900,119 A | 8/1975 | Olsen | 4,736,958 A | 4/1988 | Armstrong |
| 3,904,219 A | 9/1975 | Guerriero | 4,752,177 A | 6/1988 | Zenna |
| 3,918,739 A | 11/1975 | Kirkland | 4,759,567 A | 7/1988 | Allen |
| 3,944,248 A | 3/1976 | Herrman | 4,762,421 A | 8/1988 | Christenson et al. |
| 3,961,826 A | 6/1976 | Sweet et al. | 4,763,953 A | 8/1988 | Chalin |
| 3,966,223 A | 6/1976 | Carr | 4,811,972 A | 3/1989 | Wiley, Jr. |
| 3,974,926 A | 8/1976 | Kopaska | 4,856,839 A | 8/1989 | Scott et al. |
| 3,992,027 A | 11/1976 | Legueu | 4,878,691 A | 11/1989 | Cooper et al. |
| 4,008,902 A | 2/1977 | Dill | 4,898,508 A | 2/1990 | Hayata |
| 4,032,167 A | 6/1977 | Chereda | 4,903,209 A | 2/1990 | Kaneko |
| 4,039,037 A | 8/1977 | Vin | 4,915,577 A | 4/1990 | Fraser |
| 4,040,640 A | 8/1977 | Begg | D307,732 S | 5/1990 | Level |
| 4,047,736 A | 9/1977 | Prive | 4,930,806 A | 6/1990 | Walker, Jr. |
| 4,058,325 A | 11/1977 | Schramm | 4,934,733 A | 6/1990 | Smith |
| 4,060,145 A | 11/1977 | Kingman et al. | 4,946,189 A | 8/1990 | Manning |
| 4,061,353 A | 12/1977 | Kingman et al. | 4,950,031 A | 8/1990 | Mizunaga et al. |
| 4,063,611 A | 12/1977 | Anderson | 4,989,894 A * | 2/1991 | Winsor et al. ......... 280/124.109 |
| 4,063,745 A | 12/1977 | Olson | 5,015,004 A | 5/1991 | Mitchell |
| 4,063,779 A | 12/1977 | Martin et al. | 5,016,912 A | 5/1991 | Smith |
| 4,065,153 A | 12/1977 | Pringle | 5,035,462 A | 7/1991 | Page et al. |
| 4,085,945 A | 4/1978 | Bicht et al. | 5,050,897 A | 9/1991 | Stromberg |
| 4,089,384 A | 5/1978 | Ehrenberg | 5,052,713 A | 10/1991 | Corey et al. |
| 4,095,818 A | 6/1978 | Smith | 5,083,812 A | 1/1992 | Wallace et al. |
| 4,114,712 A | 9/1978 | Finta | 5,090,495 A | 2/1992 | Christenson |
| 4,131,209 A | 12/1978 | Manning | 5,094,314 A | 3/1992 | Hayata |
| 4,155,570 A | 5/1979 | Wiley, Jr. | 5,114,183 A | 5/1992 | Haluda et al. |
| 4,166,640 A | 9/1979 | Van Denberg | 5,149,132 A | 9/1992 | Ruehl et al. |
| 4,168,075 A | 9/1979 | Matschinsky | 5,174,628 A | 12/1992 | Hayatsugu et al. |
| 4,171,830 A | 10/1979 | Metz | 5,178,432 A | 1/1993 | Zeman et al. |
| 4,202,564 A | 5/1980 | Strader | 5,195,771 A | 3/1993 | Eckert |
| 4,230,341 A | 10/1980 | Hart et al. | 5,261,330 A | 11/1993 | Veit-Salomon et al. |
| 4,231,144 A | 11/1980 | Bernacchia, Jr. | 5,275,430 A | 1/1994 | Smith |
| 4,248,455 A | 2/1981 | Manning | 5,303,946 A | 4/1994 | Youmans et al. |
| 4,252,340 A | 2/1981 | Egging | 5,308,115 A | 5/1994 | Ruehl et al. |
| 4,261,591 A | 4/1981 | Warne, Jr. | 5,332,258 A | 7/1994 | Buttner |
| 4,273,357 A | 6/1981 | Rashkow | 5,342,106 A | 8/1994 | Fischer |
| 4,280,710 A | 7/1981 | Rogge | 5,362,121 A | 11/1994 | Enning et al. |
| 4,302,022 A | 11/1981 | Schoeffler et al. | 5,364,128 A | 11/1994 | Ide |
| 4,339,224 A | 7/1982 | Lamb | 5,366,237 A | 11/1994 | Dilling et al. |
| 4,343,506 A | 8/1982 | Saltzman | 5,375,880 A | 12/1994 | Fleener et al. |
| 4,422,667 A | 12/1983 | Perry | 5,378,010 A | 1/1995 | Marino et al. |
| 4,427,213 A | 1/1984 | Raidel, Jr. | 5,379,842 A | 1/1995 | Terry |
| 4,434,998 A | 3/1984 | Kaltwasser | 5,380,029 A | 1/1995 | Portilla |

| | | |
|---|---|---|
| 5,391,041 A | 2/1995 | Stanbury et al. |
| 5,409,069 A | 4/1995 | Hake |
| 5,413,368 A | 5/1995 | Pong et al. |
| 5,415,107 A | 5/1995 | Tutzauer |
| 5,433,287 A | 7/1995 | Szalai et al. |
| 5,443,283 A | 8/1995 | Hawkins et al. |
| 5,476,303 A | 12/1995 | Sakamoto et al. |
| 5,505,278 A | 4/1996 | Smith |
| 5,505,482 A | 4/1996 | VanDenberg |
| 5,540,454 A | 7/1996 | VanDenberg et al. |
| 5,560,639 A | 10/1996 | Nowell et al. |
| 5,577,793 A | 11/1996 | Kobasic |
| D376,564 S | 12/1996 | Mishoe |
| 5,597,174 A | 1/1997 | Christenson et al. |
| 5,618,151 A | 4/1997 | Rosenkranz |
| 5,632,508 A | 5/1997 | Jacobs et al. |
| 5,673,929 A | 10/1997 | Alatalo |
| 5,676,515 A | 10/1997 | Haustein |
| 5,683,098 A | 11/1997 | VanDenberg |
| 5,690,353 A | 11/1997 | Vandenberg |
| 5,713,424 A | 2/1998 | Christenson |
| 5,718,443 A | 2/1998 | St. Onge |
| 5,718,445 A | 2/1998 | VanDenberg |
| 5,720,489 A | 2/1998 | Pierce et al. |
| 5,739,787 A | 4/1998 | Burke et al. |
| 5,746,441 A | 5/1998 | VanDenberg |
| 5,758,896 A | 6/1998 | Cruise |
| 5,788,263 A | 8/1998 | VanDenberg |
| 5,791,681 A | 8/1998 | VanDenberg |
| 5,810,544 A | 9/1998 | Wellman |
| 5,820,149 A | 10/1998 | Sobina |
| 5,820,156 A | 10/1998 | VanDenberg |
| 5,836,597 A | 11/1998 | Schlosser et al. |
| 5,839,750 A | 11/1998 | Smith |
| 5,845,919 A | 12/1998 | VanDenberg |
| 5,853,183 A | 12/1998 | VanDenberg |
| 5,860,661 A | 1/1999 | Boucher et al. |
| 5,863,049 A | 1/1999 | Mahvi |
| 5,868,418 A | 2/1999 | VanDenberg |
| 5,881,458 A | 3/1999 | Wolf et al. |
| 5,882,031 A | 3/1999 | VanDenberg |
| 5,887,880 A | 3/1999 | Mullican et al. |
| 5,908,198 A | 6/1999 | VanDenberg |
| 5,915,705 A | 6/1999 | VanDenberg |
| 5,921,568 A | 7/1999 | Cruise et al. |
| 5,937,963 A | 8/1999 | Urbanczyk |
| 5,944,339 A | 8/1999 | McKenzie et al. |
| 5,947,550 A | 9/1999 | Mehren et al. |
| 5,951,097 A | 9/1999 | Esposito et al. |
| D417,172 S | 11/1999 | Smith et al. |
| 5,988,672 A | 11/1999 | VanDenberg |
| 6,050,586 A | 4/2000 | Wilson |
| 6,068,276 A | 5/2000 | Kallstrom |
| 6,073,946 A | 6/2000 | Richardson |
| 6,113,180 A | 9/2000 | Corporon et al. |
| 6,123,347 A | 9/2000 | Christenson |
| 6,142,496 A | 11/2000 | Bartel |
| D434,701 S | 12/2000 | Patmont |
| 6,158,750 A | 12/2000 | Gideon et al. |
| D436,058 S | 1/2001 | Demers et al. |
| 6,170,875 B1 | 1/2001 | Jones et al. |
| 6,186,733 B1 | 2/2001 | Lewis et al. |
| 6,189,901 B1 | 2/2001 | Smith et al. |
| 6,209,205 B1 | 4/2001 | Rumpel et al. |
| 6,213,507 B1 | 4/2001 | Ramsey et al. |
| 6,234,502 B1 | 5/2001 | Sobina |
| 6,237,926 B1 | 5/2001 | Pritchard et al. |
| 6,249,948 B1 | 6/2001 | Casso |
| 6,299,240 B1 | 10/2001 | Schroeder et al. |
| 6,312,205 B1 | 11/2001 | Vandenberg |
| 6,364,048 B1 | 4/2002 | McComber |
| 6,371,227 B2 | 4/2002 | Bartlett |
| 6,390,537 B1 | 5/2002 | DiGonis |
| 6,398,251 B1 | 6/2002 | Smith |
| 6,416,136 B1 | 7/2002 | Smith |
| 6,428,026 B1 | 8/2002 | Smith |
| 6,439,131 B1 | 8/2002 | Higgins |
| 6,488,299 B2 | 12/2002 | Kim |
| 6,494,285 B1 | 12/2002 | Williams |
| 6,511,078 B2 | 1/2003 | Sebe |
| 6,520,521 B2 | 2/2003 | Mayfield |
| D473,504 S | 4/2003 | Harbin |
| 6,575,485 B2 | 6/2003 | Durrin |
| 6,575,523 B2 | 6/2003 | Votruba et al. |
| 6,585,223 B1 | 7/2003 | VanDenberg |
| 6,588,778 B1 | 7/2003 | McLaughlin |
| 6,589,098 B2 | 7/2003 | Lee et al. |
| 6,669,303 B2 | 12/2003 | Dodd |
| D485,787 S | 1/2004 | Smith |
| 6,986,519 B2 | 1/2006 | Smith |
| 2002/0105170 A1 | 8/2002 | Smith |
| 2002/0153690 A1 * | 10/2002 | Varela ................ 280/124.151 |
| 2003/0001354 A1 | 1/2003 | Pavuk |
| 2003/0010561 A1 | 1/2003 | Bartel |
| 2003/0015848 A1 | 1/2003 | Pham et al. |
| 2003/0094780 A1 | 5/2003 | Cho |
| 2003/0098564 A1 | 5/2003 | VanDenberg et al. |
| 2003/0111834 A1 * | 6/2003 | Ledesma et al. ............ 280/788 |
| 2003/0111866 A1 | 6/2003 | Crean |
| 2003/0122340 A1 * | 7/2003 | Varela ................. 280/124.135 |
| 2003/0125858 A1 | 7/2003 | Lin et al. |
| 2003/0184038 A1 * | 10/2003 | Smith et al. .......... 280/124.151 |
| 2003/0209922 A1 * | 11/2003 | Emmons et al. ........ 296/203.01 |

FOREIGN PATENT DOCUMENTS

| | | |
|---|---|---|
| BE | 623587 | 4/1963 |
| CA | 2333364 | 12/1999 |
| CA | 2342680 A1 | 9/2002 |
| DE | 467309 | 10/1928 |
| DE | 654482 | 12/1937 |
| DE | 888217 | 8/1953 |
| DE | 893757 | 10/1953 |
| DE | 895254 | 11/1953 |
| DE | 1737686 | 1/1957 |
| DE | 1630664 | 7/1971 |
| DE | 3031353 A1 | 3/1982 |
| DE | 9006249.3 U1 | 10/1990 |
| DE | 4217261 A1 | 12/1993 |
| EP | 0162511 A1 | 11/1985 |
| EP | 0192511 A1 | 11/1985 |
| EP | 0464412 A1 | 1/1992 |
| EP | 0955187 A1 | 11/1999 |
| EP | 0 972 701 A1 * | 1/2000 |
| EP | 0997327 A2 | 5/2000 |
| EP | 0997327 A3 | 5/2000 |
| EP | 1216859 A2 | 6/2002 |
| EP | 0999973 B1 | 5/2003 |
| FR | 571499 | 5/1924 |
| FR | 778246 | 3/1935 |
| FR | 825427 | 2/1938 |
| FR | 1175011 | 3/1959 |
| FR | 1385600 | 12/1964 |
| FR | 2079967 | 11/1971 |
| FR | 2150398 | 4/1973 |
| FR | 2702956 A1 | 9/1994 |
| GB | 269409 | 4/1927 |
| GB | 353902 | 7/1931 |
| GB | 426703 | 4/1935 |
| GB | 461609 | 2/1937 |
| GB | 476619 | 12/1937 |
| GB | 628328 | 8/1949 |
| GB | 657466 | 9/1951 |
| GB | 692854 | 6/1953 |
| GB | 819223 | 9/1959 |
| GB | 881196 | 11/1961 |

| | | |
|---|---|---|
| GB | 1114753 | 5/1968 |
| GB | 2014914 A | 9/1979 |
| GB | 2207975 | 2/1989 |
| GB | 2290715 | 5/1989 |
| GB | 2276128 A | 9/1994 |
| JP | 5319262 | 12/1993 |
| JP | 9228833 A2 | 9/1997 |
| JP | 10076826 A2 | 3/1998 |
| JP | 111155182 A2 | 4/1999 |
| JP | 2001039350 A2 | 2/2001 |
| JP | 2001122153 A2 | 5/2001 |
| JP | 2001187525 A2 | 7/2001 |
| JP | 2002283998 A2 | 10/2002 |
| JP | 2002362125 A2 | 12/2002 |
| JP | 2002362408 A2 | 12/2002 |
| JP | 2002284003 A2 | 10/2003 |
| NL | 7612924 | 5/1978 |
| NL | 7805646 | 11/1979 |
| NL | 8401218 | 11/1985 |
| SU | 1213625 A | 9/1986 |
| WO | 9401988 A1 | 1/1994 |
| WO | 9401988 A2 | 1/1994 |
| WO | 9408806 A1 | 4/1994 |
| WO | 9712769 | 4/1997 |
| WO | 9744209 A1 | 11/1997 |
| WO | 9818640 | 5/1998 |
| WO | 0053442 A1 | 9/2000 |
| WO | 0128791 A1 | 4/2001 |
| WO | 02079020 A1 | 10/2002 |
| WO | 03039891 A1 | 5/2003 |
| WO | 03057517 A1 | 7/2003 |

OTHER PUBLICATIONS

Cole, david J.; Fundamental Issues in Suspension Design for Heavy Road Vehicles; Vehicle System Dynamics 2001, vol. 35, No. 4-5, pp. 319-360.

Crolla, D.A. et al.; Independent vs. Axle Suspension for On/Off Road Vehicles; SAE Technical Paper Series, International Off-Highway & Powerplant Congress & Exposition, Milwaukee, WI, Sep. 14-17, 1992.

Dana Corporation; Axles, Driveshafts, and Suspensions for Specialty Vehicles; Condensed Specifications (updated).

Dana Corporation; Axles, Transmission, Torque Converters, Electronics Controls, and Driveshafts for Off-Highway Vehicles; Condensed Specifications, 2002.

ElMadeny, M.M. et al.; Optimum Design of Tractor-Semitrailer Suspension Systems; SAE Paper #801419, 1980.

Glass, Jeffrey L.; Experimantal Evaluation of a Trailing-Arm Suspension for Heavy Trucks; Thesis submitted to the Faculty of Virginia Polytechnic Institute and State University, Blacksburg, VA, May 8, 2001.

Henry, O. Lee; Development of Air Suspension Systems for Highway Tractors and Trailers; SAE, National Combined Fuels and Lubricants and Transportation Meetings, Philadelphia, PA, Nov. 4-6, 1970.

Homtrich, Herbert; Rear Suspension Design with Front Wheel Drive Vehicles; SAE Technical Paper Series, International Congress and Exposition, Cobo Hall, Detroit, MI, Feb. 23-27, 1981.

Locke, W.S., Evolution of an Air Suspension System for Trucks; SAE, Automotive Engineering Congress, Detroit, MI, Jan. 10-14, 1972.

Michelena Nestor et al.; Design of an Advanced Heavy Tactical Trucks: A Target Cascading Case Study; SAE Technical Paper Series, International Truck and Bus Meeting and Exhibition, Chicago, IL, Nov. 12-14, 2001.

Mousseau, C.W. et al.; The effect of tyre and suspension dynamics on wheel spindle forces; Heavy Vehicle Systems, Int. J. of Vehicle Design, vol. 6, Nos. 1/4, 1999.

Transportation Research Board; Applicability of Low-Floor Light Rail Vehicles in North America; TCRP Report 2, 1995.

5 pages from website: www.jhuapl.edu/programs/trans/ANGV.htm; Johns Hopkins University Applied Physics Laboratory, ANGV Program.

4 pages from website: www.k12.nf.ca/gc/Staff/Teachers/Crummey/fiero/bumpsteer.htm; Fiero 2m4; The Bump Steer Story.

1 page from website: www.geocities.com/cesargrau/suspensionwebpage_trailing; showing a trailing arm rear suspension.

3 pages from website: www.fta.dot.gov/brt/guide/vehicle.html; BRT Reference Guide for Vehicle Design.

4 pages from website: www.geocities.com/gkura2001/CarTech/tech_suspension21.htm; Suspension Geometry- Independent Suspension, Trailing arm and Semi-trailing arm suspension.

2 pages from website: www.ukcar.com/features/tech/suspension/trailingarm.htm; UKCAR, Trailing arm and semi-trailing arm suspension.

Bosch Automotive Handbook, "Suspension linkage, " pages 620-623, 2000.

Milliken, William F.; Milliken, Douglas L., Race Car Vehicle Dynamics, "Independent Rear Suspensions," pp. 636-658, 1995.

Bastow, Donald; Howard, Geoffrey; and Whitehead, John P.; Car Suspension and Handling, 4th ed., Chapters 7 & 8, pp. 187-229, 1993.

Bosch Automotive Handbook, 5th ed., pp. 612-623, 2000.

Dixon, John C.; Tires, Suspension and Handling, 2nd ed., Chapter 4, pp. 181-224, 1996.

Gillespie, Thomas D.; Fundamentals of Vehicle Dynamics, Chapter 7, pp. 237-274, 1992.

Goodsell, Don; Dictionary of Automotive Engineering, 2nd ed., pp. 114, 115, 190, 191, 230, and 231, 1995.

Milliken, William F. and Milliken, Douglas L., Race Car Vehicle Dynamics, Chapter 17, pp. 607-663, 1995.

Stone, Richard and Ball, Jeffrey K.; Automotive Engineering Fundamentals; Chapter 8, pp. 345-396, 2004.

Truck and Bus Chassis Suspension, Stability and Handling, SP-1651, published by Society of Automotive Engineers, Inc., Nov. 2001.

Vehicle Dynamics, Braking, Steering and Suspensions; SP-1814, published by Society of Automotive Engineers, Inc., pp. 211-218, Nov. 2003.

www.daihatsu.com/news/n2002/02101101/, Diahatsu: News, Toyota, Hino, Diahatsu to Highlight Environmental Technologies, Universal Mobility and Logistics Systems at Tokyo Motor Show, 9 pages.

* cited by examiner

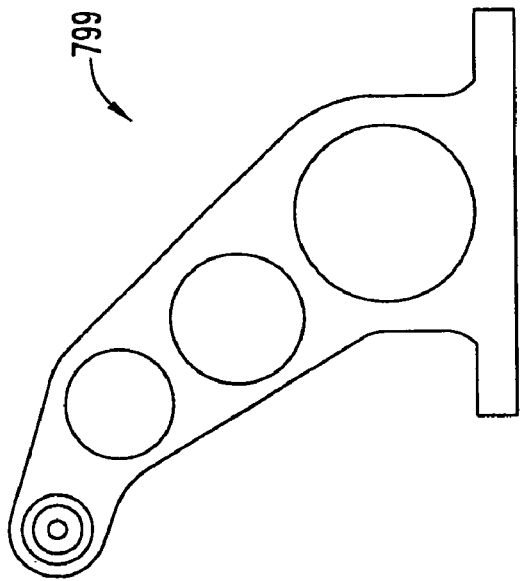
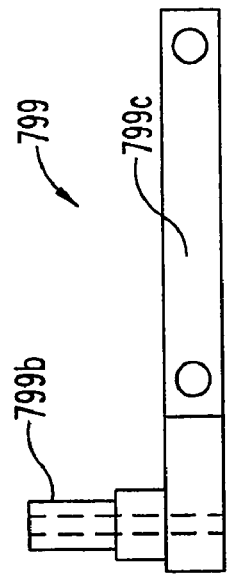
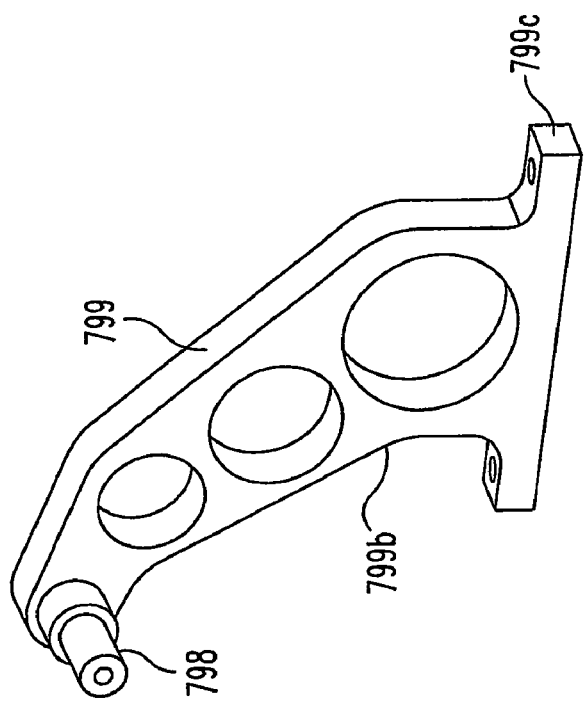
Fig. 36b
Fig. 36c
Fig. 36a

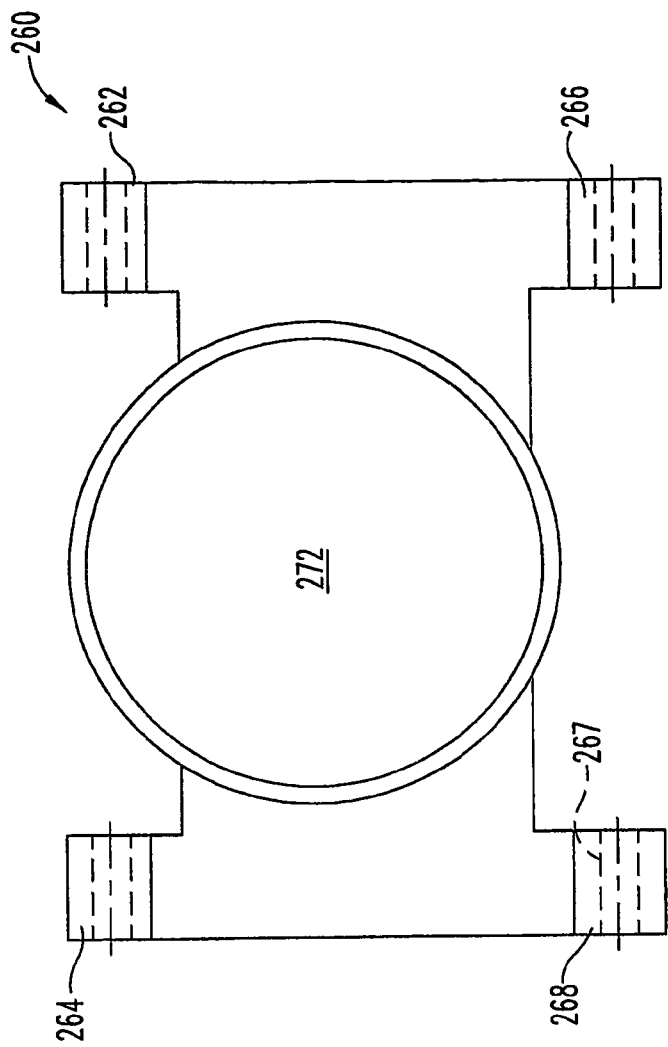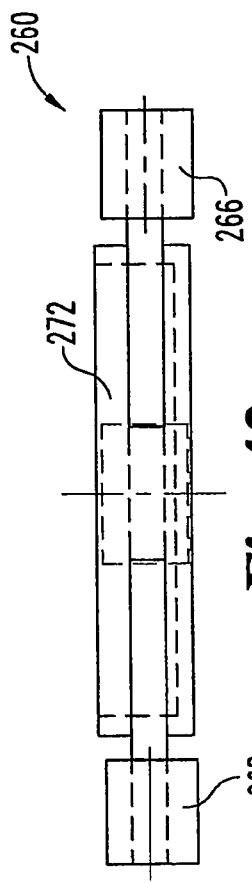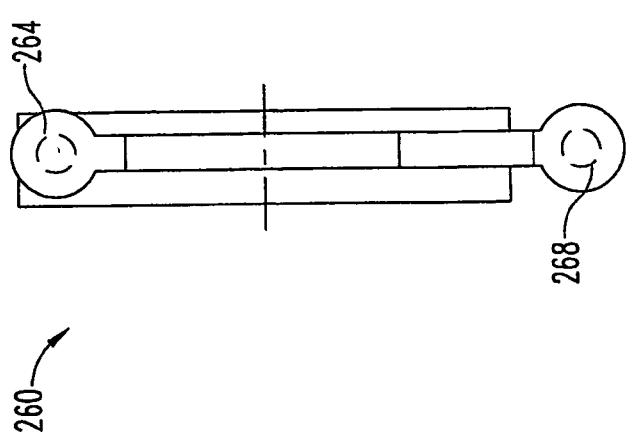
*Fig. 42b*
*Fig. 42c*
*Fig. 42a*

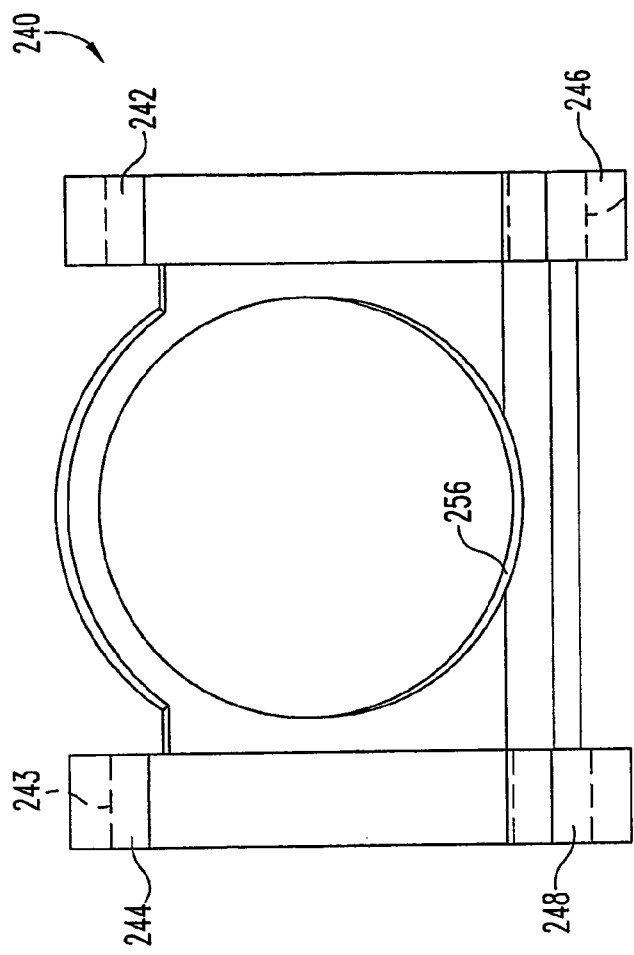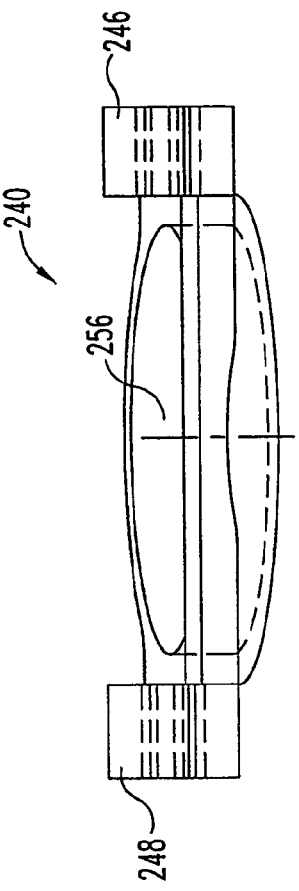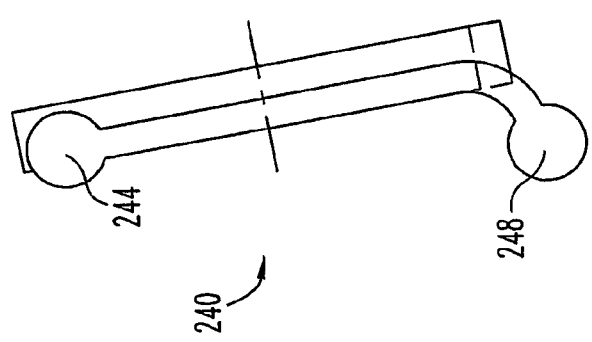

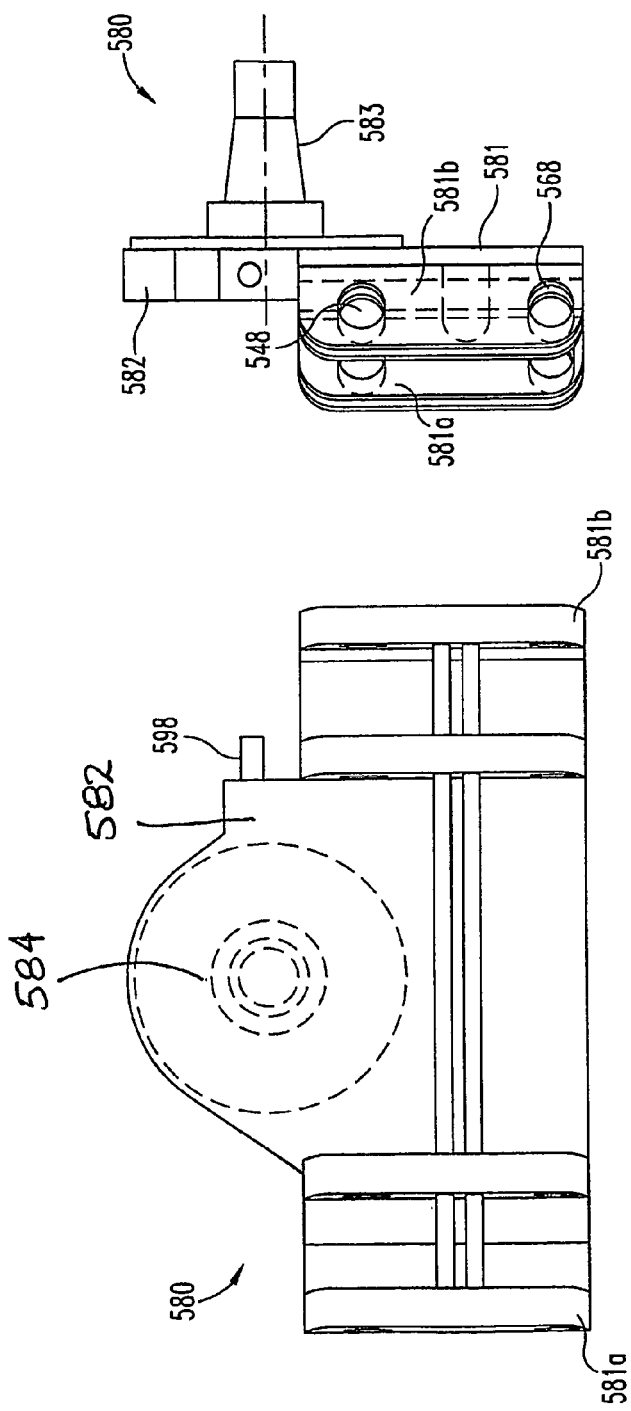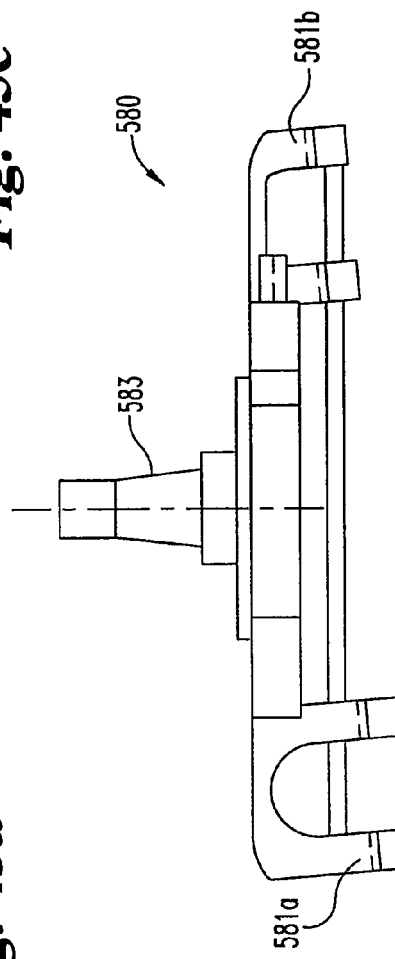

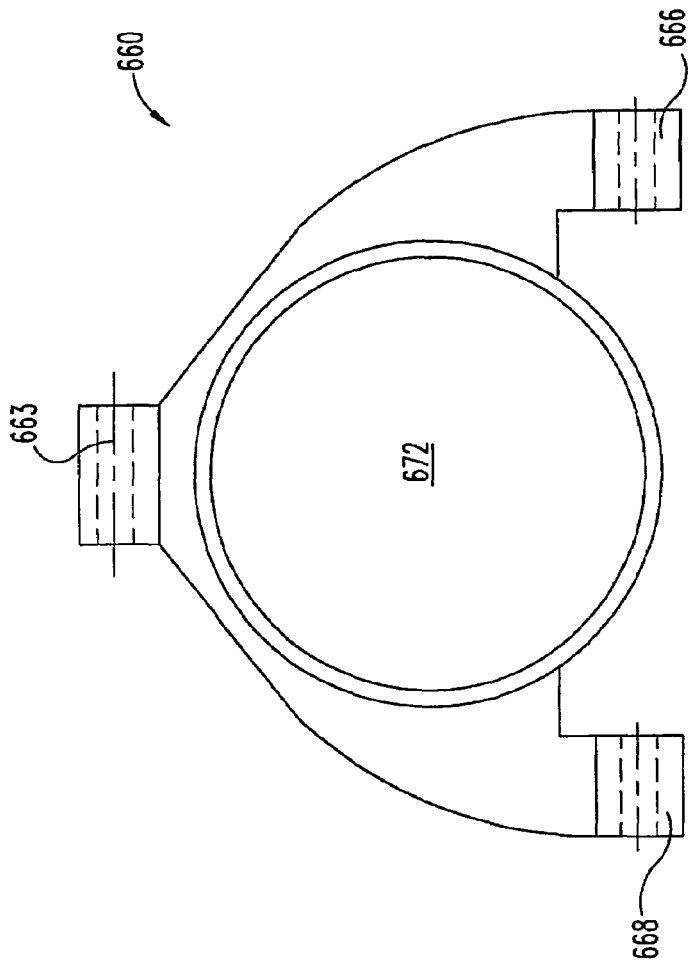
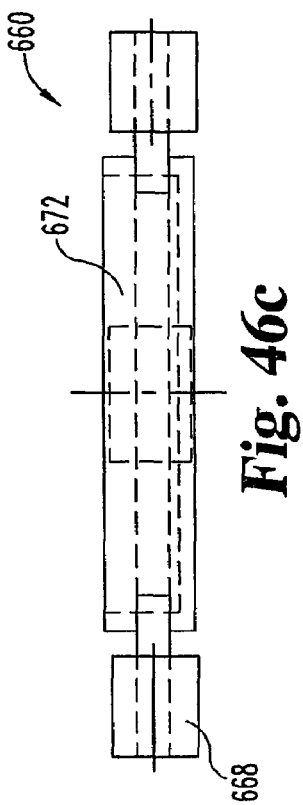
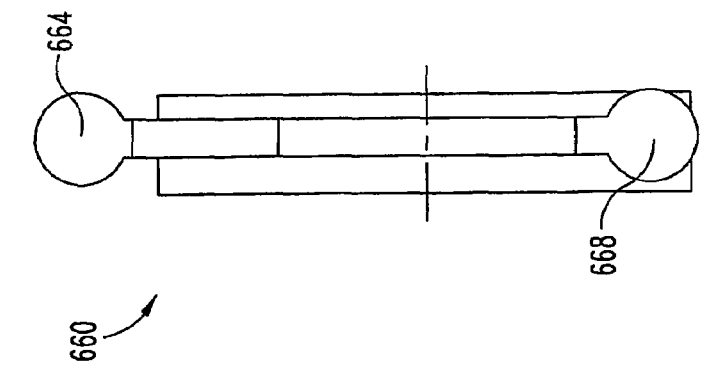
Fig. 46b
Fig. 46c
Fig. 46a

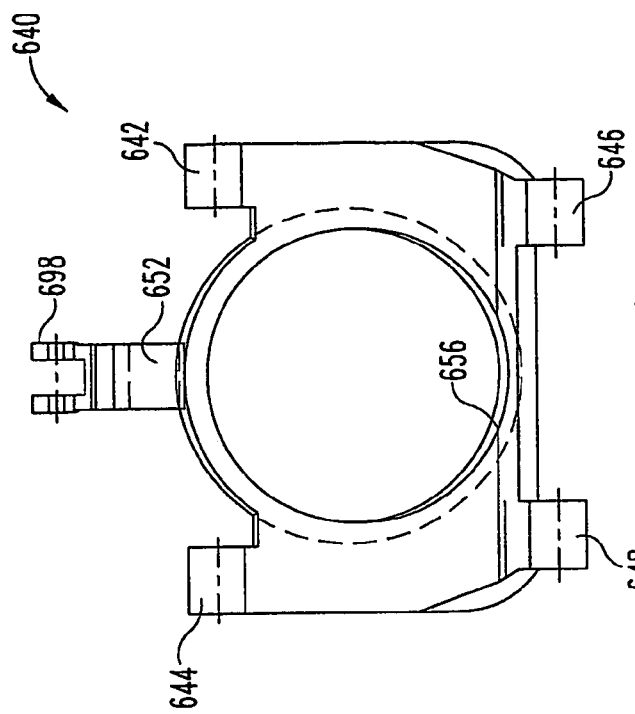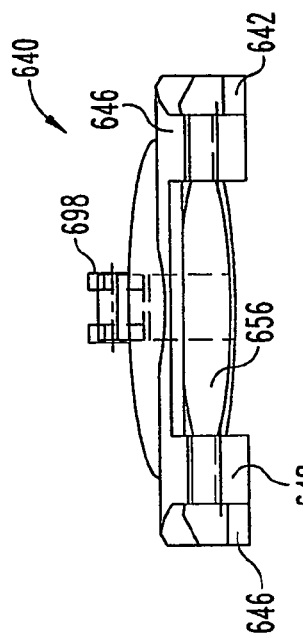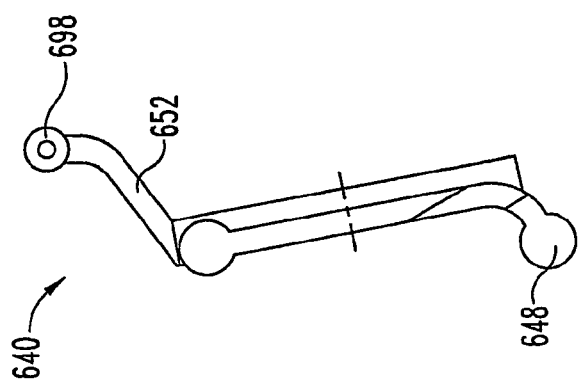

SIDE VIEW – DRIVER SIDE OF VEHICLE

SUSPENSIONS FOR LOW FLOOR VEHICLES

CROSS REFERENCE TO RELATED APPLICATIONS

This application is a continuation of PCT/US04/35218, filed Oct. 25, 2004.

This application claims priority to U.S. provisional patent application Ser. No. 60/514,290 filed Oct. 24, 2003 entitled DUAL ARM SUSPENSION; U.S. provisional patent application Ser. No. 60/519,353, filed Nov. 11, 2003, entitled DUAL SUPPORT SUSPENSION; and U.S. provisional patent application Ser. No. 60/613,664, filed Sep. 28, 2004, entitled COMPACT SUSPENSION FOR A LOW FLOOR VEHICLE, all of which are incorporated herein by reference.

FIELD OF THE INVENTION

The present invention relates to dual arm and single arm suspension systems for vehicles, and in particular for vehicles having a floor which is lower than the rotational axes of the wheels, and also in particular for compactly configured suspensions for vehicles having a low floor.

BACKGROUND OF THE INVENTION

This invention relates to the field of wheel suspensions, and particularly to wheel suspension systems that independently support the wheels of a vehicle in which a wide and low cargo floor is desired. This invention is an improvement to the wheel suspension systems described in my earlier patents, namely, U.S. Pat. No. 4,878,691, issued on Nov. 7, 1989; U.S. Pat. No. 4,934,733, issued on Jun. 19, 1990; U.S. Pat. No. 5,016,912, issued on May 21, 1991; U.S. Pat. No. 5,275,430, issued on Jan. 4, 1994; U.S. Pat. No. 5,839,750, issued on Nov. 24, 1998; U.S. Pat. No. 6,398,251, issued on Jun. 4, 2002; U.S. Pat. No. 6,428,026, issued on Aug. 6, 2002; U.S. Design Pat. No. D485,787, issued on Jan. 27, 2004; and U.S. Publication No. US-2002-0105170, published Aug. 8, 2002; all incorporated herein by reference.

For a variety of reasons, it is frequently desirable to have the cargo floor of a trailer, van or similar vehicle as low as reasonably possible. A low floor provides for more efficient transportation of cargo, giving a vehicle more useable, internal space for given exterior dimensions. Also, a low floor placed close to the road surface makes for easier access to the vehicle. These and other advantages of a low cargo floor have motivated various proposals for low vehicle floors.

SUMMARY OF THE INVENTION

One aspect of the present invention relates to a suspension system for a vehicle. The suspension system includes upper and lower pivoting arms. Each arm is pivotally coupled at one end to the vehicle frame, and pivotally coupled at the other end to a spindle support. At least one of the pivoting arms is located below the rotational axis of the wheel.

In another aspect of the present invention, there is a vehicle suspension system having a pair of pivoting arms. Each arm is pivotally coupled at one end to the vehicle frame, and pivotally coupled at the other end to a stub axle which rotatably supports a wheel. A spring urges one of the pivoting arms away from the vehicle frame.

Yet another aspect of the present invention concerns a wheel suspension system having upper and lower pivoting arms. The arms are pivotally coupled to a stub axle which rotatably supports a wheel. A first support arm is located above a second support arm. A spring urges against the second support arm, and the spring passes through a passageway in the upper support arm.

Yet another aspect of the present invention concerns a wheel suspension system having upper and lower pivoting arms, each of which is pivotally coupled at one end to a vehicle frame, and pivotally coupled at the other end to a stub axle. The upper arm includes a downward bend which provides clearance between the upper support arm and an outboard corner of static structure of the vehicle.

In another aspect of the present invention, there is a vehicle suspension system having a pivoting support arm which is pivotally attached to the vehicle frame and pivotal about an axis that is below the rotational axis of the supported wheel. In one embodiment, the invention includes a shock absorber which is coupled at one end to the wheel support and coupled at the other end to the vehicle frame. The line of action of the shock absorber is substantially horizontal. In other embodiments, the shock absorber is pivotally coupled at one end to the support arm and at the other end to the vehicle frame. The line of action of the shock absorber is substantially horizontal.

Yet another aspect of the present invention relates to a compactly arranged suspension system for a vehicle, especially for a vehicle having a low floor. The suspension system includes a wheel support which includes a pair of pivot attachments for coupling to the vehicle. One pivot attachment is substantially outboard of the coupling interface of the wheel support to a stub axle. The second pivot axis is spaced inboard from the first pivot axis along a common pivot axis. In some embodiments, the pivot axis is substantially parallel to the rotational axis. In yet other embodiments, the pivot axis is inclined more than about one degree and less than about six degrees from the rotational axis. In some embodiments the wheel support is a trailing-arm type wheel support. In yet other embodiments the wheel support is a leading-arm wheel support.

In yet another aspect of the present invention, there is a wheel support which is pivotally coupled to a vehicle by a pair of spaced apart pivot joints. The outboard-most pivot joint is substantially above the track of the supported tire. Preferably, the other pivot joint is spaced inboard of the outboard pivot joint along a common pivot axis.

Yet another aspect of the present invention pertains to a compact arrangement of a wheel suspension. The suspension system preferably includes a wheel support pivotally coupled to the vehicle and a biasing number for urging the wheel support apart from the vehicle. Preferably, the wheel support is coupled to the vehicle by a pair of spaced apart pivot joints. In some embodiments, the wheel support and spring are compactly arranged within the volume of the wheelhousing for the supported wheel.

Other aspects of the present invention will be apparent from the claims description of the preferred embodiments, and the drawings to follow.

DESCRIPTION OF THE DRAWINGS

FIG. 36a is a perspective view of a shock absorber attachment bracket according to one embodiment of the present invention.

FIG. 36b is a side view of the apparatus of FIG. 36A.

FIG. 36c is an orthogonal extension of FIG. 36B.

This application contains drawings executed in color. Copies of this application with color drawings will provided by the U.S.P.T.O. upon request and payment of the necessary fee.

Figure 37:
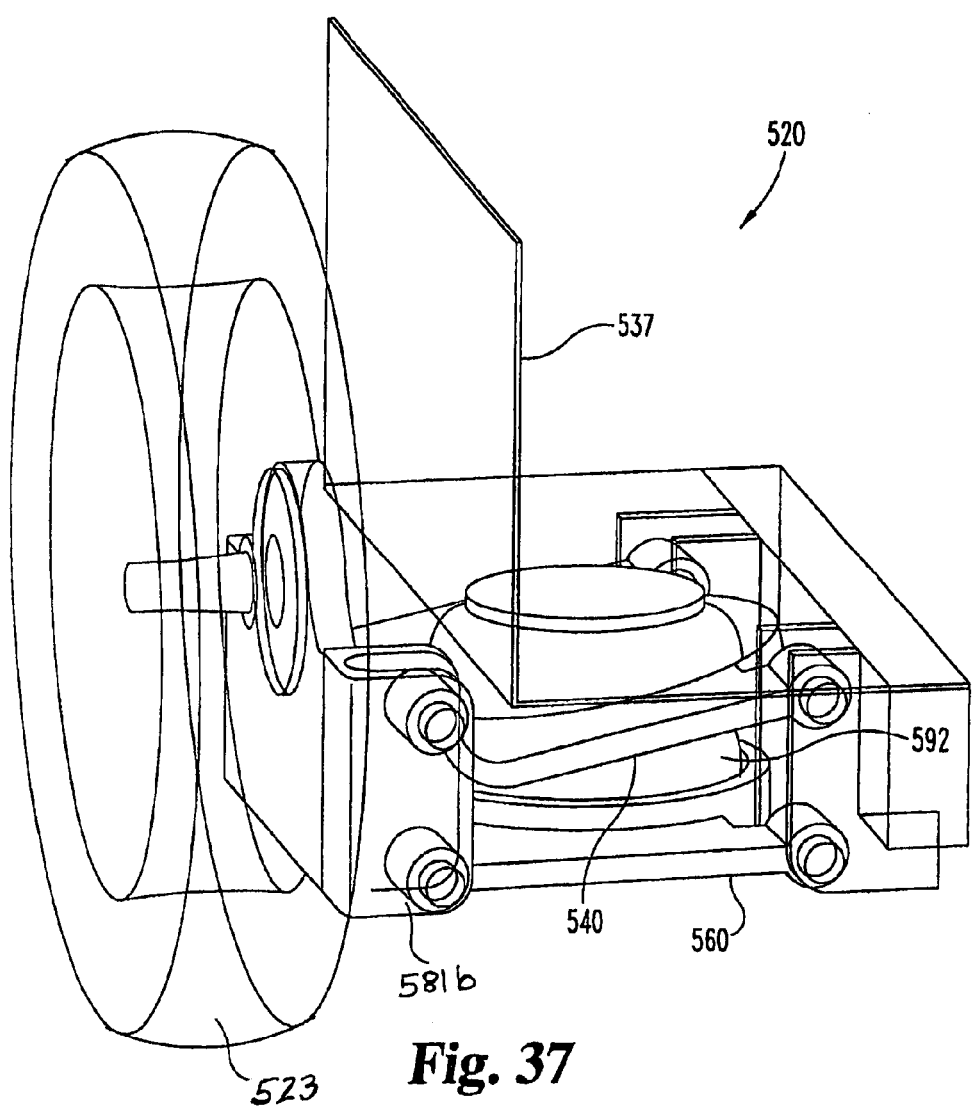

FIG. 37 is a rear, top, and side perspective color drawing with some components being shown partially transparent.

Figure 38:
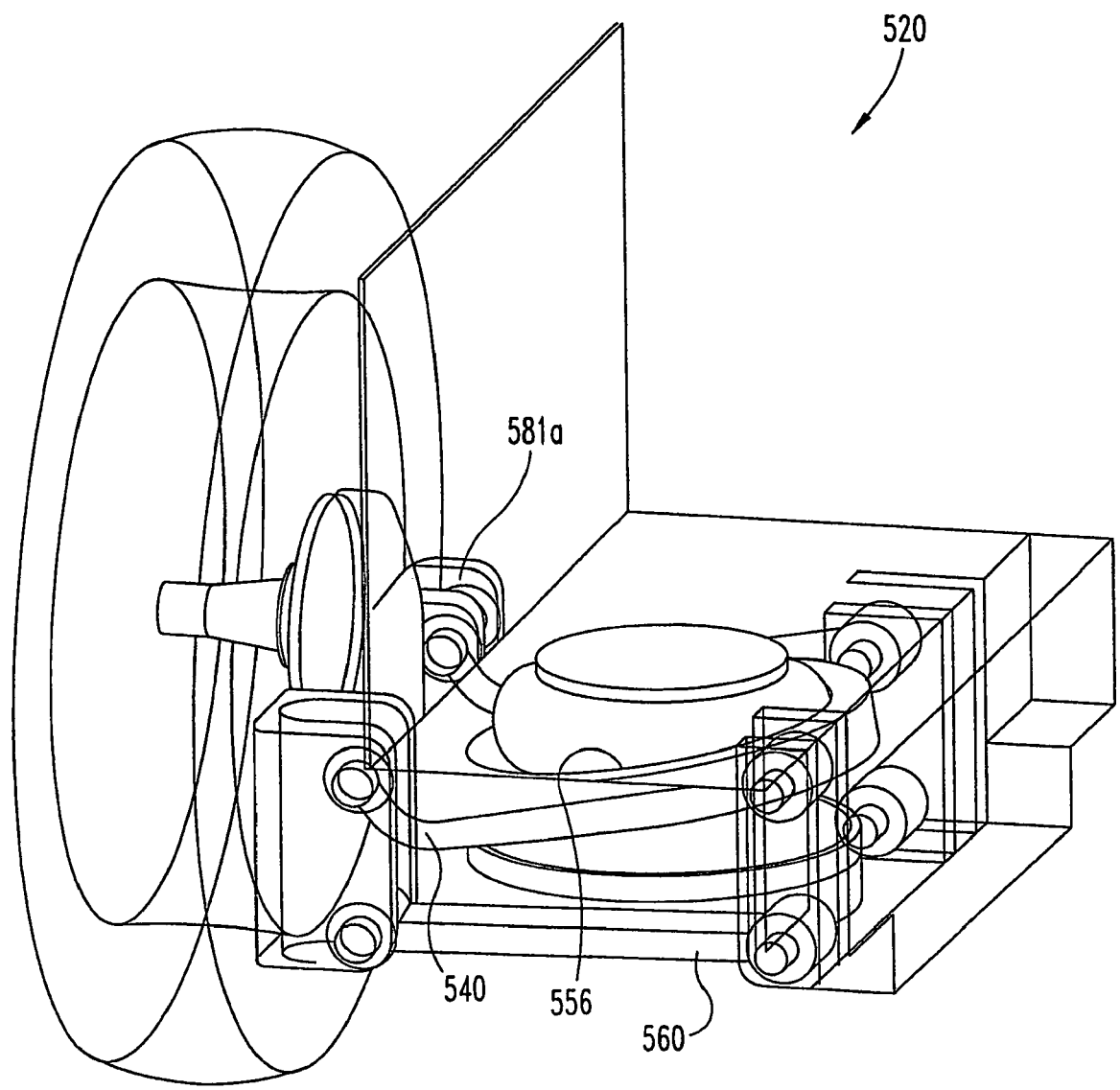

FIG. 38 is a rear, top, and right side color perspective drawing of the apparatus of FIG. 37 with some components being partially transparent.

Figure 39:
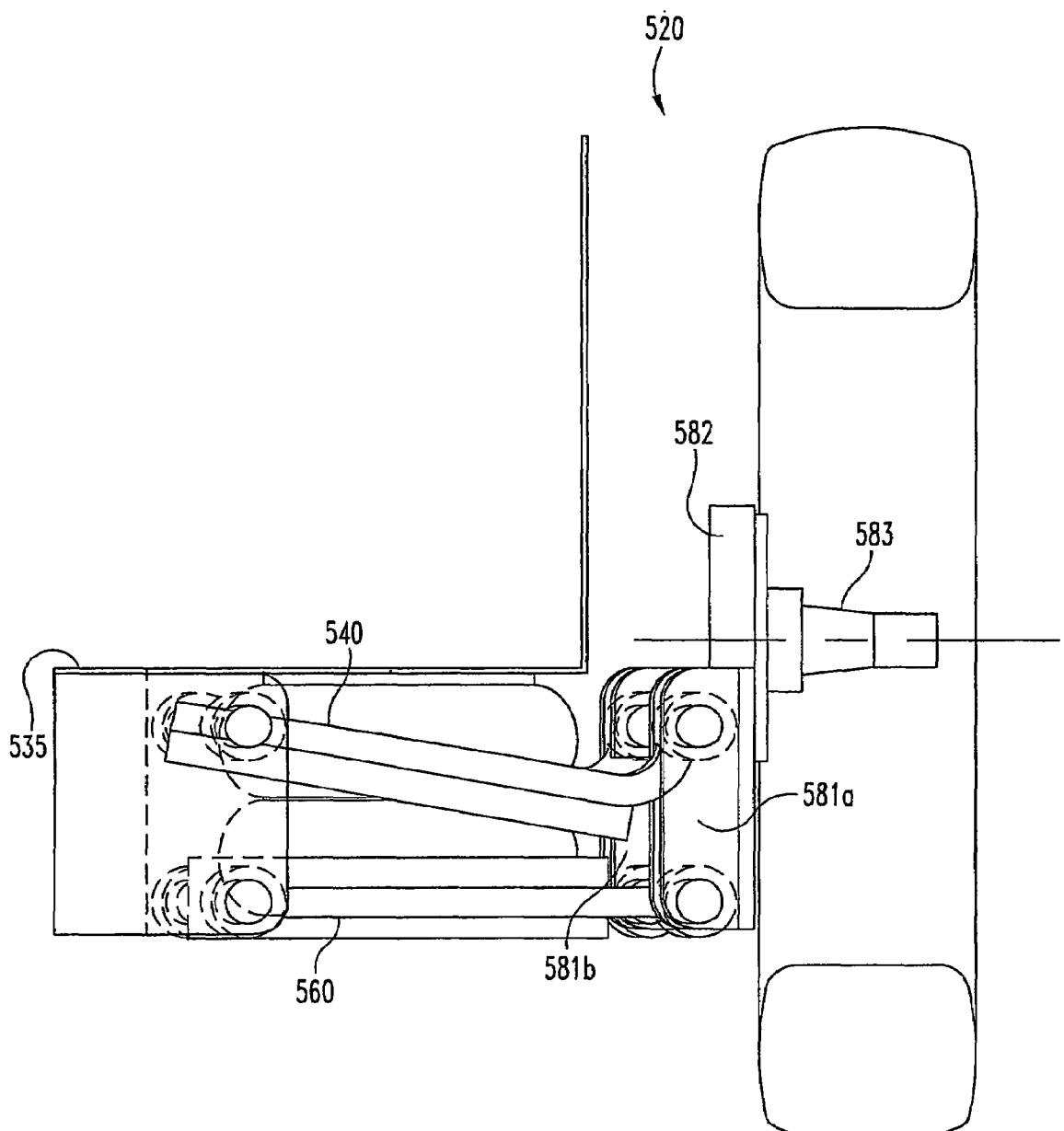

FIG. 39 is a rear elevational view of the apparatus of FIG. 37 shown in color with some components partially transparent.

Figure 40:
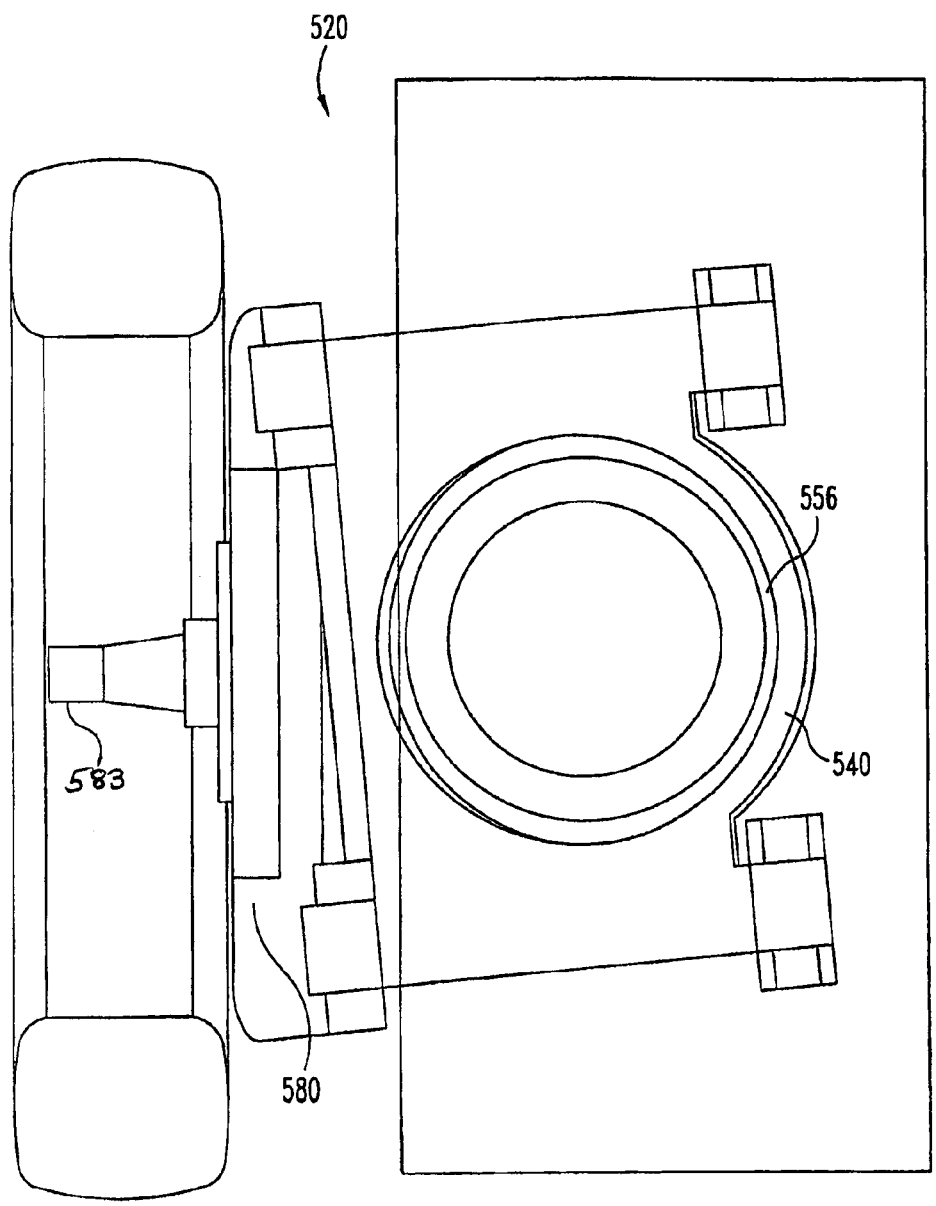

FIG. 40 is a top plan view of the apparatus of FIG. 37 shown in color with some components represented as partially transparent.

Figure 41:
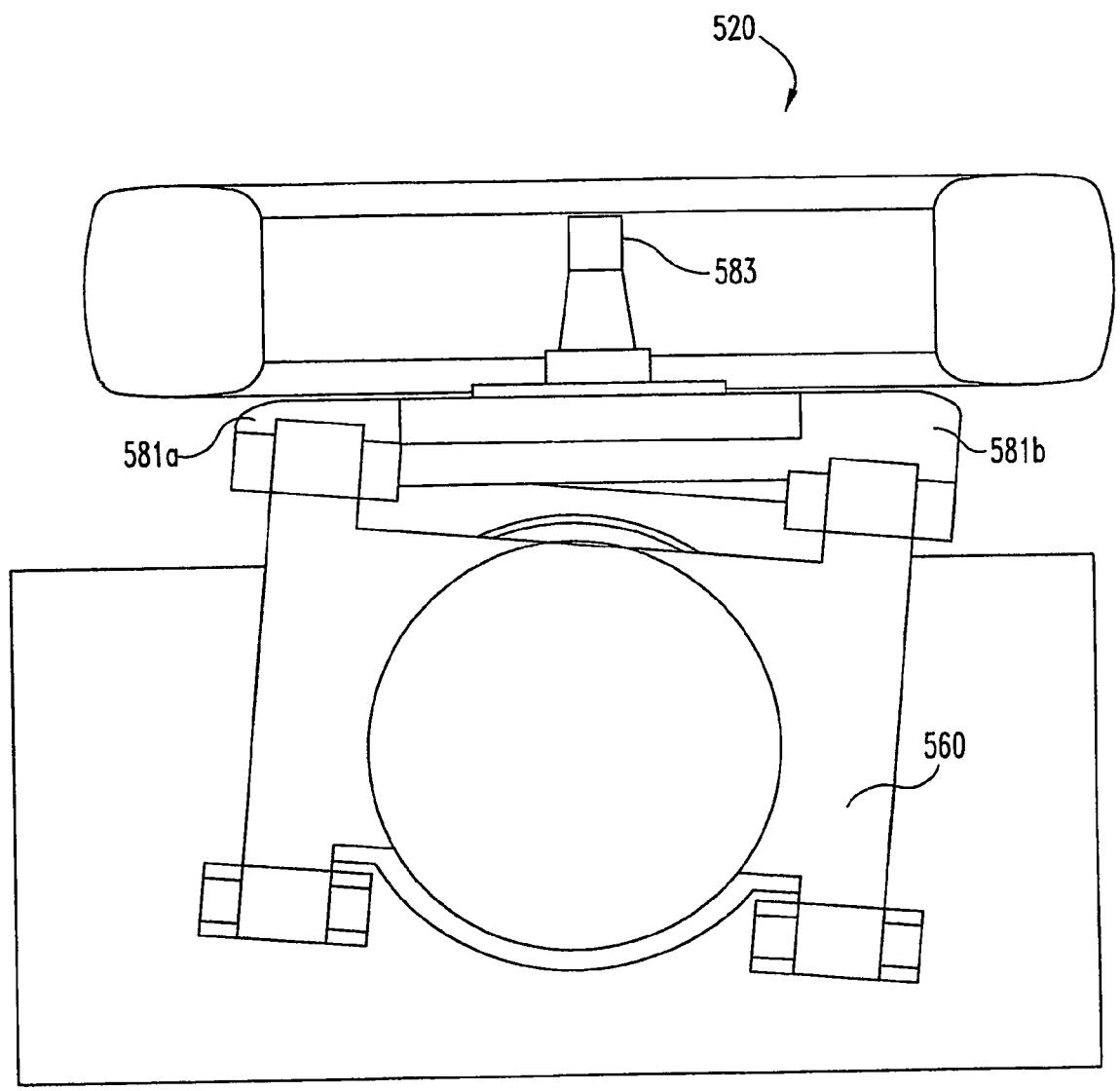

FIG. 41 is a bottom plan view of the apparatus of FIG. 37 shown in color.

The following FIGS. 42-48 are arranged in orthogonal views. However, there can be slight differences of scale between adjacent views.

FIG. 42a is a side elevational view of a lower support arm according to one embodiment of the present invention.

FIG. 42b is a bottom plan view of the apparatus of FIG. 42A.

FIG. 42c is a side elevational view of the apparatus of FIG. 42B.

FIG. 43a is an end elevational view of an upper support arm according to one embodiment of the present invention.

FIG. 43b is a bottom plan view of the apparatus of FIG. 43A.

FIG. 43c is a side elevational view of the apparatus of FIG. 43B.

Figure 44B:
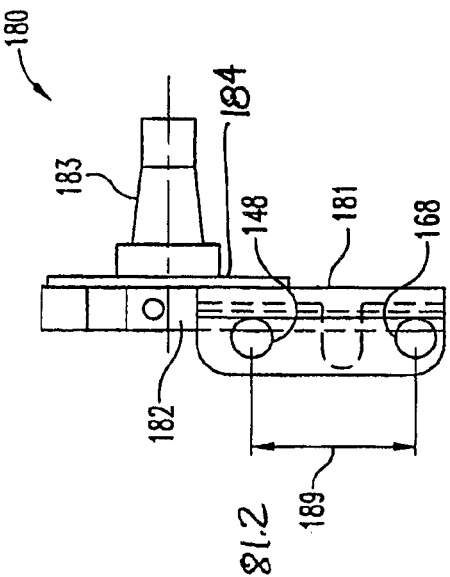
Figure 44A:
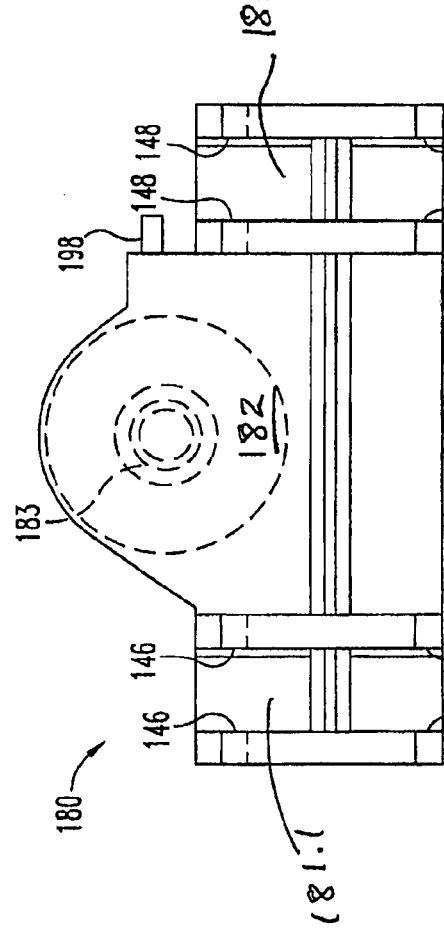

FIG. 44a is an inboard plan view of a spindle support according to one embodiment of the present invention.

FIG. 44b is a side view of the apparatus of FIG. 44A.

Figure 44C:
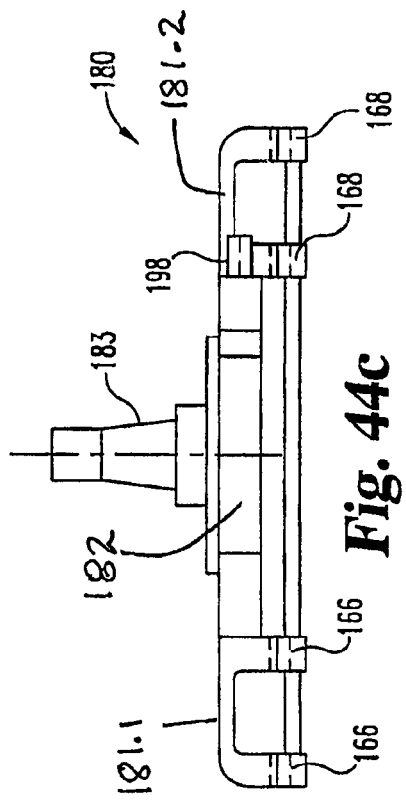

FIG. 44c is a top plan view of the apparatus of FIG. 44B.

FIG. 45a is an inboard plan view of a spindle support according to another embodiment of the present invention.

FIG. 45b is a side view of the apparatus of FIG. 45A.

FIG. 45c is a top plan view of the apparatus of FIG. 45B.

FIG. 46a is an end elevational view of a lower support arm according to another embodiment of the present invention.

FIG. 46b is a bottom plan view of the apparatus of FIG. 46A.

FIG. 46c is a side elevational view of the apparatus of FIG. 46B.

Figure 47C:
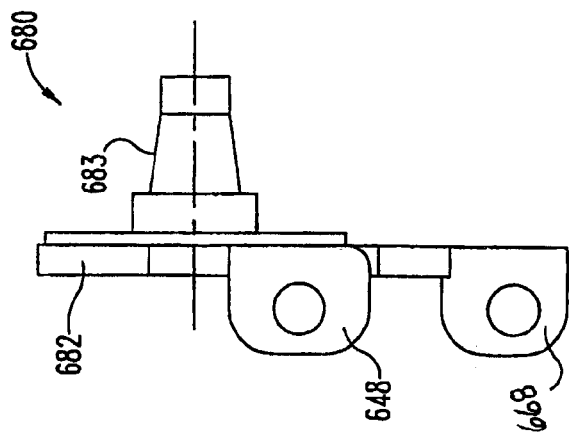
Figure 47A:
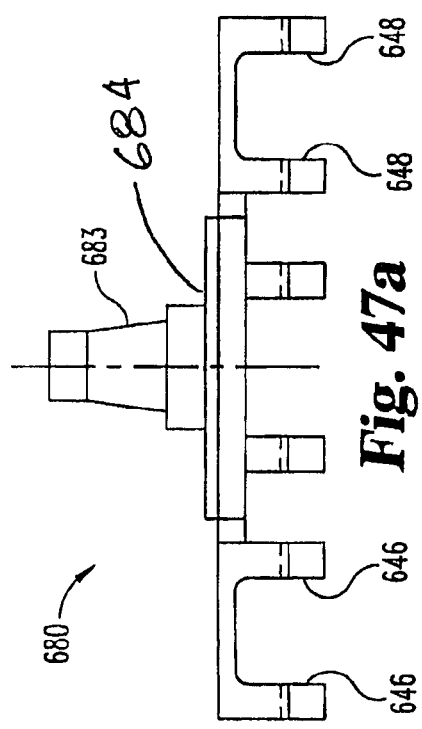

FIG. 47a is a top plan view of a spindle support according to another embodiment of the present invention.

Figure 47B:
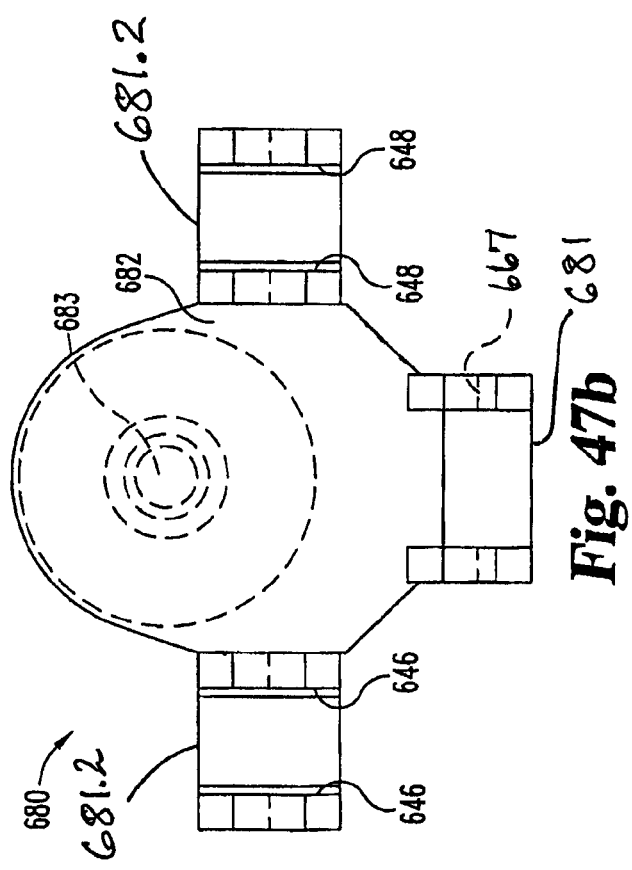

FIG. 47b is an inboard plan view of the apparatus of FIG. 47A.

FIG. 47c is a side elevational view of the apparatus of FIG. 47B.

FIG. 48a is a side elevational view of an upper support arm according to another embodiment of the present invention.

FIG. 48b is a bottom plan view of the apparatus of FIG. 48A.

FIG. 48c is a side elevational view of the apparatus of FIG. 48B.

Figure 49:
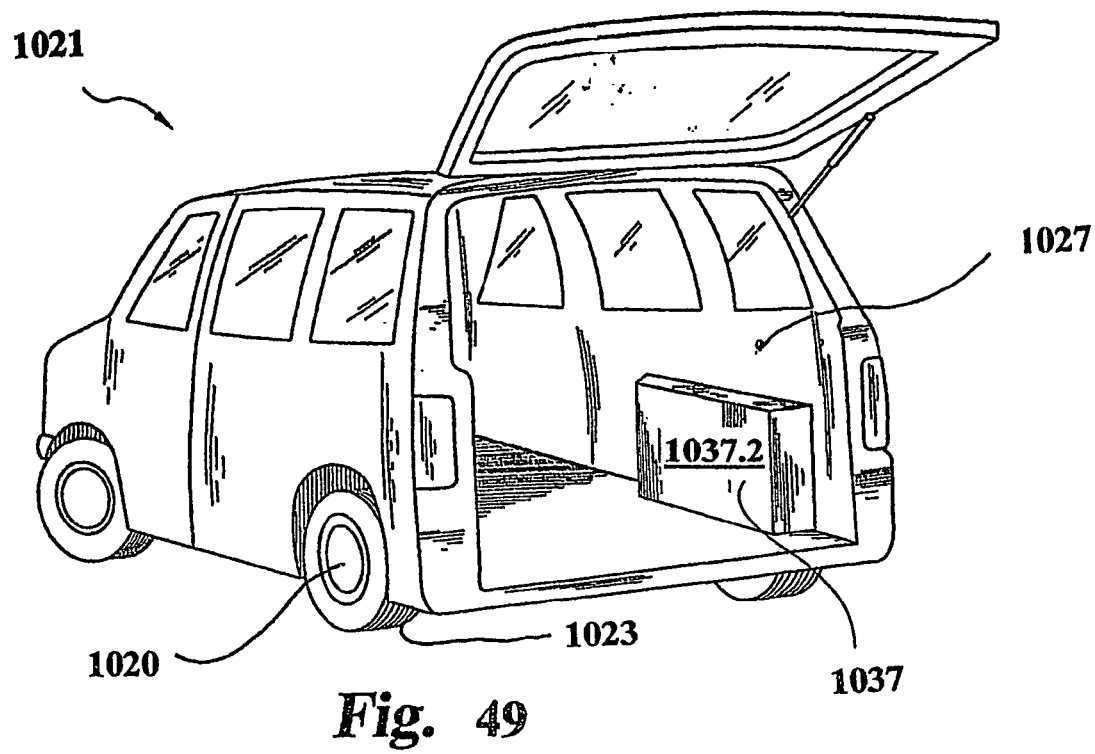

FIG. 49 is a rear perspective view of a vehicle according to one embodiment of the present invention.

Figure 50:
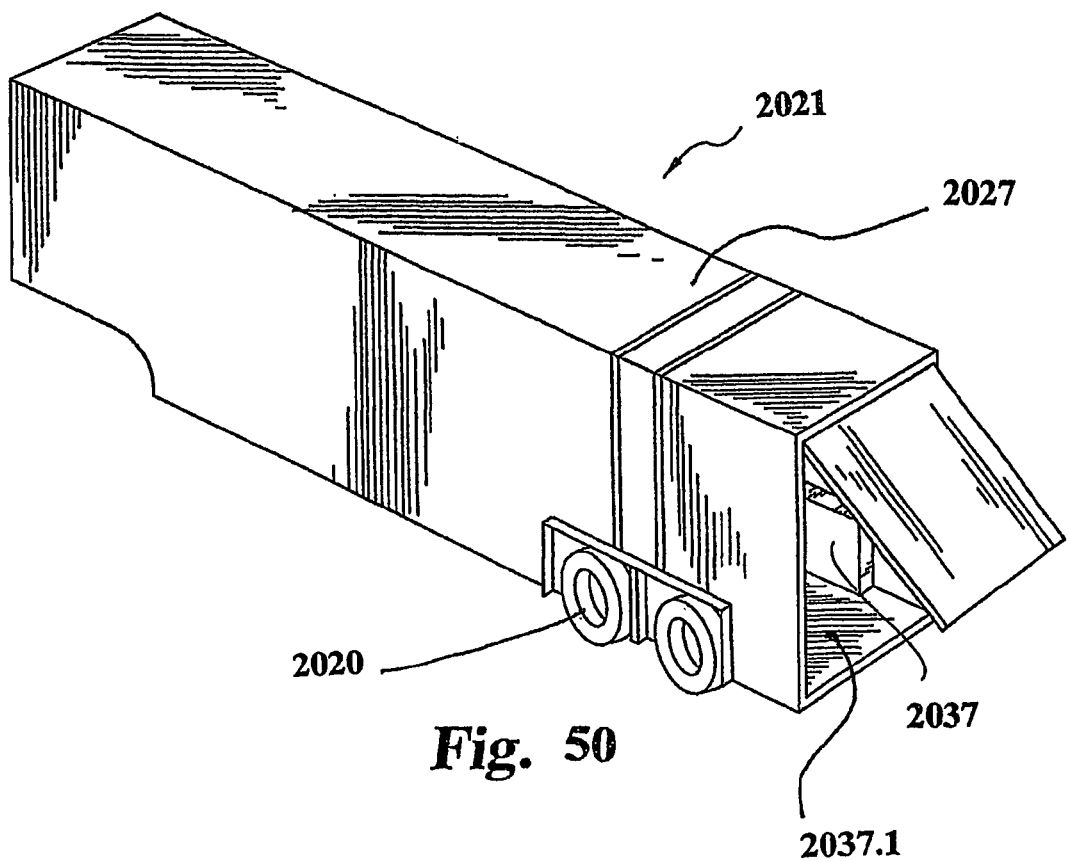

FIG. 50 is a top perspective view of a trailer according to one embodiment of the present invention.

Figure 51:
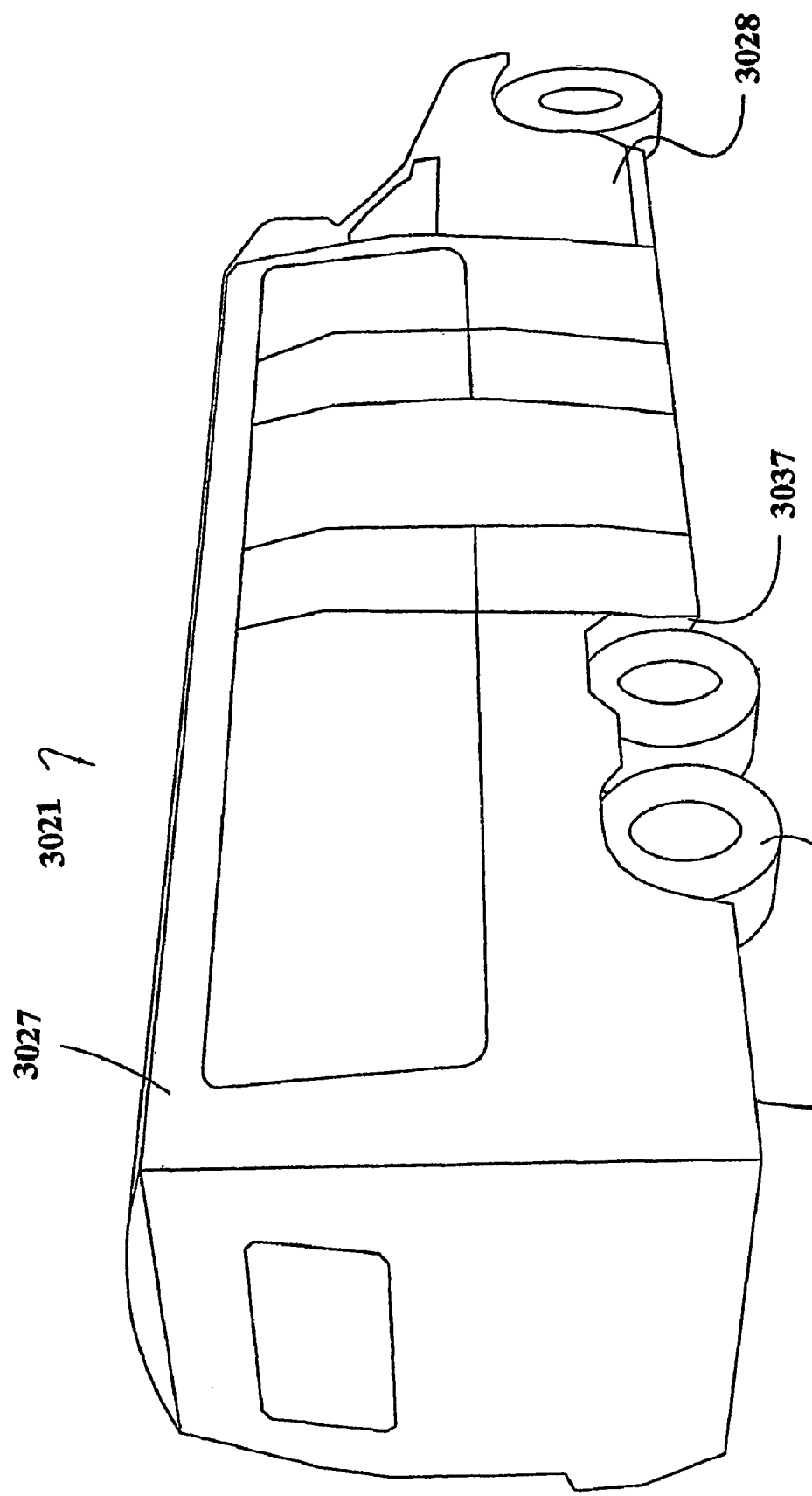

FIG. 51 is a rear perspective view of a vehicle according to another embodiment of the present invention.

Figure 52:
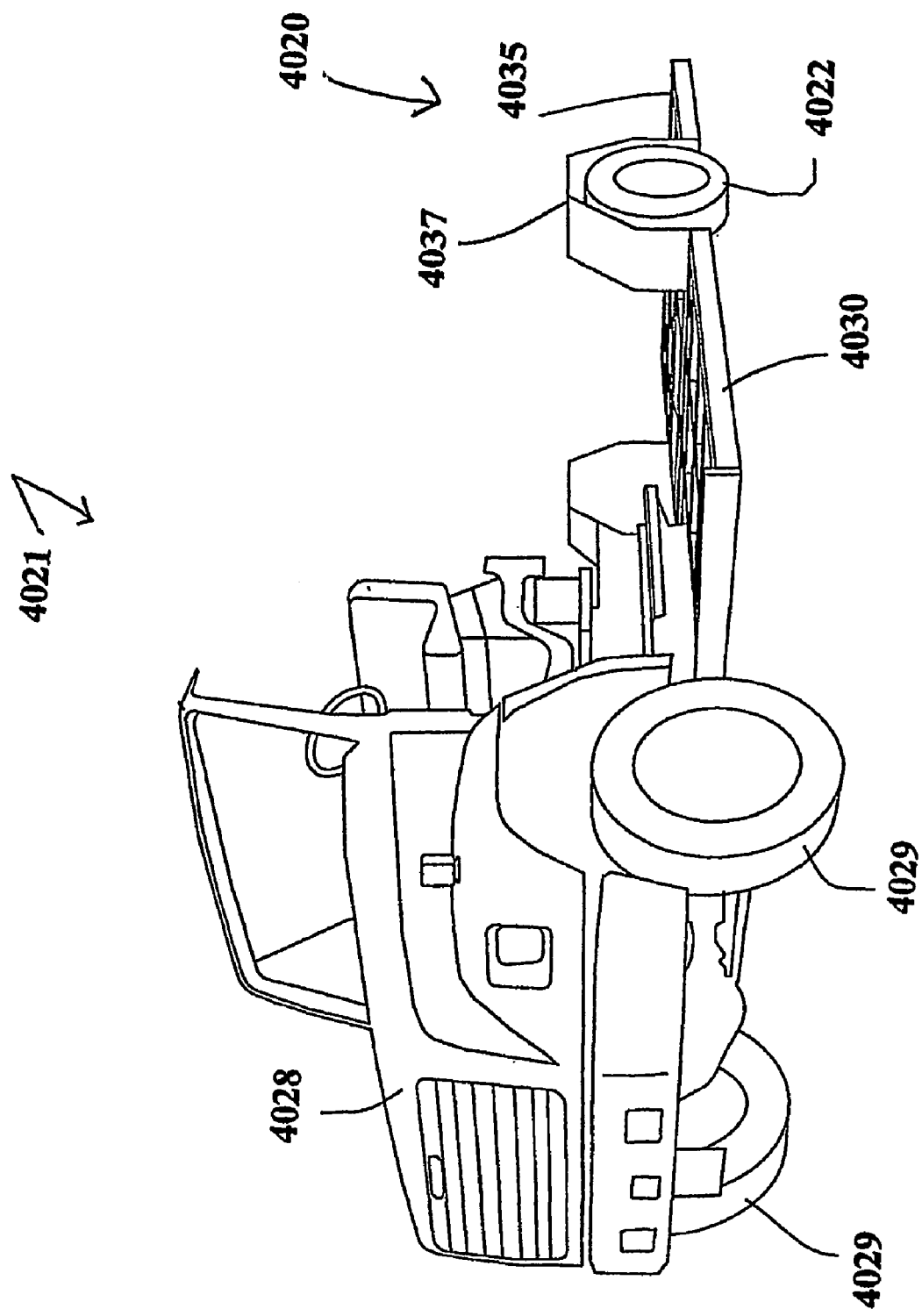

FIG. 52 is a front perspective view of a converted cab and rear chassis according to another embodiment of the present invention.

Figure 53:
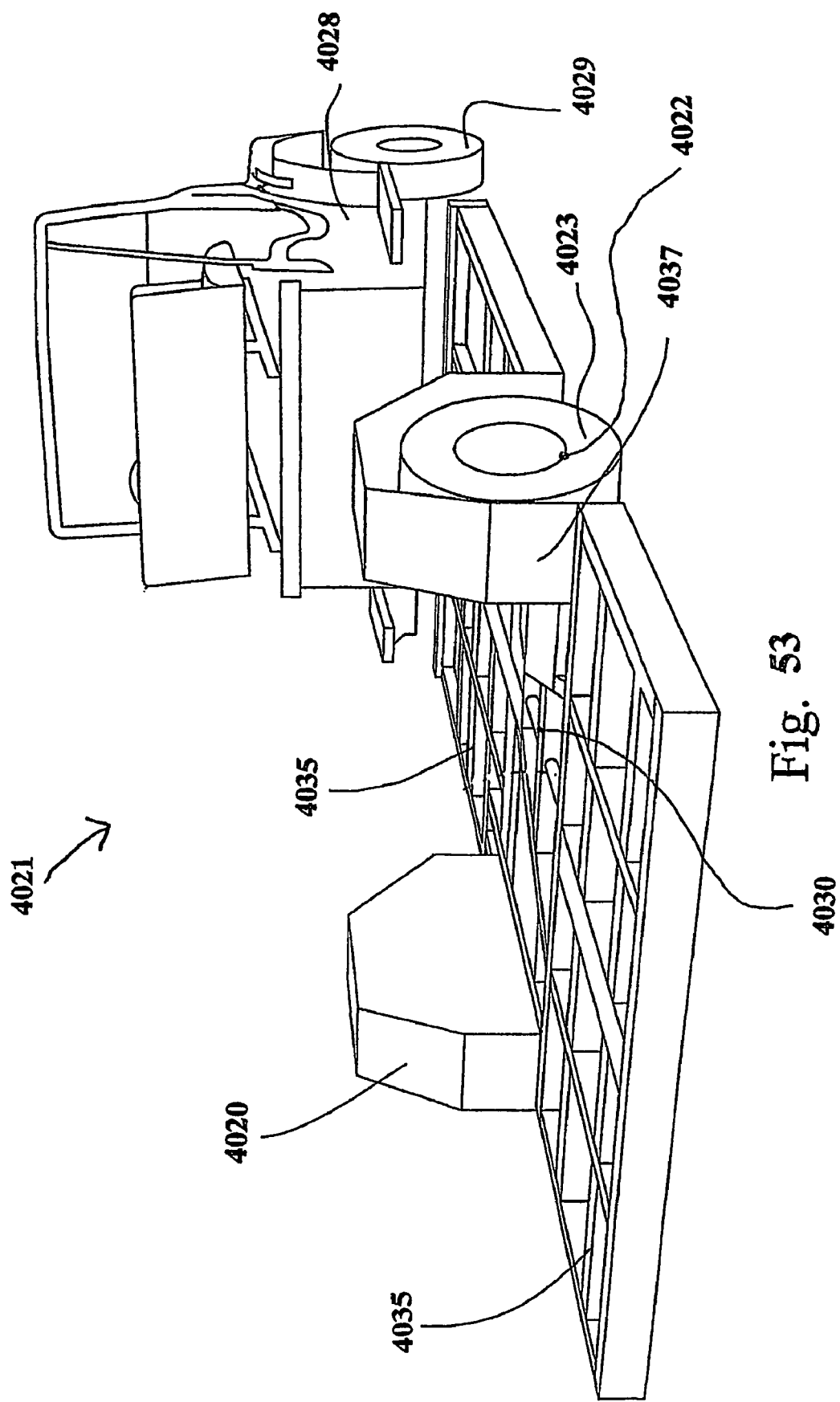

FIG. 53 is a rear perspective view of the apparatus of FIG. 52.

Figure 54:
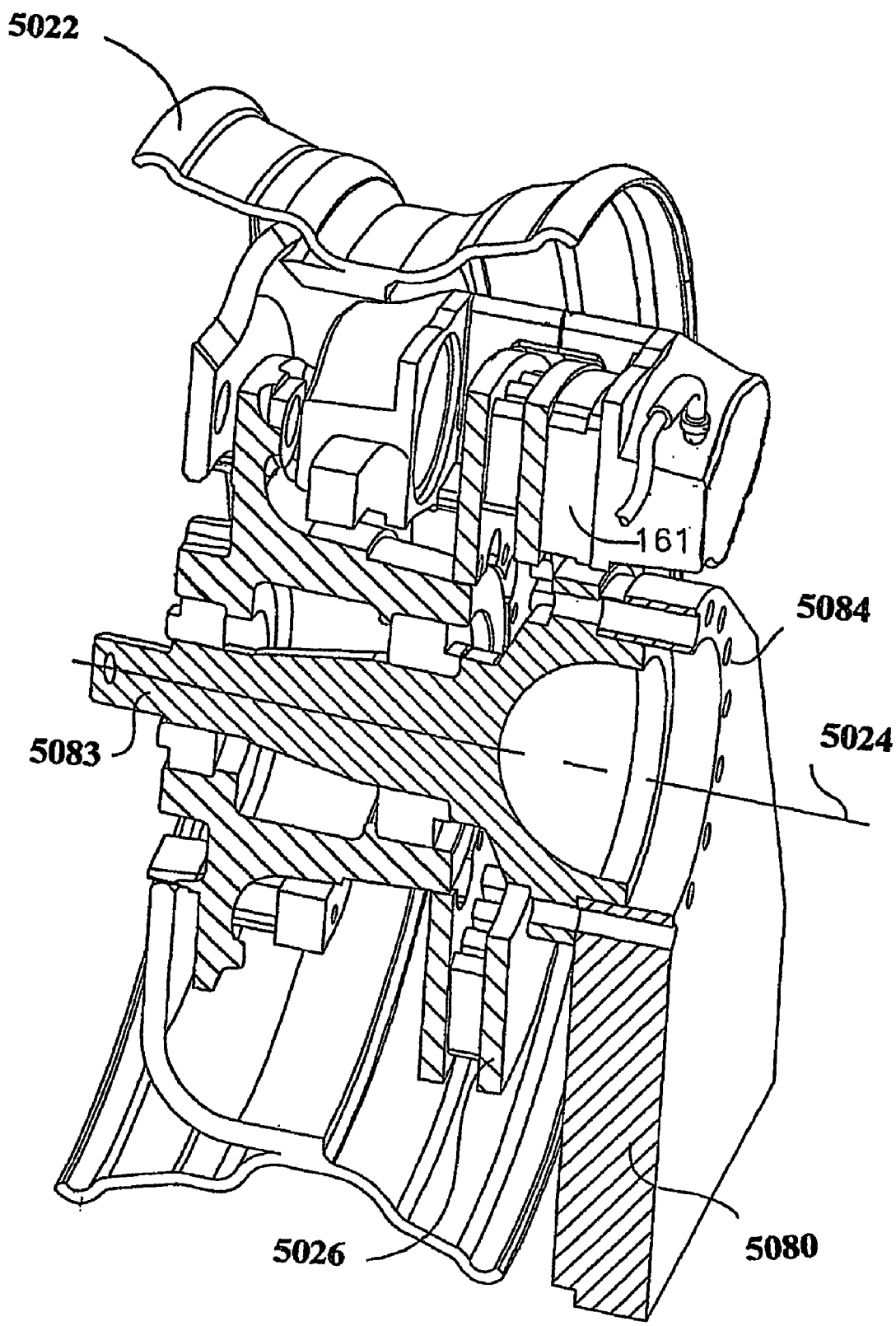

FIG. 54 is a close up, cross sectional view of a wheel, spindle, and spindle support according to another embodiment of the present invention.

Figure 55:
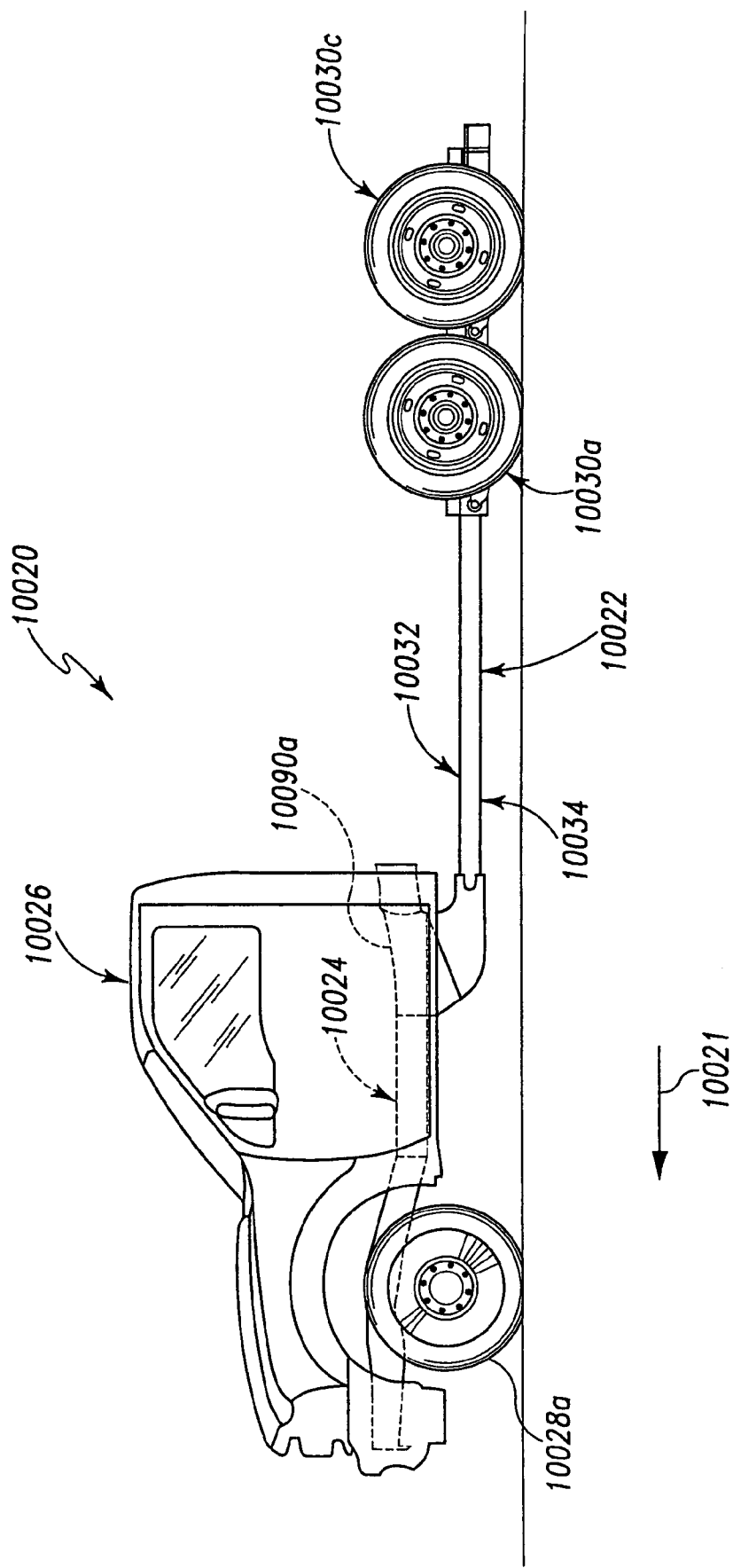

FIG. 55 is a side elevational view of a vehicle according to one embodiment of the present invention.

Figure 56:
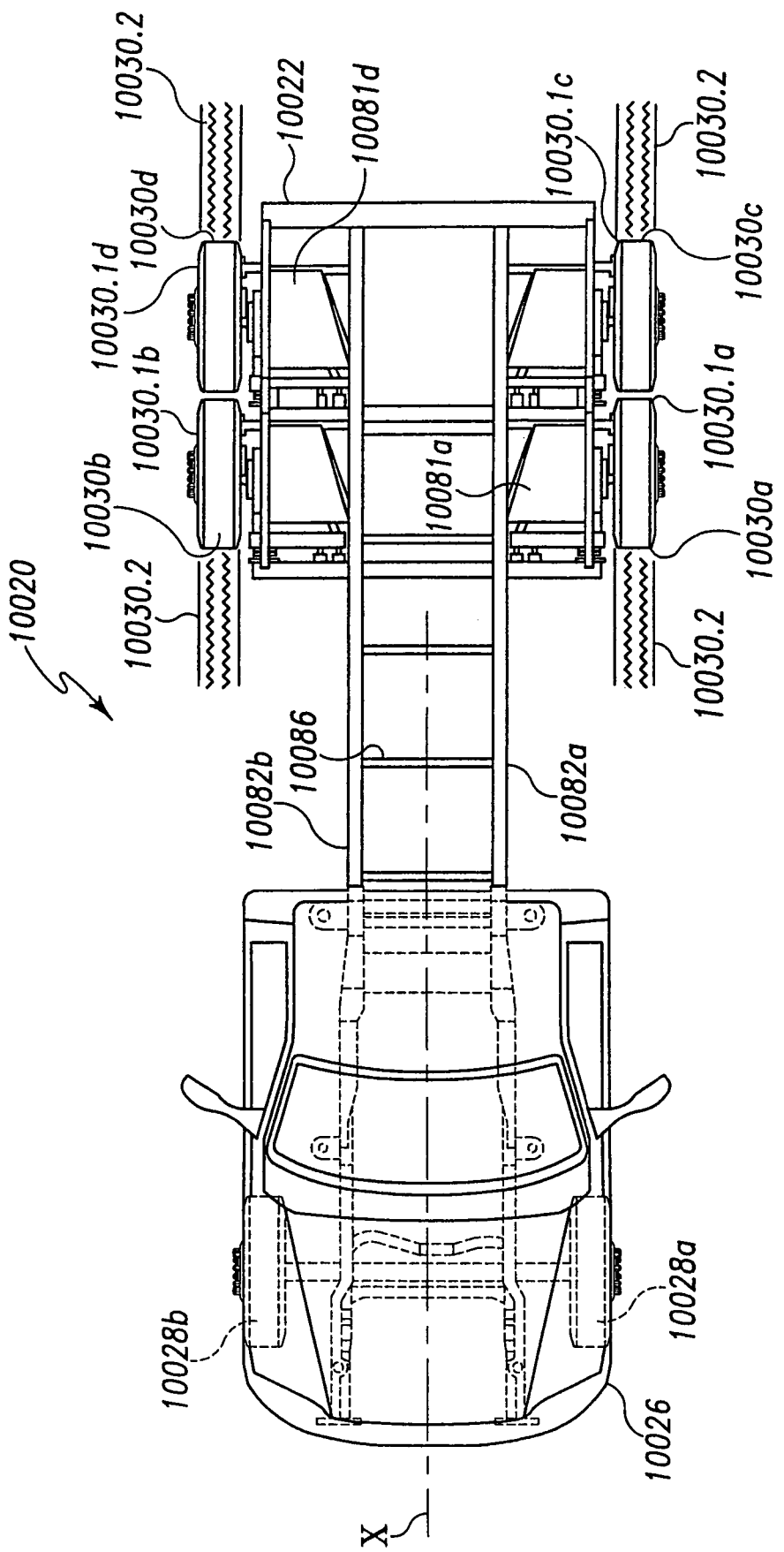

FIG. 56 is a top plan view of the vehicle of FIG. 55.

Figure 57:
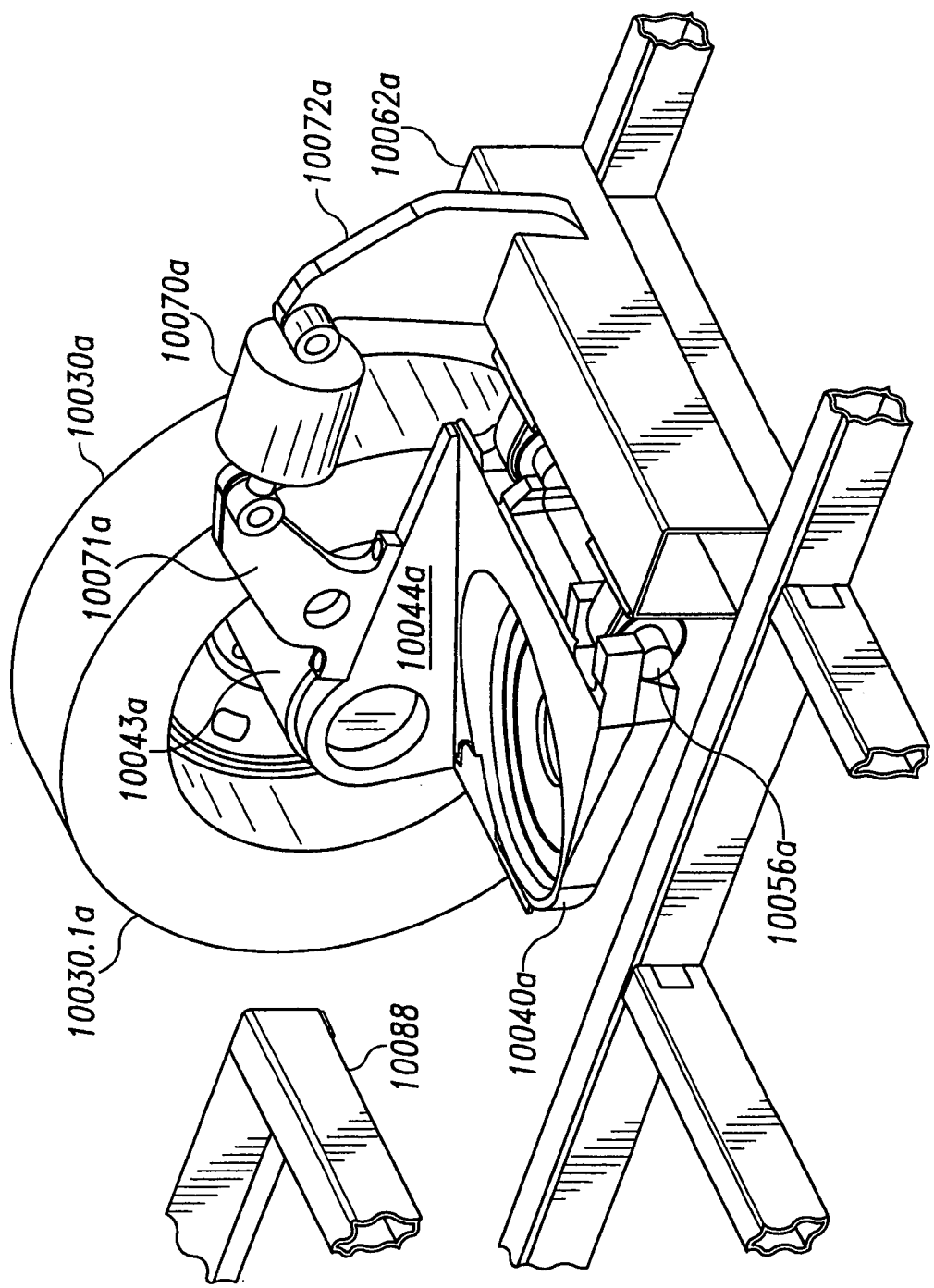

FIG. 57 is a top, front, and inboard view of a portion of the suspension of the vehicle of FIG. 55.

Figure 58:
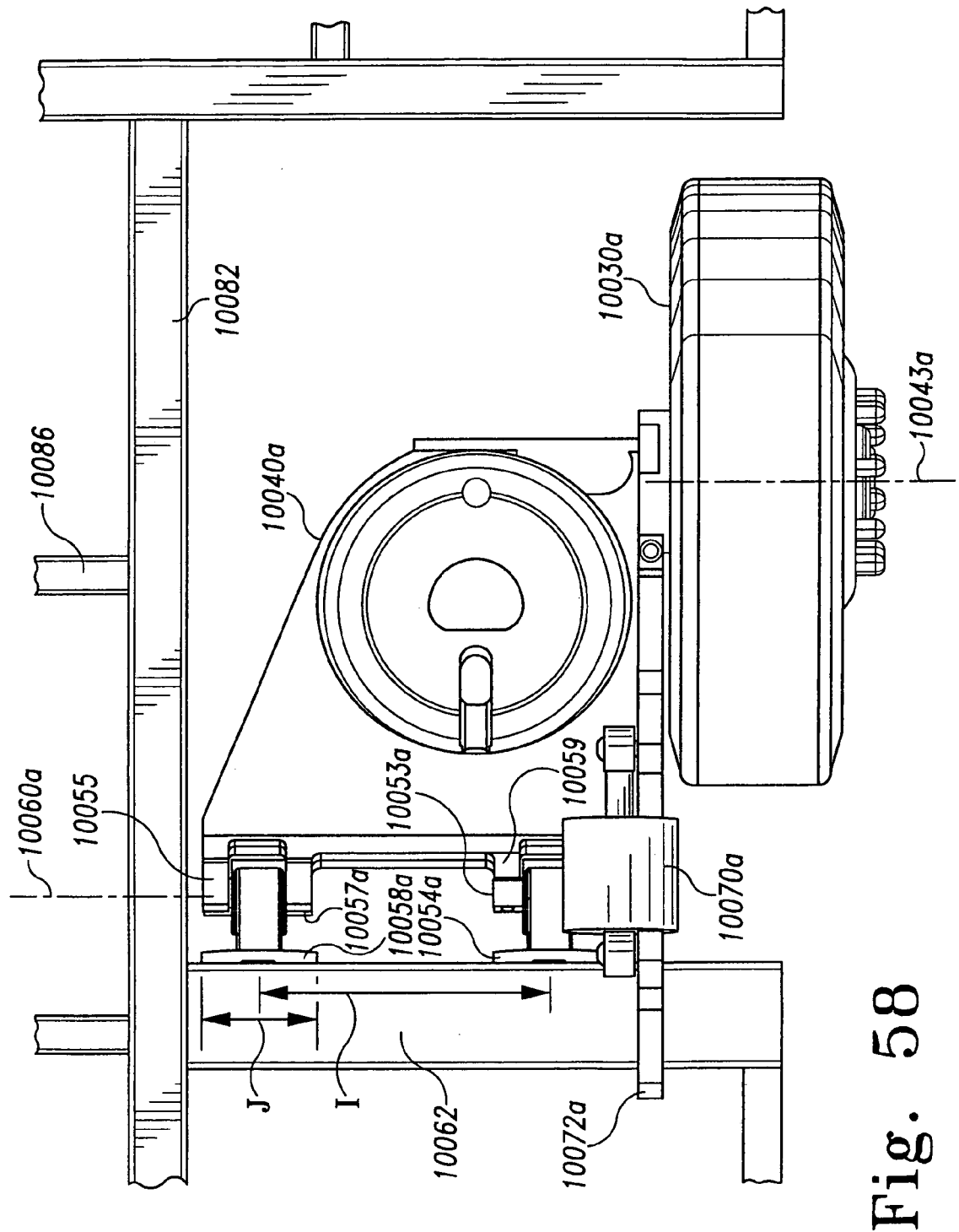

FIG. 58 is a top plan view of the suspension of FIG. 57.

Figure 59:
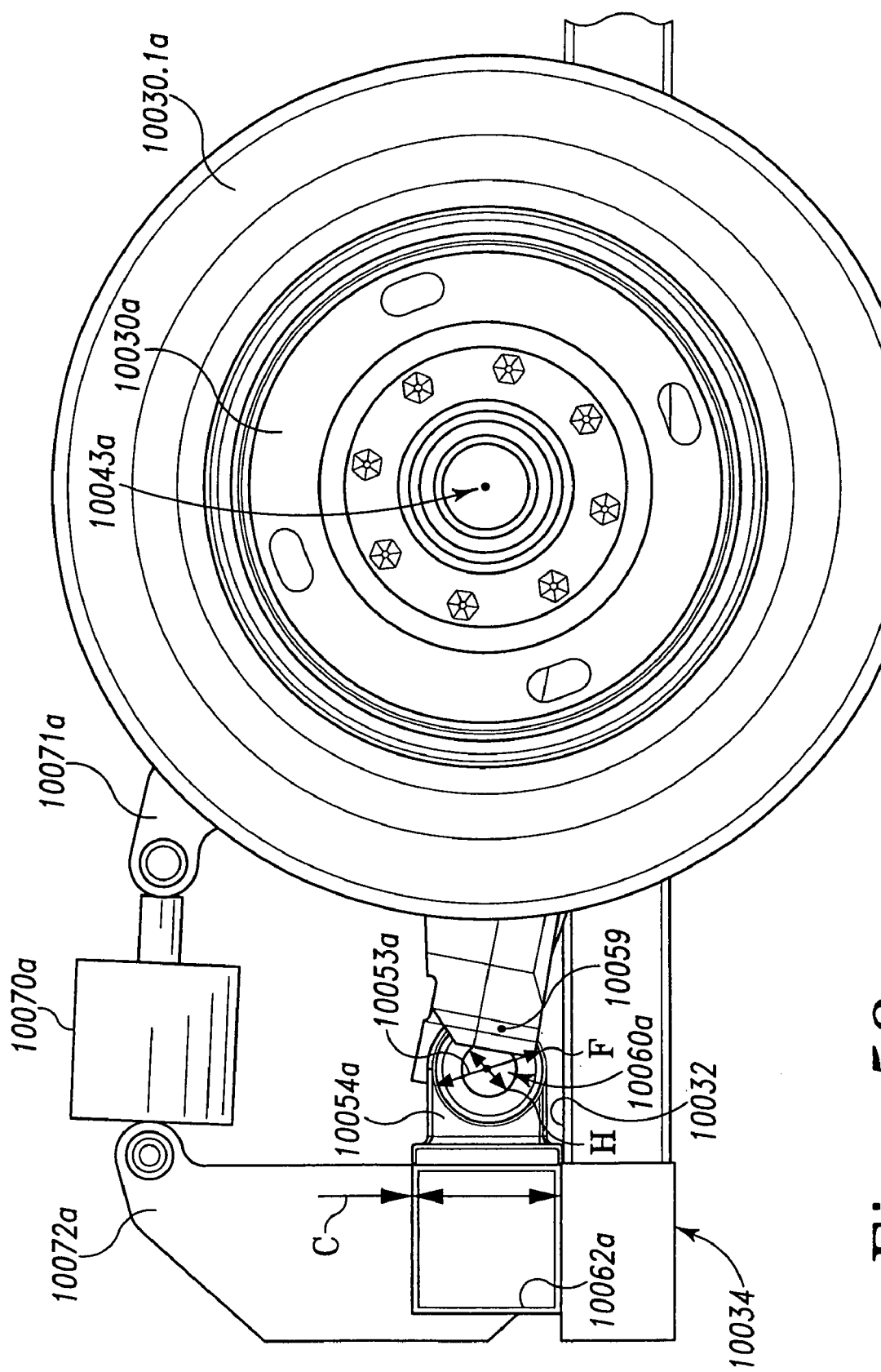

FIG. 59 is a side elevational view of the suspension of FIG. 58.

Figure 60:
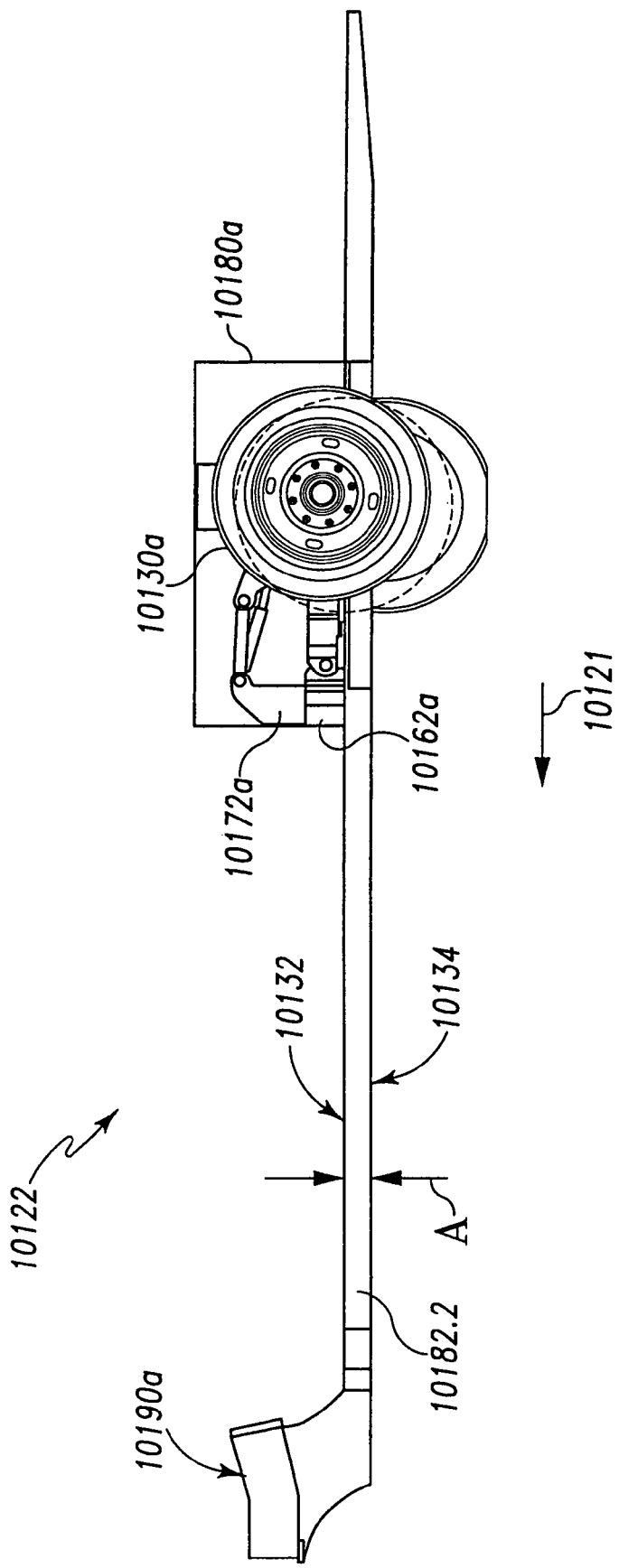

FIG. 60 is a side elevational view of a frame and suspension system according to another embodiment of the present invention.

Figure 61:
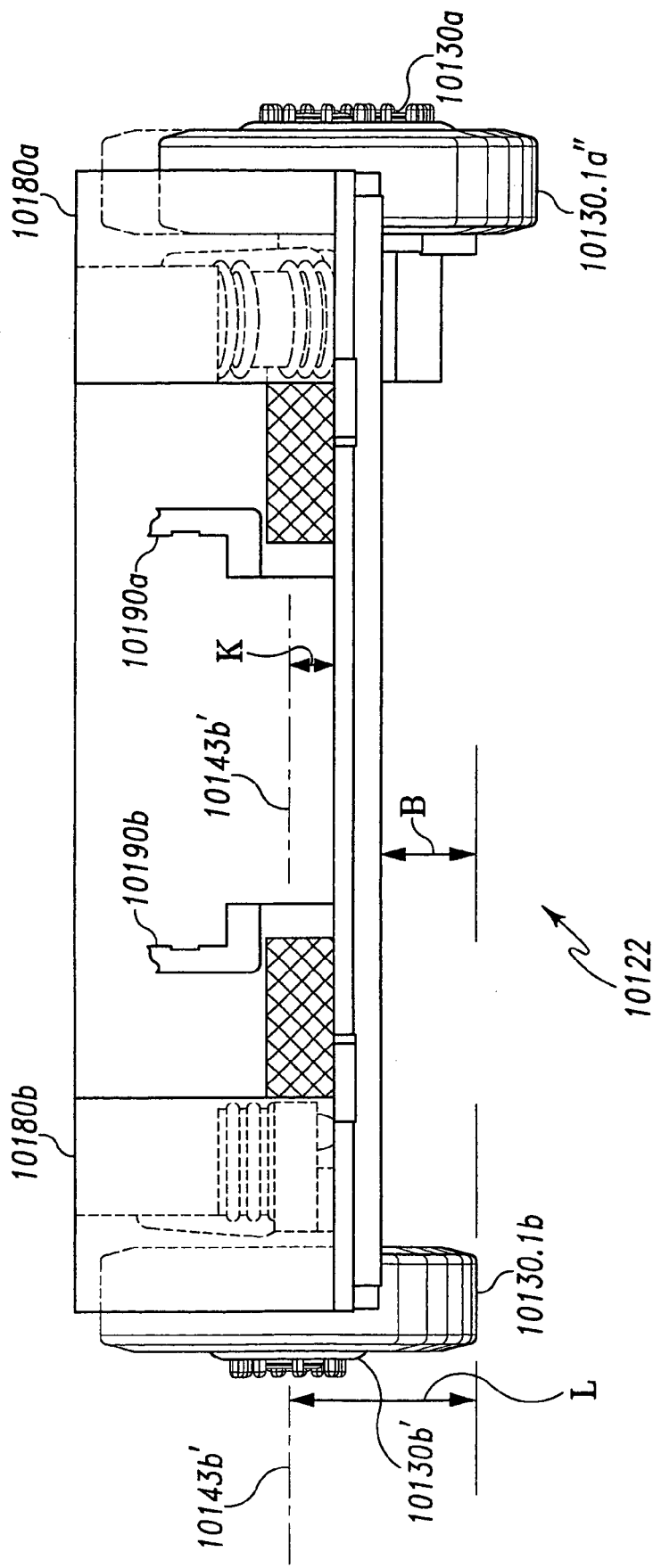

FIG. 61 is a rear elevational view of the apparatus of FIG. 60.

Figure 62:
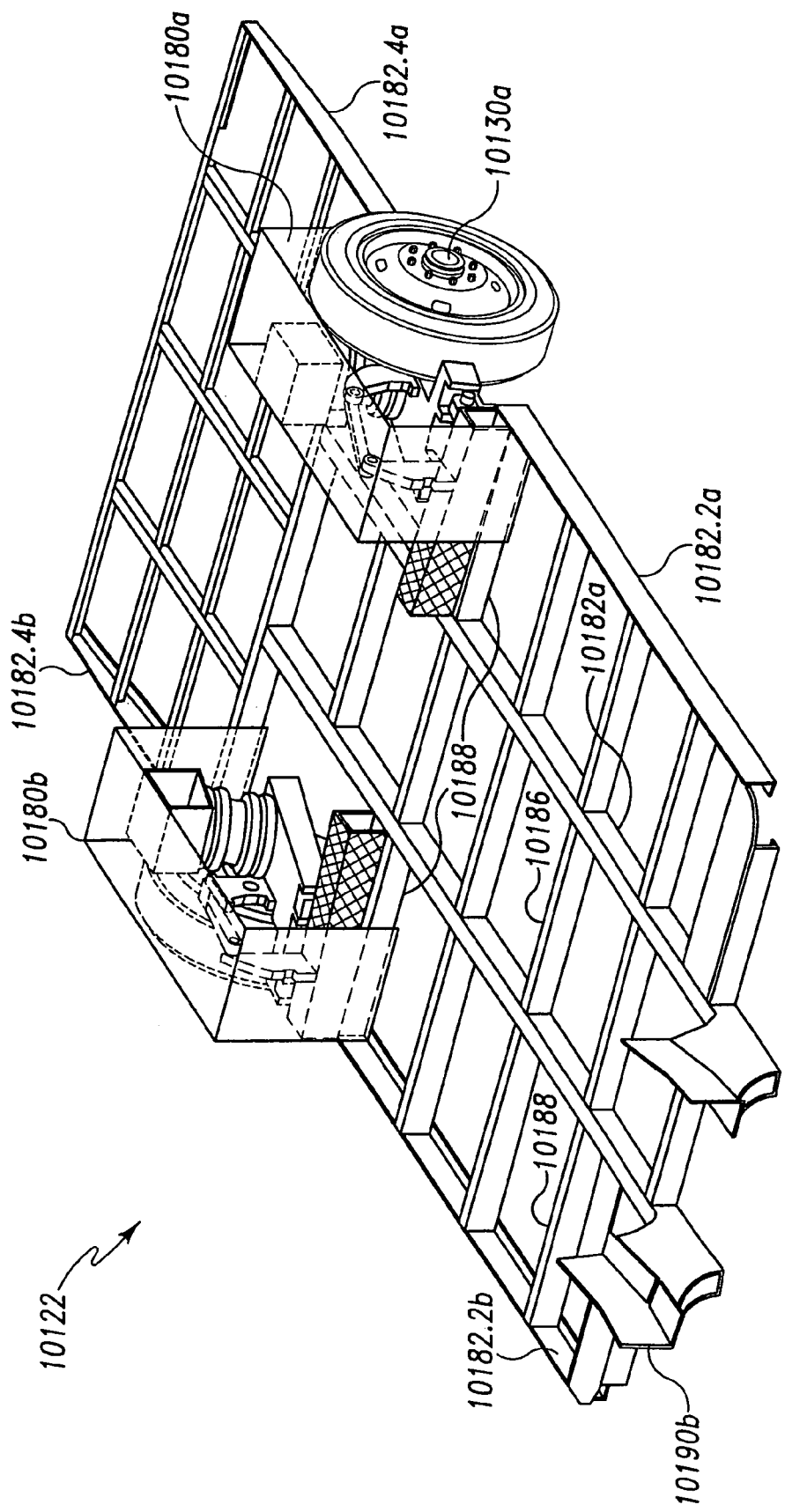

FIG. 62 is a top, front, left side perspective view of the system of FIG. 60.

Figure 63:
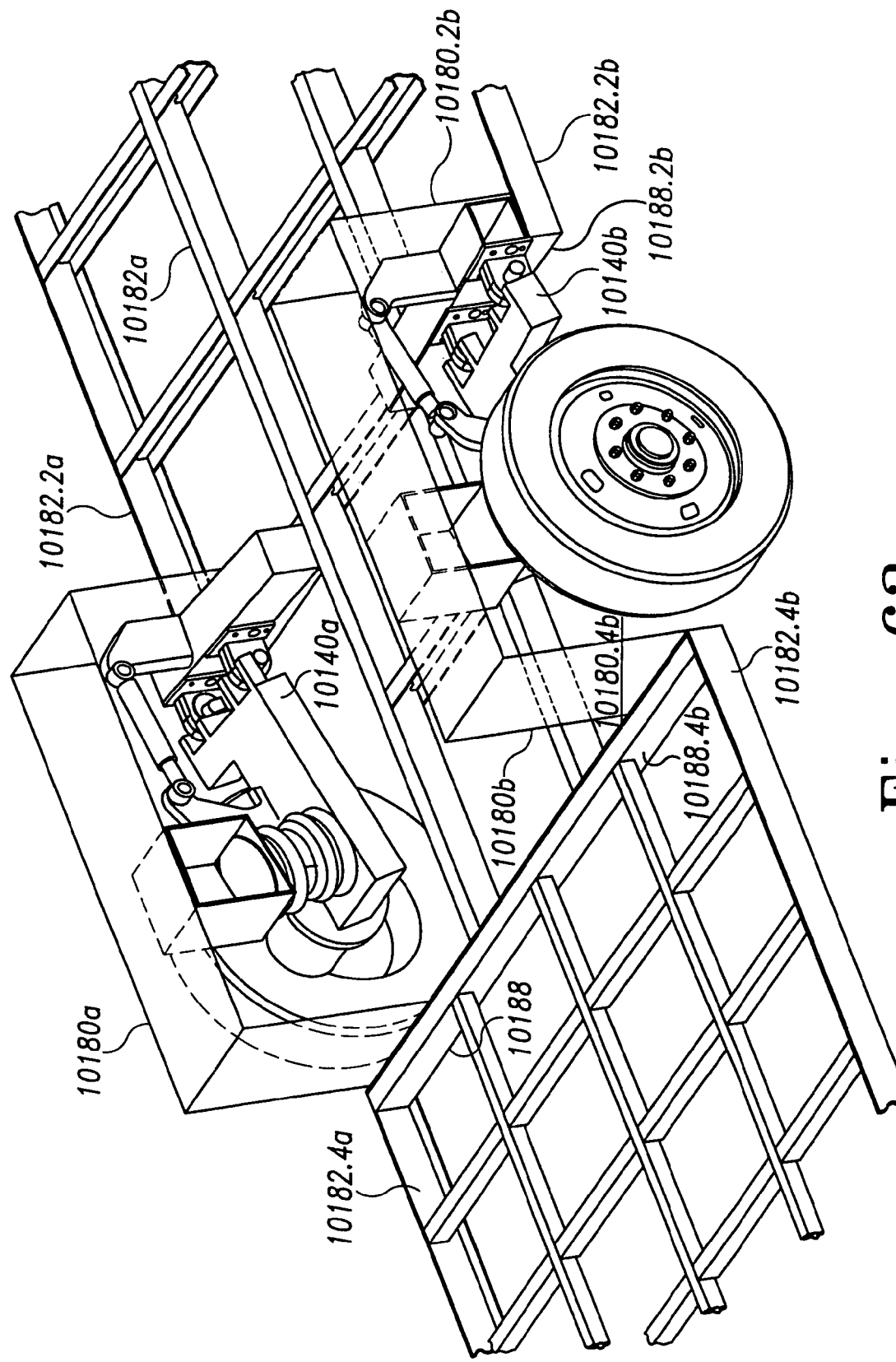

FIG. 63 is a right side, top, rear perspective view of a portion of the system of FIG. 62.

Figure 64:
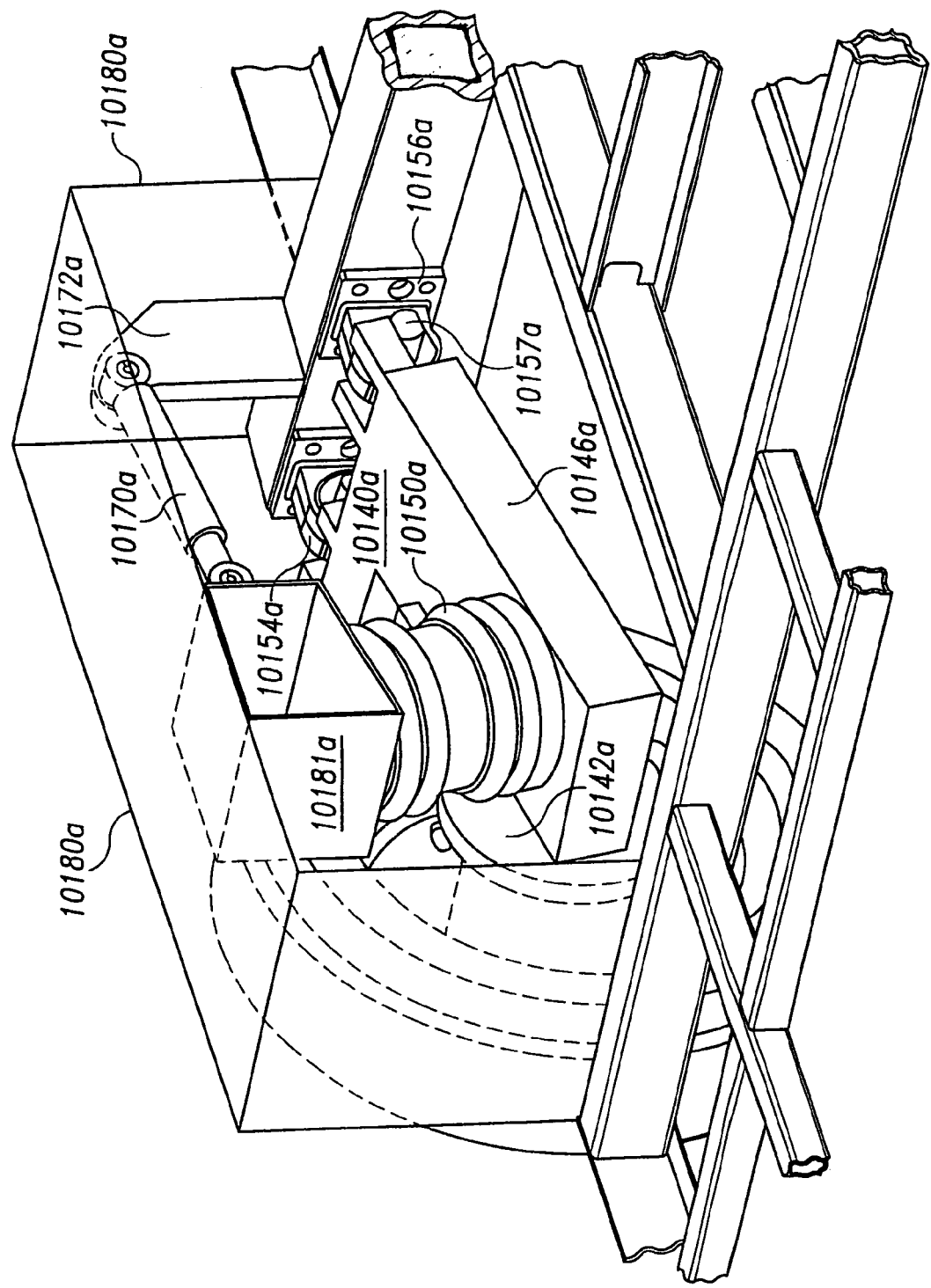

FIG. 64 is a perspective view of a portion of the system of FIG. 63.

Figure 65:
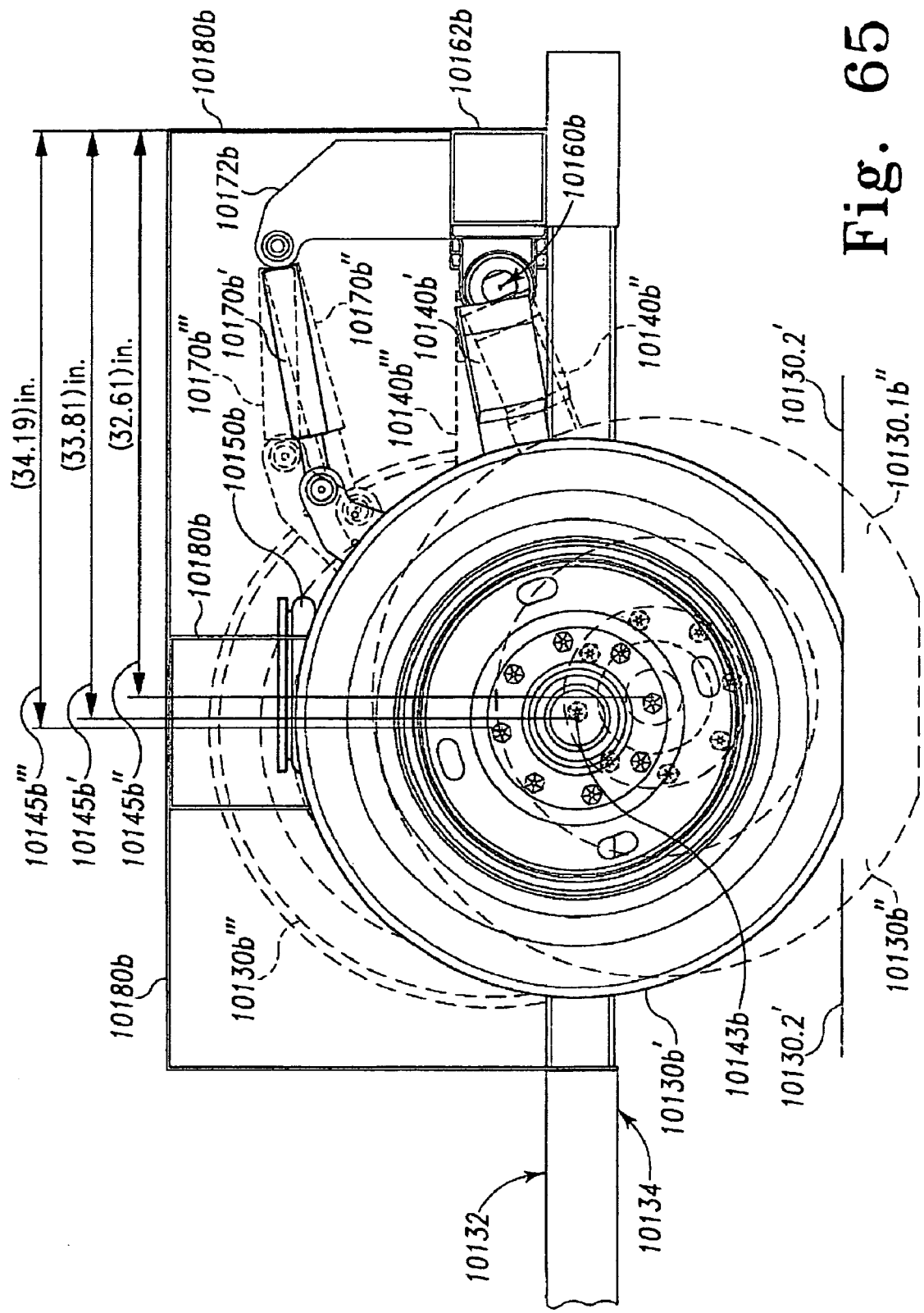

FIG. 65 is a right side elevational view of a portion of the system of FIG. 63.

Figure 66:
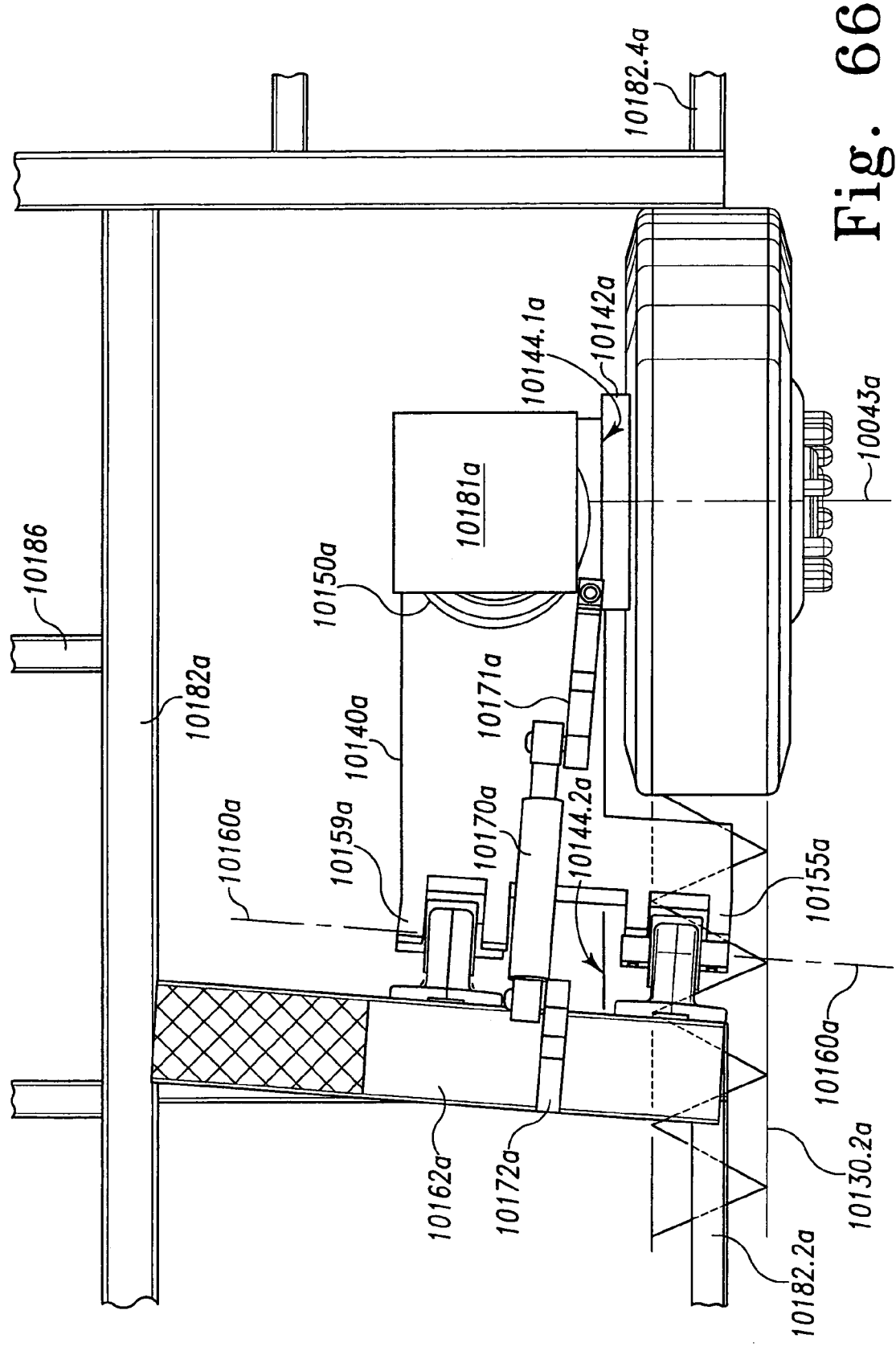

FIG. 66 is a top plan view of the suspension of FIG. 64.

Figure 67:
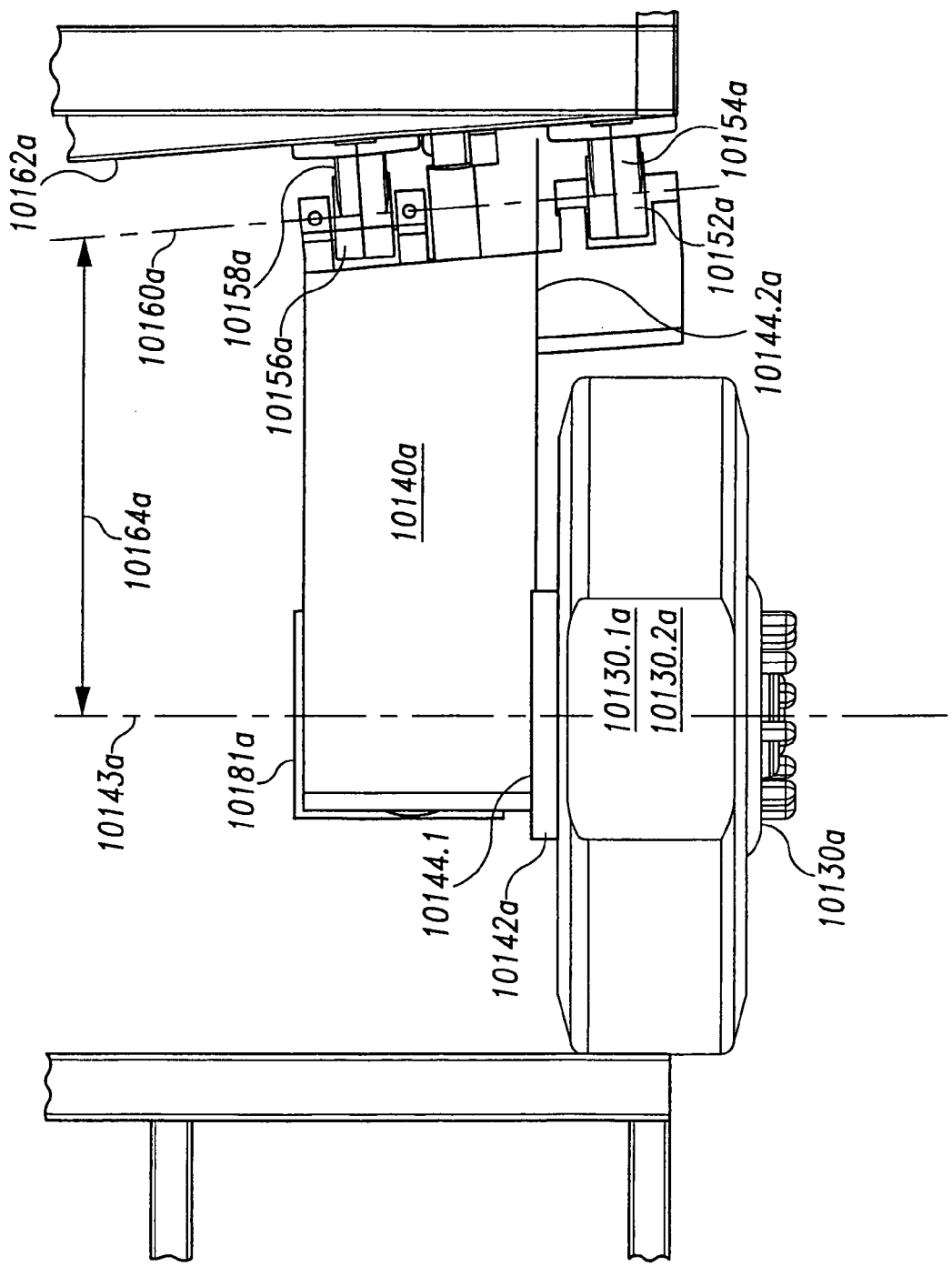

FIG. 67 is a bottom plan view of the suspension of FIG. 66.

Figure 68:
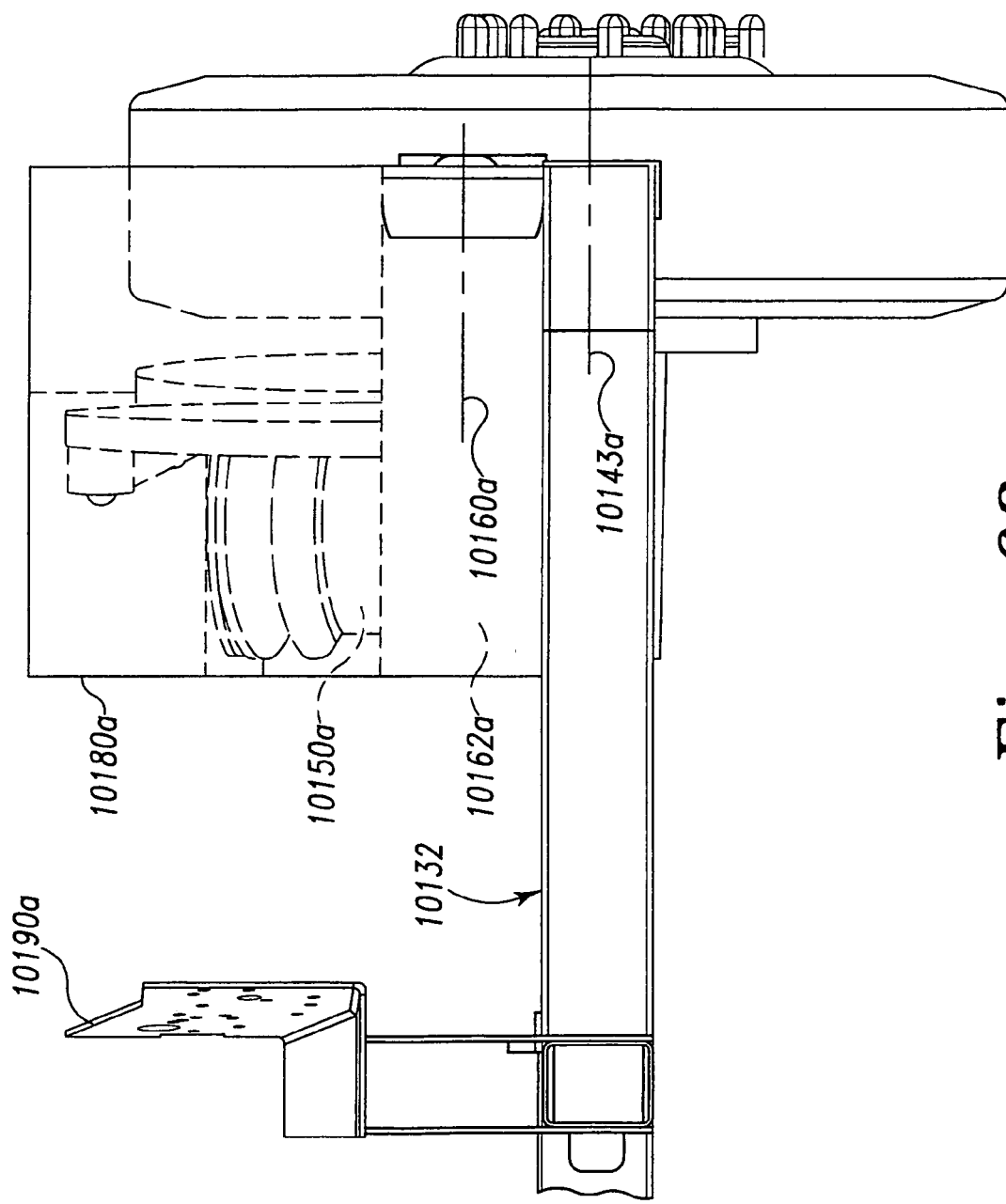

FIG. 68 is a frontal elevational view of a portion of the system of FIG. 60.

Figure 69:
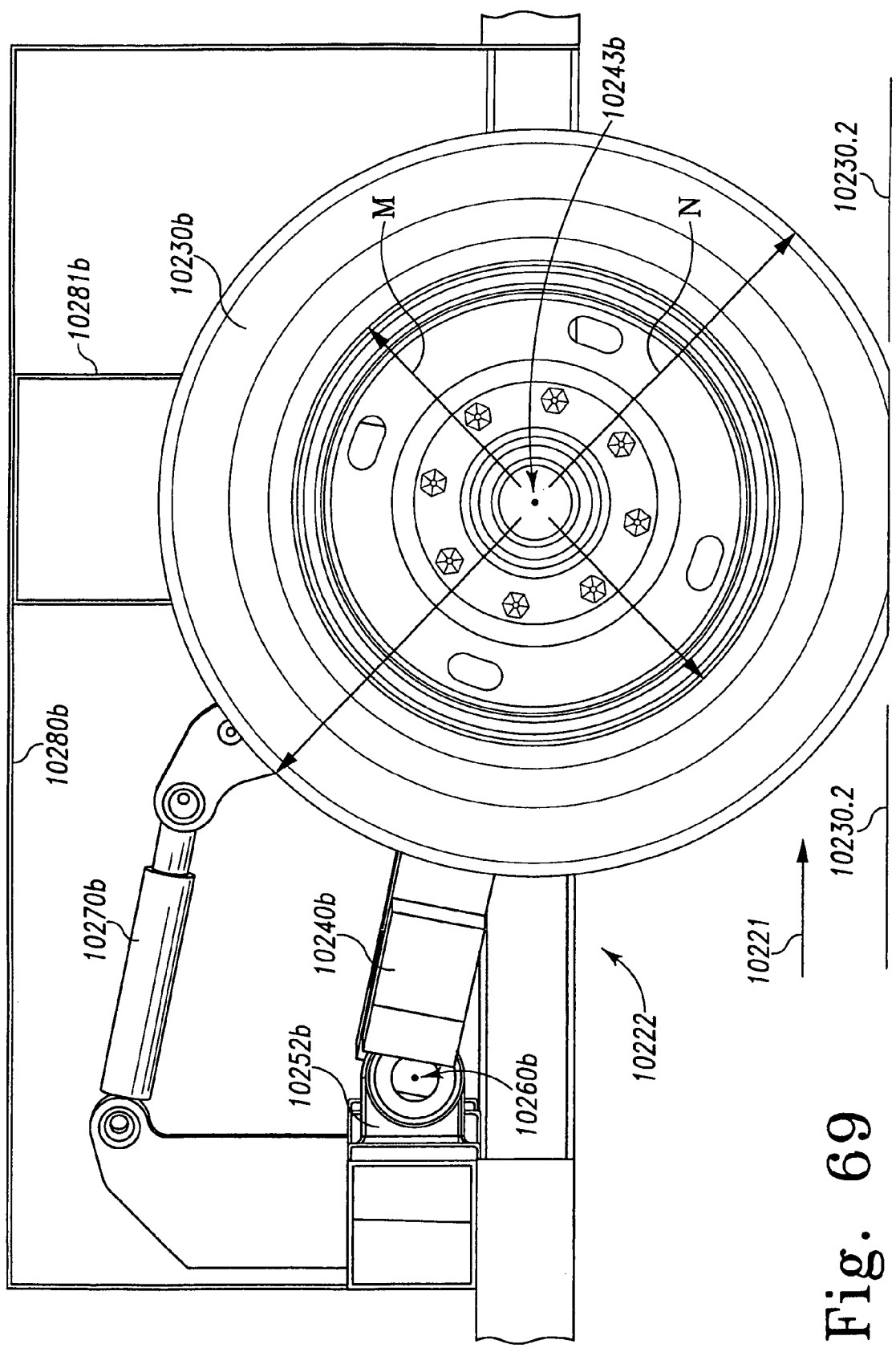

FIG. 69 is a side elevational view of a portion of a frame and suspension according to another embodiment of the present invention.

Figure 70:
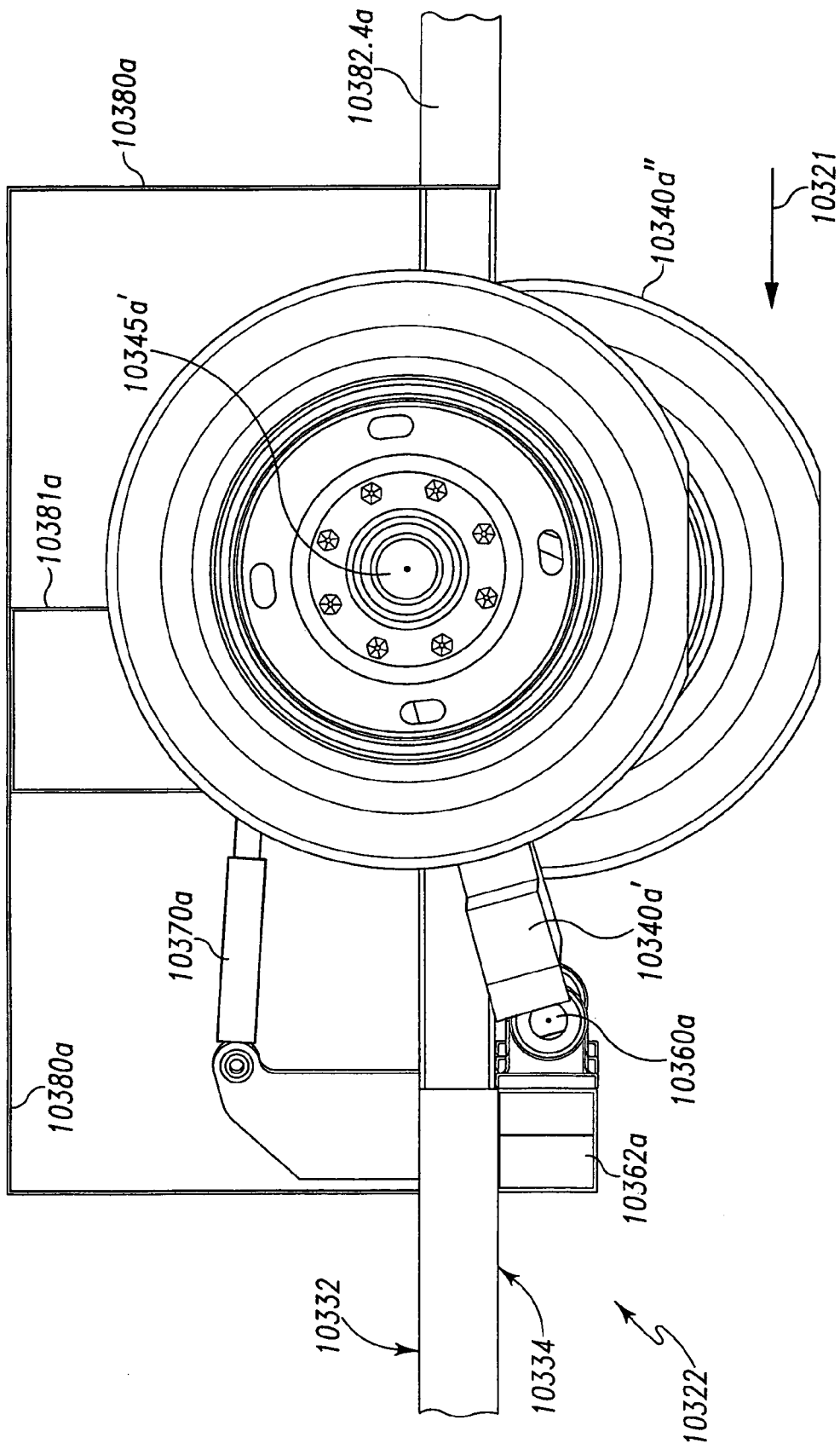

FIG. 70 is a side elevational view of a frame and suspension according to another embodiment of the present invention, with the tire being shown in two positions.

Figure 71:
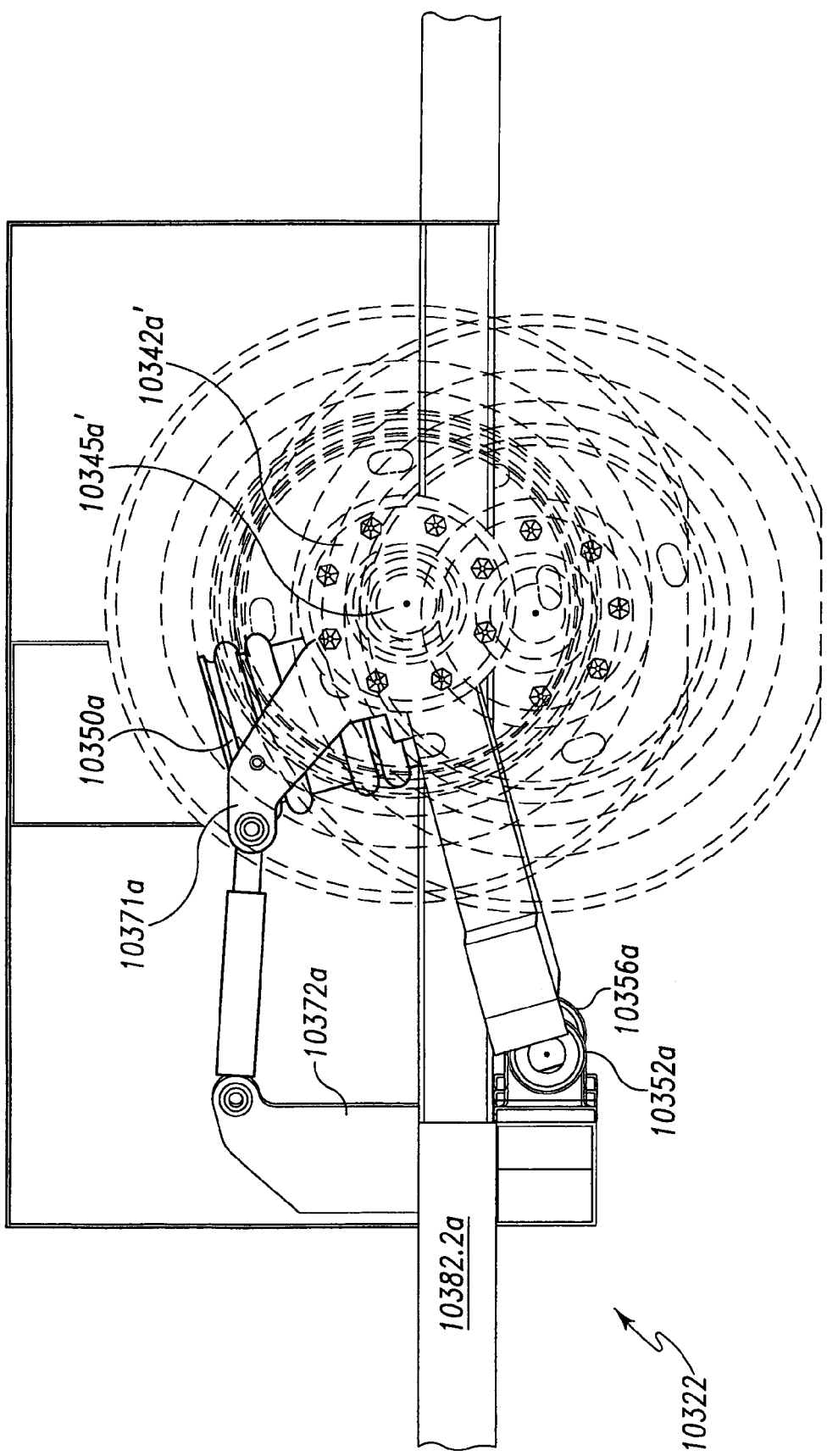

FIG. 71 is the view of FIG. 70 with the tire made transparent.

Figure 72:
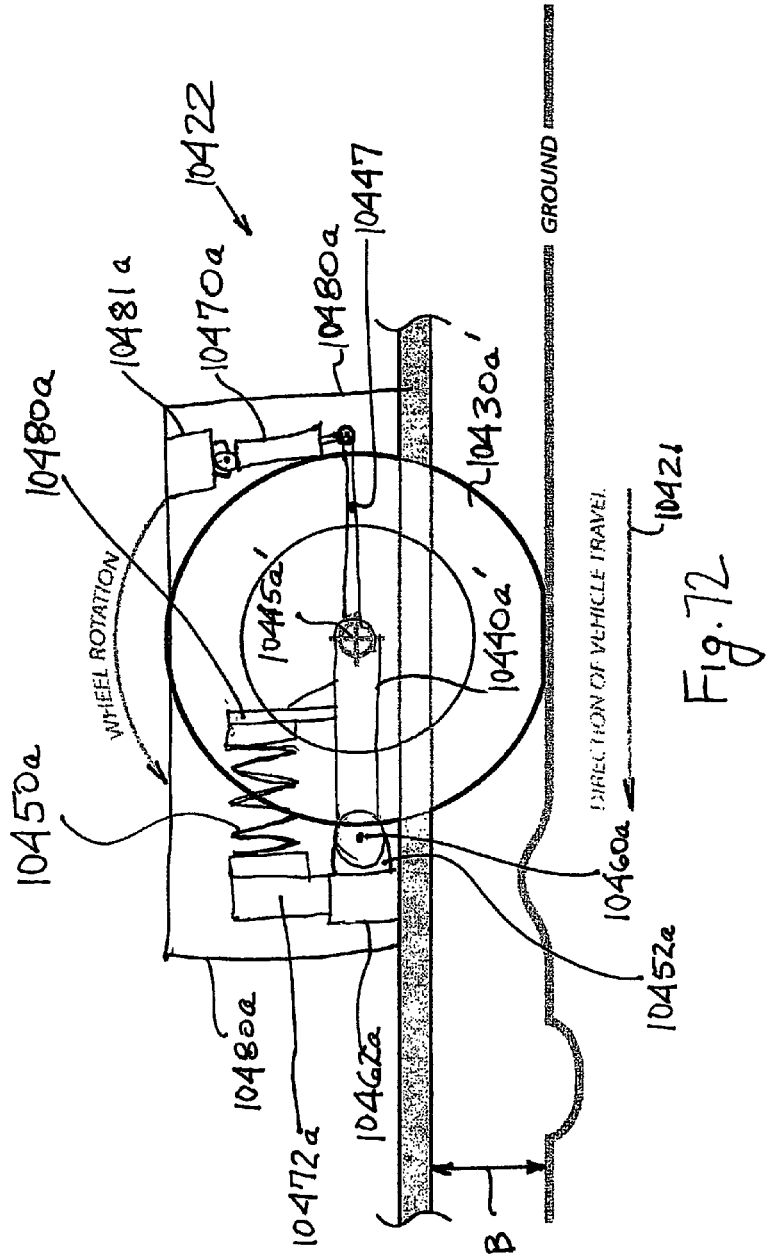

FIG. 72 is a side elevational schematic representation of a portion of a frame and suspension according to another embodiment of the present invention.

Figure 73:
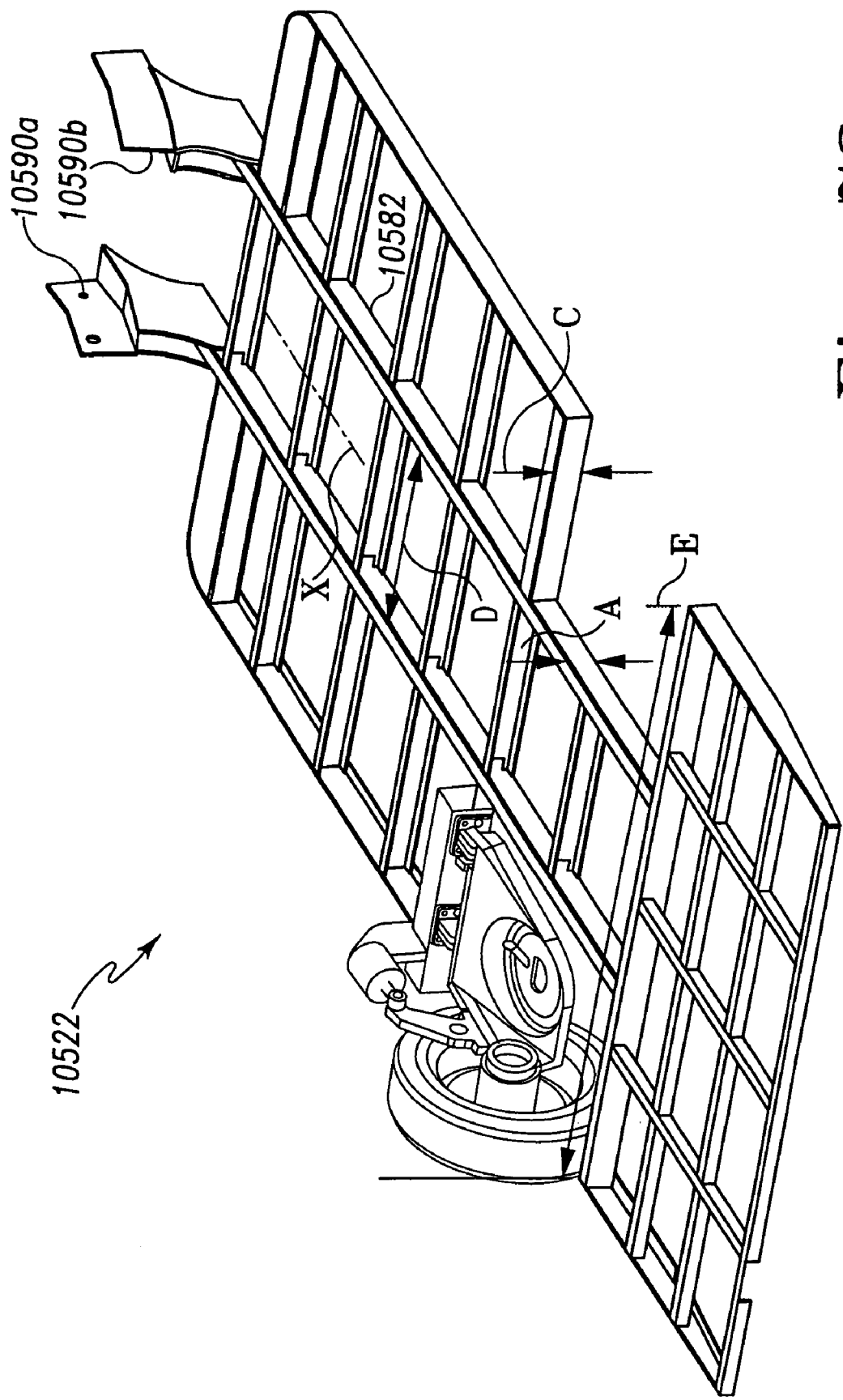

FIG. 73 is a rear, top, and right side perspective view of a frame and suspension according to another embodiment of the present invention.

Figure 74:
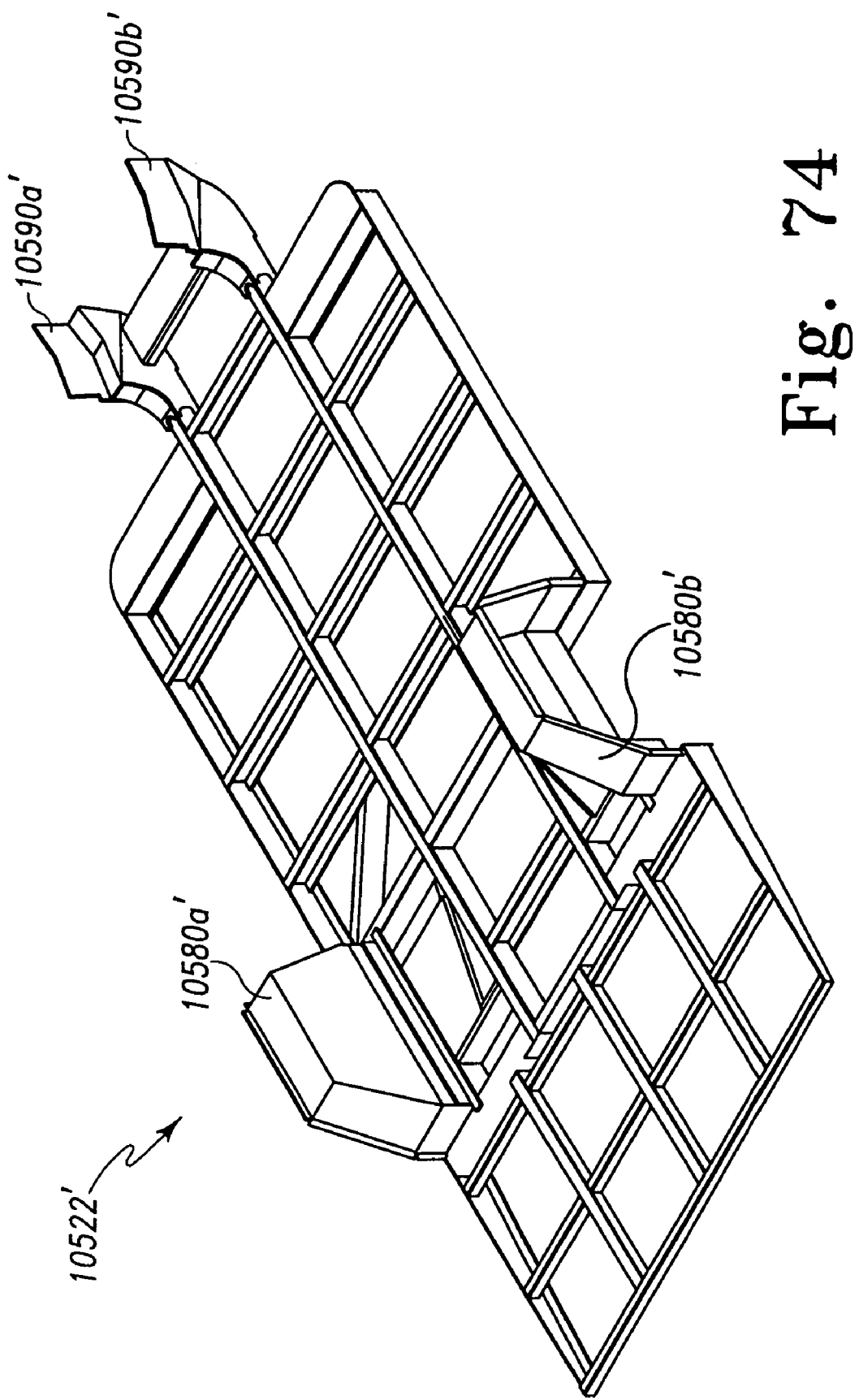

FIG. 74 is a top, rear, and right side perspective view of a frame according to another embodiment of the present invention.

Figure 75:
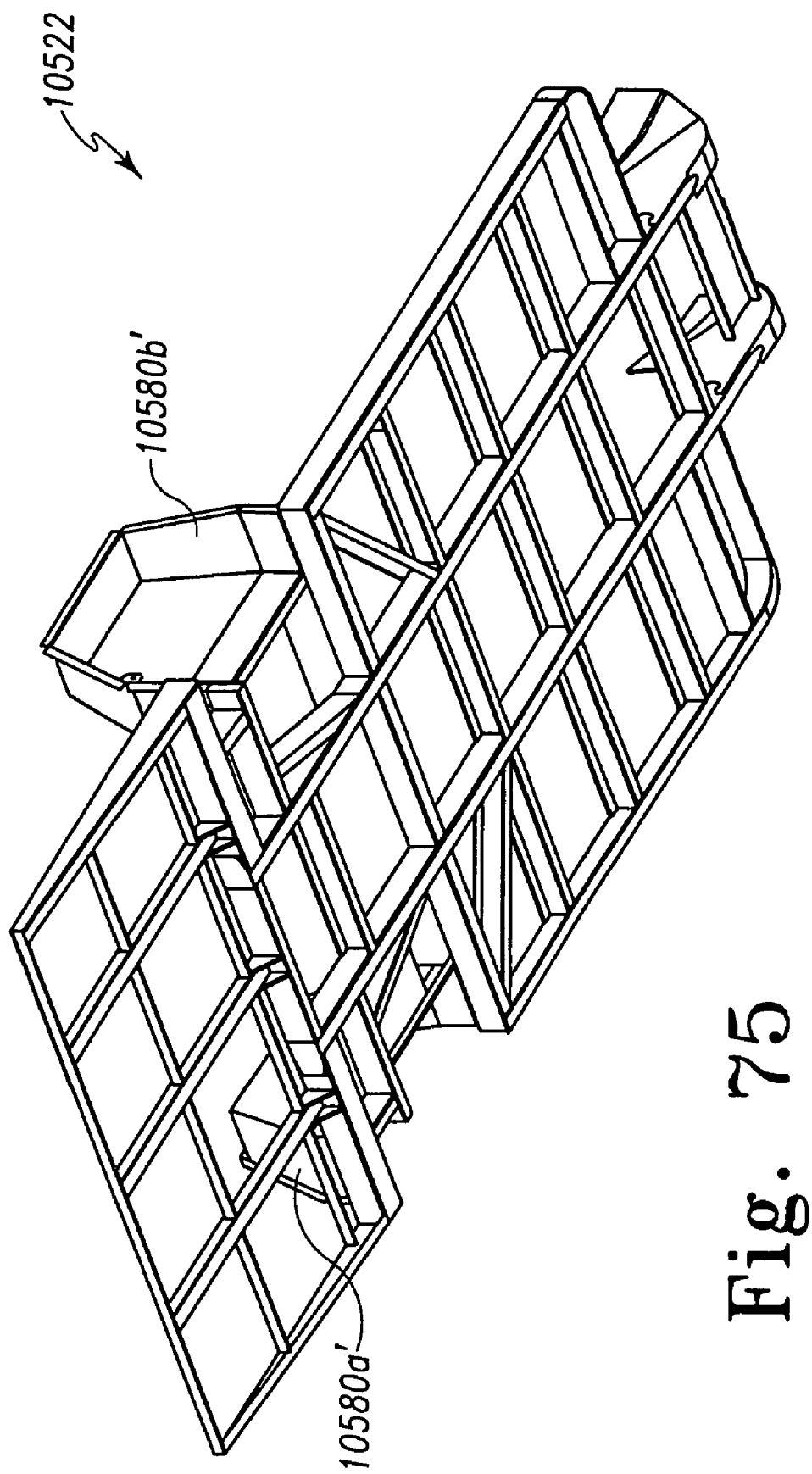

FIG. 75 is a bottom, rear right side view of the frame of FIG. 74.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

This document incorporates by reference U.S. Pat. No. 6,398,251 issued Jun. 4, 2002, and also U.S. Patent Application Publication No. 2002/0105170, published Aug. 8, 2002.

As used herein, the terms "lateral" and "transverse" refer to a direction that is generally perpendicular to the longitudinal axis of the vehicle and also generally horizontal. The term "rolling" refers to rotational movement about an axis that is generally parallel to the longitudinal axis. The term "pitching" refers to rotational movement about an axis that is generally transverse to the vehicle longitudinal axis. The term "yawing" refers to rotational movement about a vertical axis. The term "inboard" and "outboard" refer to positions that are closer to and further from, respectively, the vehicle longitudinal axis. The terms "front" and "rear" have their conventional meanings for a vehicle. The term "vehicle" as used herein refers to any type of land transport vehicle, including trucks, buses, vans, automobiles, motorhomes, and towed trailers, including vehicles that have been converted from one type of vehicle to a different type of vehicle by incorporation of any of the embodiments of the inventions herein.

The present invention provides a wheel suspension system which has a low profile and permits placement of the chassis floor below the rotational axes of the wheels. In one embodiment the suspension system utilizes a pair of support arms that are pivotally connected with the vehicle frame, preferably by pivotal attachment to a frame member. In another embodiment, the pivot axes are generally parallel with the longitudinal axis of the frame, such that the pivotal motion of the dual support arms is generally rolling motion relative to the vehicle. In other embodiments, the pivotal axes are angled relative to the frame longitudinal axis such that the pivotal motion of the support arms is a combination of rolling and pitching relative to the frame.

The suspension system preferably includes a spindle support which in some embodiments is pivotally connected to each of the support arms. The spindle support attaches to a stub axle spindle which rotatably supports one or more wheels. The dual support arms and spindle support are arranged and configured such that the rotational axis of the wheel is preferably located above the floor of the frame when the vehicle is located on a level surface and during typical transporting. Some embodiments of the present invention maintain a low payload floor (beneath the rotational axes of the rear wheels) for the cargo or payload section of the vehicle when the vehicle is transporting objects or people (i.e., when it is moving). Yet other embodiments of the present invention maintain the top surface of the frame below the rotational axes of the rear wheels when the vehicle is transporting objects or people.

In some embodiments the dual suspension arms include a lower arm and an upper arm. The suspension system utilizes one or more springs which are preferably located between a lower spring support of the lower support arm and an upper spring support on the bottom of the chassis floor. Preferably, the springs extend through one or more passageways or apertures in the upper arm. The present invention contemplates any type of spring for biasing the support arms from the chassis, including coil springs, air springs, leaf springs, and the like.

In some embodiments, the suspension system includes a dampener such as a shock absorber, air over oil actuator, oil over oil actuator, airbag, friction dampener, or the like for dampening the oscillatory motion of the suspension system. In one embodiment, one end of the dampener is pivotally attached to the spindle support and the other end of the shock absorber is pivotally attached to a portion of the frame such as the wheel housing. In these embodiments, the shock absorber is substantially vertical in orientation. In other embodiments, one end of the shock absorber is pivotally attached to an inboard portion of either the upper support arm or the lower support arm. The other end of the shock absorber is pivotally mounted to a portion of the frame which is under the floor of the chassis. In some of these embodiments, the shock absorber is generally transverse to the longitudinal axis of the frame.

In some embodiments of the present invention, the frame floor is placed below the rotational axis of the wheels. In some embodiments, the sidewalls of the vehicle are placed outboard so as to maximize the internal width of the chassis for carrying a payload. In some embodiments this combination of low floor and outboard side structures result in an outboard corner of the chassis being located near the upper pivotal support arm. In these embodiments, the upper pivotal support arm preferably includes a generally outwardly-placed dog leg bend adapted and configured such that the upper pivotal support arm has a concave shape when viewed from above. This dog leg bend provides relief clearance between the upper pivotal support arm and the lower outboard corner of the chassis when the wheel moves upwardly (jounce).

The use of an MN-prefix (MNXX) in front of an element number (XX) indicates an element that is the same as other elements with the same suffix (XX), except for the changes which are shown or described.

FIGS. 49-53 show various examples of different vehicles incorporating one or more embodiments of the present invention. FIG. 49 shows a vehicle such as a van 1021 which includes a cargo section 1027 placed on top of a suspension system 1020 according to one embodiment of the present invention. The tires 1023 and corresponding wheels 1022 are located outboard of the inner dividing panels 1037.2 of wheel housings 1037. FIG. 50 shows a trailer 2021 having a cargo section 2027 placed on top of a suspension system 2020 according to another embodiment of the present invention. The floor 2027.1 of payload section 2027 sits on top of the top surface 2035 (not shown) of frame 2030.

FIG. 51 shows a bus 3021 incorporating a suspension system 3020 and vehicle frame 3030 according to another embodiment of the present invention. The payload section 3027 is arranged as a shuttle bus. Frame 3030 is rigidly coupled to a front subframe (not shown) that supports the driver section 3028. FIGS. 52 and 53 show an example of a converted vehicle 4021 according to another embodiment of the present invention. A rear suspension system 4020 and rear vehicle frame 4030 are rigidly coupled, such as by a plurality of fasteners, to the front frame of a cab section 4028 from another vehicle. Cab section 4028 includes a pair of powered, steerable front wheels 4029. Referring to FIG. 53, rear frame 4030 includes a top surface 4035 which is substantially planar and adapted and configured to support a payload or cargo section. The floor of the payload section is located on top of the top surface of the rear frame. Non-limiting examples of the payload section include the section for an ambulance and a section for a shuttle bus.

A chassis section according to one embodiment of the present invention preferably is rigidly coupled to a cab section having a high profile sub-frame and floor. The cab section preferably includes steerable front wheels, an engine to drive the front wheels, and a driver's seat and controls. In one embodiment of the present invention the cab section is separated from an existing vehicle which typically includes a high profile frame throughout the length of the existing vehicle. The center and rear portion of the high profile frame section of the existing vehicle is separated from the cab section, and the low profile chassis section according to an embodiment of the present invention is rigidly coupled to the high profile cab section, resulting in a new vehicle.

A separate payload section, such as an ambulance compartment, passenger compartment, or cargo compartment can be coupled to the top of the center and rear chassis section and also to the rear of the cab section. The payload compartment can have a floor that is close to the roadway by placement of the top surface of the underlying chassis section below the rotational axes of the rear wheels, in the case of an ambulance compartment, having a low floor permits easier entrance and exit from the compartment as compared to a standard ambulance with a high profile floor. A low profile chassis according to some embodiments of the present invention permits easier movement of wheelchairs and gurneys into and out of the ambulance compartment. As another example, a payload compartment for carrying passengers around airports and hotels can have a low profile floor which makes ingress and egress easier for elderly and handicapped passengers. As another example, a payload compartment comprising a low profile floor cargo compartment such as for a short haul delivery truck permits the delivery person to bring cargo into and out of the compartment with less fatigue. A payload compartment attached to a chassis according to the present invention can also have a lower overall height than an existing vehicle with high profile chassis, yet have a useful interior height from floor to ceiling that is about the same as for an existing vehicle. Therefore the present invention permits the use of a payload compartment with a large interior that can pass underneath a low hanging obstruction, such as those found at the arrival and departure areas of some hotels.

Some embodiments of the present invention are directed toward a vehicle chassis incorporating unpowered, non-steerable rear wheels. However, the present invention contemplates that the various elements and features shown and described herein are also applicable to powered rear wheels, such as those shown in U.S. Pat. No. 6,702,059, issued Mar. 9, 2004 to Bartel; and also those shown in U.S. patent application Ser. No. 2003/0010561, published Jan. 16, 2003, by inventor Bartel. Both of these documents are incorporated herein by reference.

Further, although what is shown and described herein includes various embodiments in which one or more features are located either below the flow of the payload section or beneath the top surface of the frame, the present invention also contemplates those embodiments in which the elements and features disclosed and described herein are placed above the floor or above the top surface, and also those embodiments in which the elements and features shown and described herein can be placed above the rotational axis of the supported wheel.

In some of the descriptions to follow, reference will be made to a single wheel suspension system shown supporting a single wheel from a roadway. However, the present invention contemplates a suspension system which can support multiple wheels in tandem. Further, it is understood that the present invention also contemplates those embodiments in which there are mirror image suspension systems on the other side of the frame, and/or other wheel suspension systems on the same side of the frame.

FIGS. 1-5 show a wheel suspension system 120 according to one embodiment of the present invention. These figures show a portion of a vehicle 121 which includes a tire 123 and wheel 122 which are rotatably supported by a spindle 183. The direction of forward travel for vehicle 121 is indicated by arrow 125. Direction of forward travel 125 is parallel to the longitudinal axis of the chassis (not shown). A tire 123 coupled in conventional manner to wheel 122 supports a portion of vehicle 121 from a roadway. Spindle 183 is attached, such as by fasteners, in a cantilevered manner to a spindle support 180 which is pivotally coupled to a lower pivotal support arm 160 and an upper pivotal support arm 140. A braking assembly 126, such as a caliper for a disk brake, is attached to spindle support 180. Spindle support 180 is also shown in FIGS. 44a, 44b and 44c. FIG. 44 also shows a close up, cutaway view of a spindle support 5080 coupled by fastening means 5084 to a stub axle and spindle 5083. In some embodiments of the present invention, wheel 122 is not powered to rotate. However, other embodiments of the present invention contemplate an engine providing power to a rear axle or stub axle. One example of a stub axle or rear axle provided with power is shown in U.S. Pat. No. 6,702,059. In some embodiments of the present invention, wheel 122 is constrained from being steerable.

Referring to FIGS. 44a, 44b, and 44c, a spindle support 180 is shown to include a preferably central, vertical section 182 for connection to spindle 183. Spindle 183 couples to support 180 by spindle attaching means 184. Means for attaching spindle 184 to support 180 includes fasteners, an interference press fit, welding, brazing, and also other methods currently used in this field of technology. Located to either the right or left sides of support 180, referring specifically to FIG. 44a, are support lateral sections 181.1 and 181.2. These lateral sections include provisions for pivotal attachment to the upper and lower support arms. Although the spindle connection section 182 has been shown located inbetween lateral sections 181 and 182, the present invention also contemplates those embodiments in which both lateral sections (and therefore the pair of upper pivots and the pair of lower pivots) are both located to one side of vertical section 182.

Figure 1:
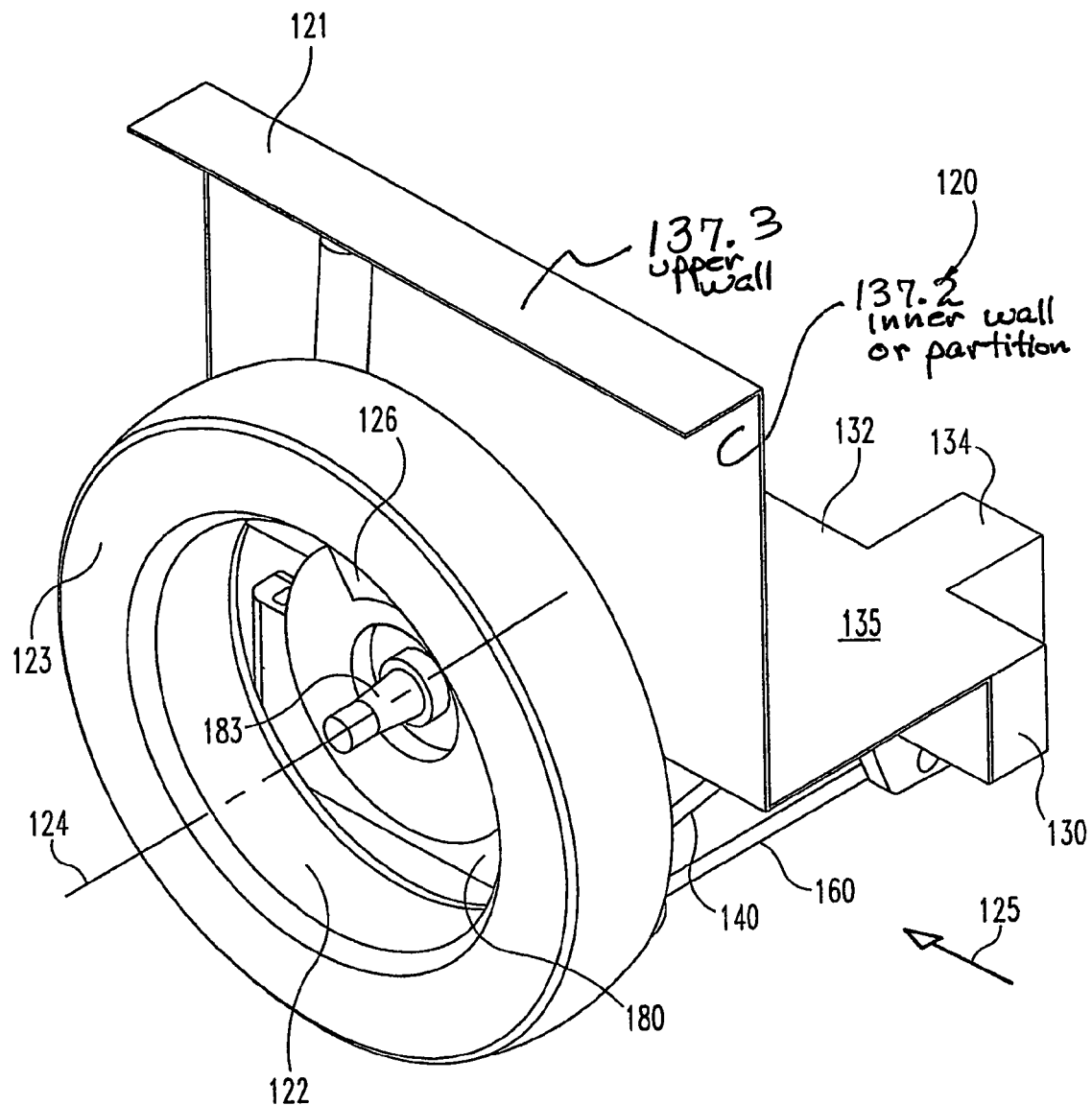
FIG. 1 is a top, rear, and left side perspective view of a wheel suspension system according to one embodiment of the present invention.
Figure 2:
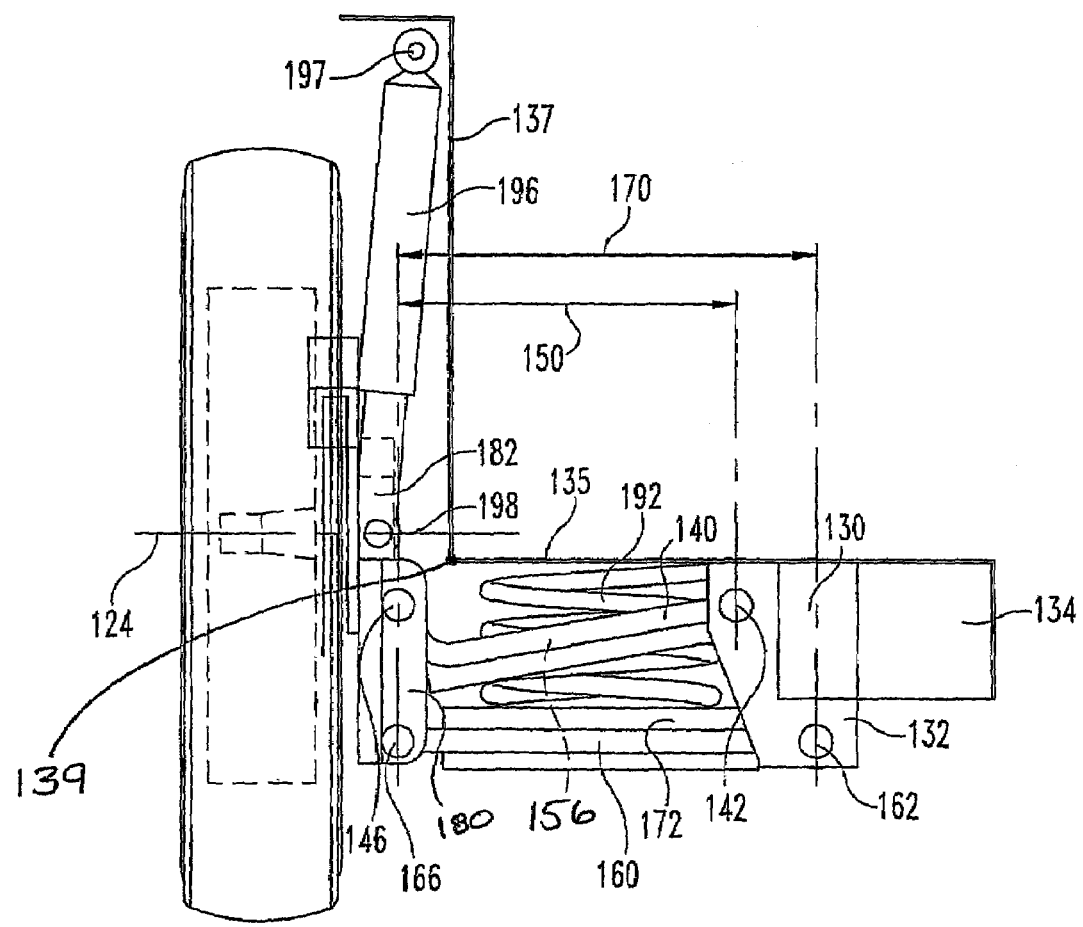
FIG. 2 is a rear elevational view of the suspension system of FIG. 1.
Figure 3:
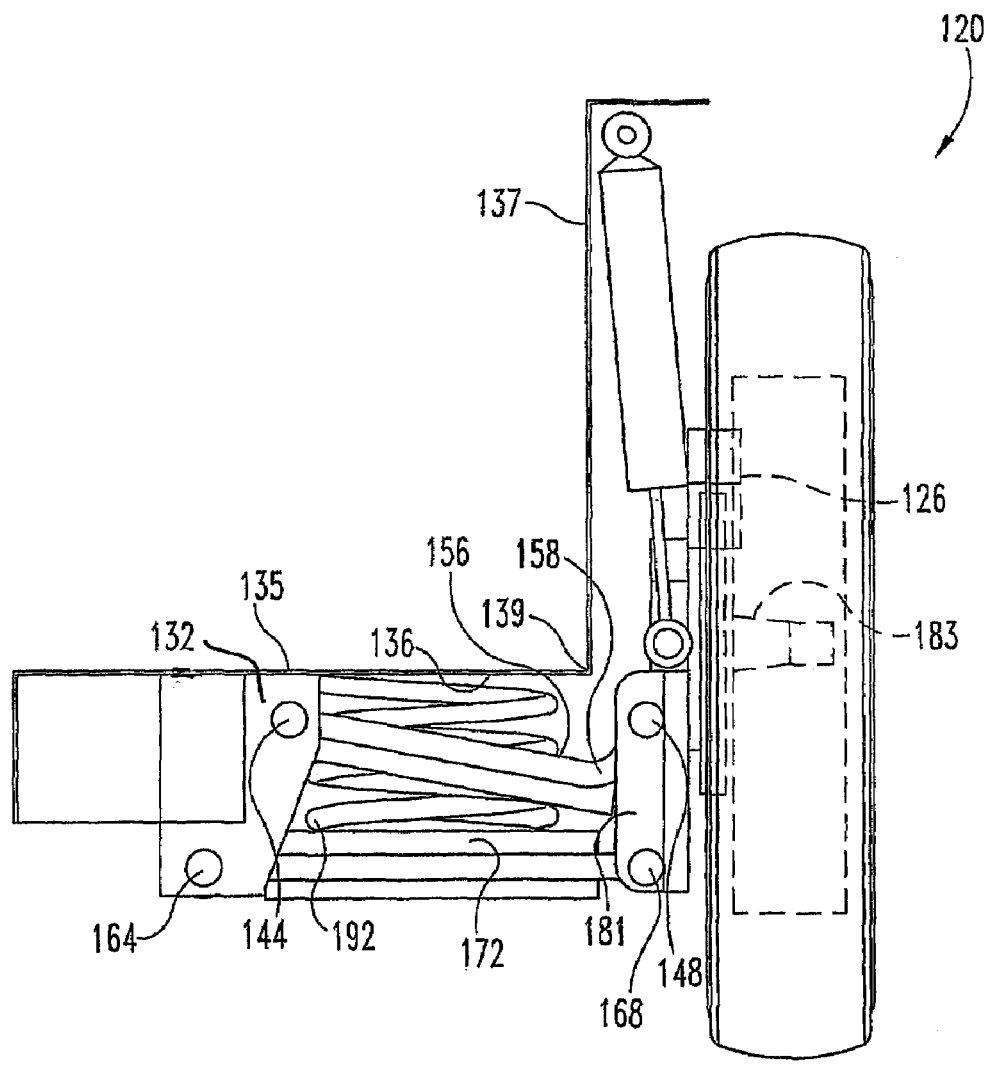
FIG. 3 is a front elevational view of the suspension system of FIG. 1.
Figure 4:
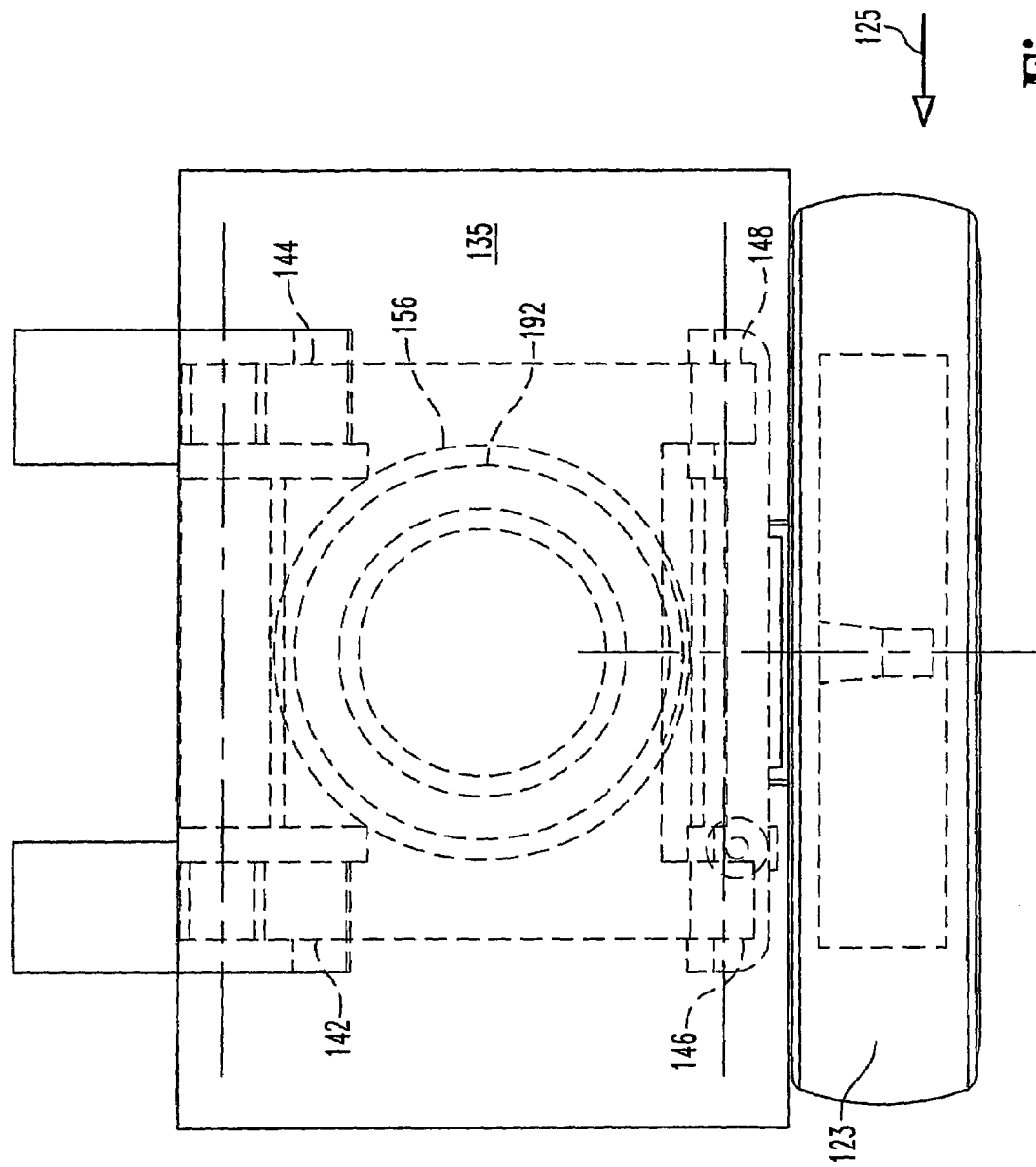
FIG. 4 is a top plan view of the suspension system of FIG. 1.

As best seen in FIGS. 2 and 3, a spring 192 is located within suspension system 120. One end of spring 192 is supported against the underside 136 of chassis floor 135. The other end of spring 192 acts against a lower spring support 172 which is preferably integral with lower support arm 160. Spring 192 urges lower support arm 160 away from chassis floor 135. The present invention also contemplates those embodiments in which one end of the spring is supported against a supporting portion of upper support arm 140, with the other end of the spring acting against an upper spring support coupled to the chassis floor. Further, the present invention contemplates those embodiments in which the upper end of the spring is supported by any portion of vehicle frame 130, including wheelhousing 137.

Referring again to FIGS. 2, 3, and 4, in one embodiment upper support arm 140 includes a passageway or aperture 156 through which a portion of spring 192 passes. Preferably, the outboard front and outboard rear pivot joints 146 and 148, respectively, are spaced apart from each other and are located fore and aft, respectively, of spring 192, and also outboard of spring 192. Further, the inboard front and inboard rear pivot joints 142 and 144, are spaced apart from each other and are respectively, are located fore and aft, respectively, of spring 192, and also located inboard of spring 192. Although a particular location of spring 192 and pivot arm spring passageway 156 have been shown and described, the present invention is not so limited, and contemplates alternate placement of the pivot joints relative to spring 192 and aperture 156, including those embodiments which all of the spring or a portion of the spring is located inboard of the inboard pivot joints, and also those embodiments in which all of the spring or a portion of the spring is located outboard of the outboard pivot joints.

As used herein, the term "pivot joint" refers to an assembly of both static and rotating components and preferably also male and female components. As one example, the portion of the pivot joints pivoting with the support arm can be either male or female. Likewise, the portion of the pivoting joint attached to frame 130 or spindle support 180 can be either male or female and is complementary to the pivot joint portion of the support arm. For example, the static portion of the inboard pivot joints can be male or female members attached to a frame member that is generally parallel with the longitudinal axis of the vehicle. In other embodiments, the static portion of the pivot joint can be male or female members coupled to a transverse member of the vehicle frame. The present invention contemplates any type of pivotal coupling, including single degree of freedom couplings utilizing elastomeric elements, low friction organic material elements (such as nylon bushings) and metallic bearings, as well as two degree of freedom ball joints or other multi degree of freedom joints.

As best seen in FIGS. 2 and 3, upper support arm includes a dog leg portion 158 for providing clearance between support arm 140 and lower outboard corner 139 of frame 130. In some embodiments dogleg portion 158 provides clearance from the portion of wheel housing 137 that is proximate to the upper support arm and proximate to the spindle support. Referring to FIG. 2, it can be seen that as upper support arm 140 pivots in a radius about inboard front pivot joint 142 such that the distal end of arm 140 can pivot to a location where corner 139 of the wheel housing is inbetween a line connecting pivot joints 146 and 142. Without a dogleg portion 158, some embodiments of upper support arm 140 would thereby contact corner 139. Dogleg portion 158 prevents the contact from occurring, and also permits the designer to place the inboard panel 137.2 as outboard as possible so as to increase the interior room of the payload or cargo section of the vehicle.

When viewed from above, upper support arm 140 is seen as shaped concavedly downward. This dog leg portion or relief bend 158 provides clearance between support arm 140 and chassis outboard corner 139 during upward movement of suspension system 120. The present invention contemplates other adaptations for providing clearance, including rounding-off or "chamfering" of the frame in the vicinity of corner 139. The present invention also contemplates other shapes for the upper support arm, including upper support arms that include a notch.

Figure 5:
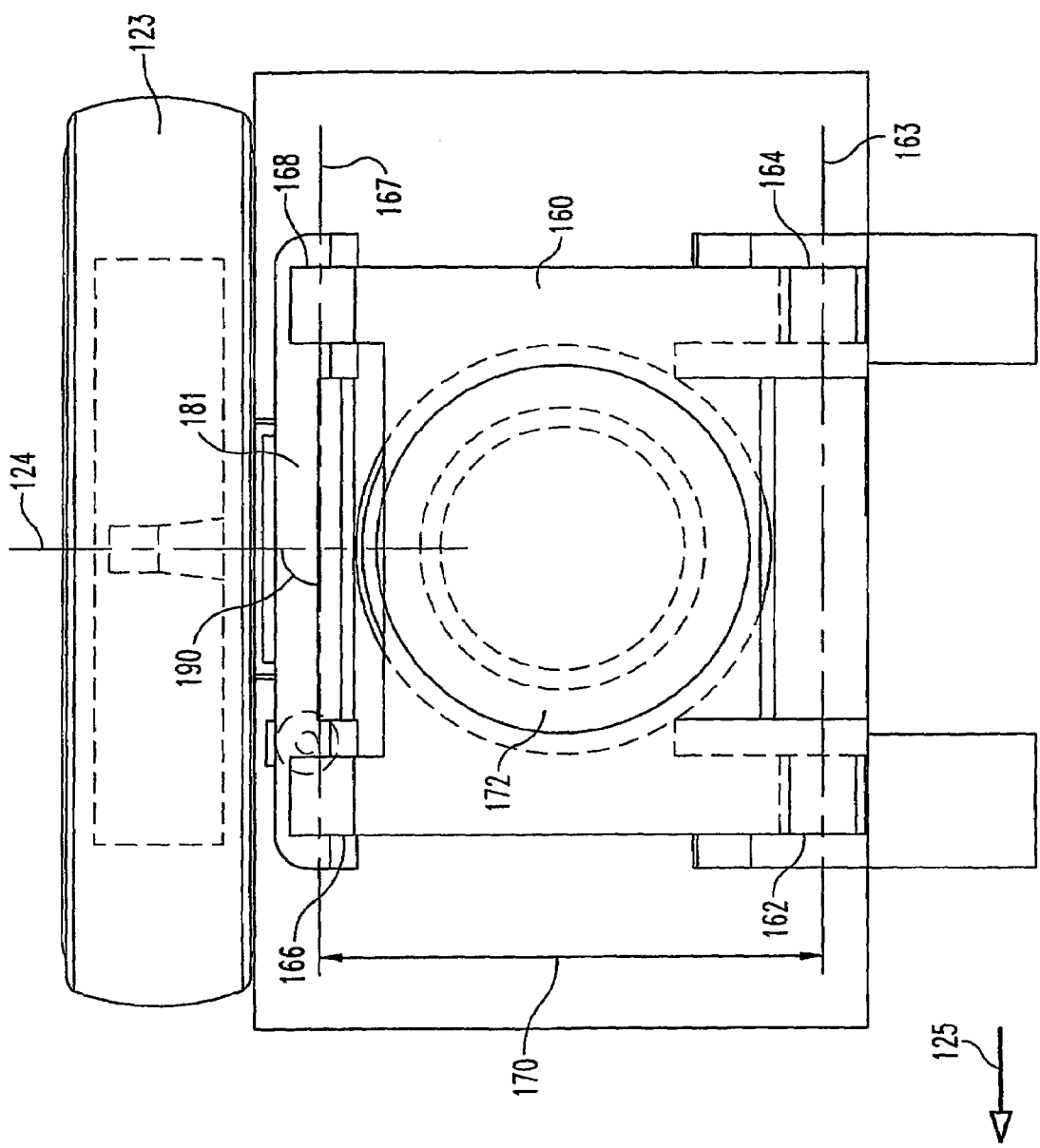
FIG. 5 is a bottom plan view of the suspension system of FIG. 1.
Figure 6:
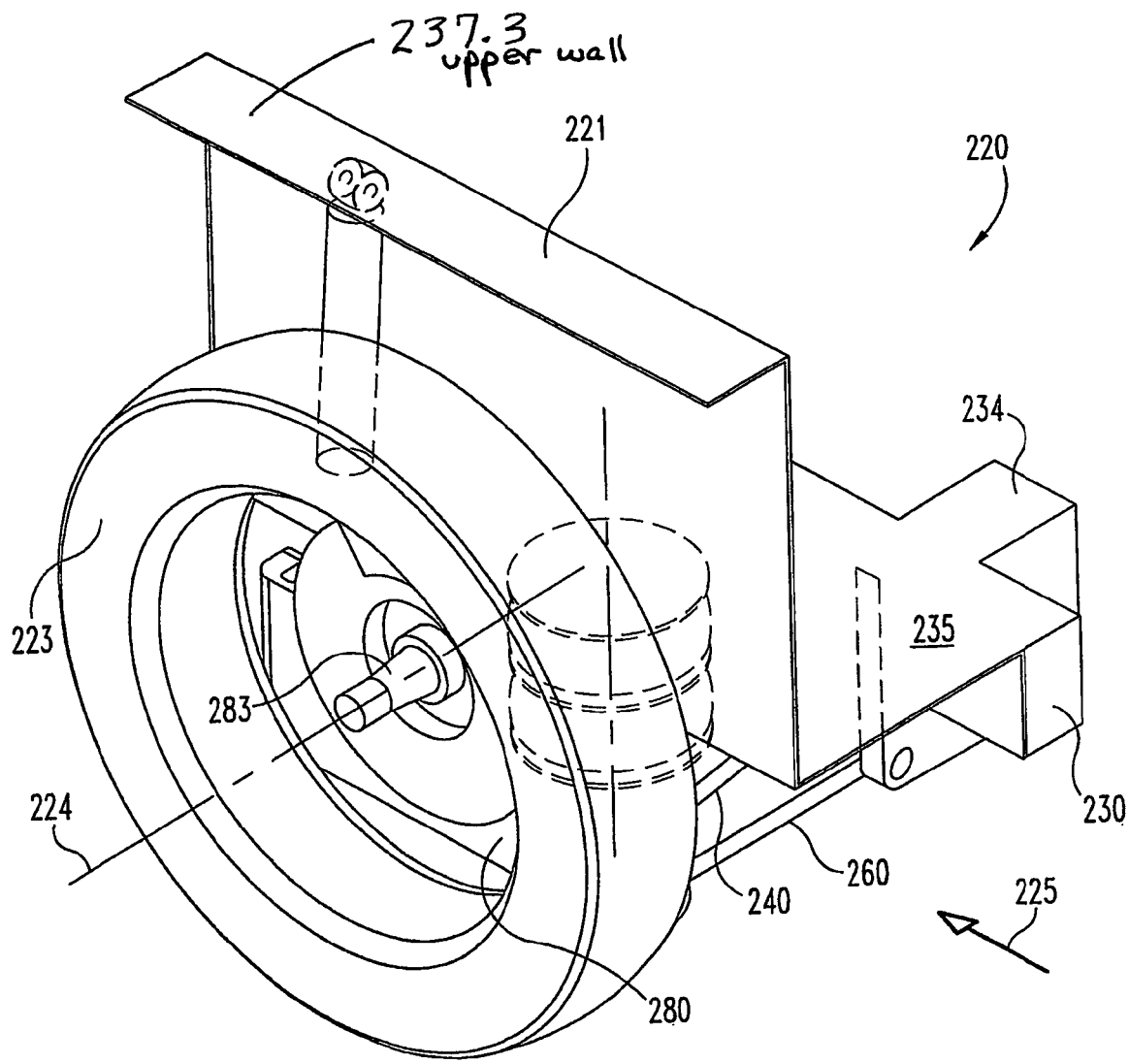
FIG. 6 is a top, rear, and left side perspective view of a wheel suspension system according to another embodiment of the present invention.

Referring to FIGS. 2, 3, and 5, lower support arm 160 includes a pair of inboard pivot joints 162 and 164, respectively, which are located fore and aft, respectively, of lower spring support 172. Support arm 160 further includes a pair of outboard front and rear pivot joints 166 and 168, respectively, located fore and aft, respectively, of spring support 172, and also located outboard of spring 192. Although a specific placement of the pivot joints for the lower support arm relative to the spring and spring support has been shown and described, the present invention is not so limited, and contemplates other configurations of pivot joint.

Although what has been shown and described are upper support arms and lower support arms, each pivotally coupled to the vehicle frame in two locations and each pivotally coupled to the spindle support at two locations, the present invention contemplates other configurations of pivotal attachment. For example, the present invention contemplates lower and upper support arms in which one or both of the arms have single pivotal attachments to the vehicle frame, and/or single pivotal attachments to the spindle support. As further examples, the present invention contemplates embodiments in which either of the support arms have a total of three pivotal attachments, or a total of two pivotal attachments. In the case of a support arm having only two pivotal attachments, it may be helpful to include a guiding member, such as a control arm, which restrains movement of the support arm from yawing or any other unwanted pivotal motion.

As can best be seen in FIGS. 2 and 3, the distance 150 between the outboard front pivot axis 147 and the inboard front pivot 143 of upper support arm 140 is less than the distance 170 between the outboard front pivot axis 167 and the inboard front pivot axis 163 of lower support arm 160. Further, the upper outboard pivot axis 147 of pivot joints 146 and 148 are preferably aligned generally above the lower outboard pivot axis 167. The upper inboard pivot axis 143 is preferably located outboard of the lower inboard pivot axis 163. The support arms of suspension system 120 are parallel but of different length. The difference in length provides for a change in wheel camber as the suspension arms roll up and down.

A suspension system 220 according to another embodiment of the present invention is shown in FIGS. 6-10.

Figure 7:
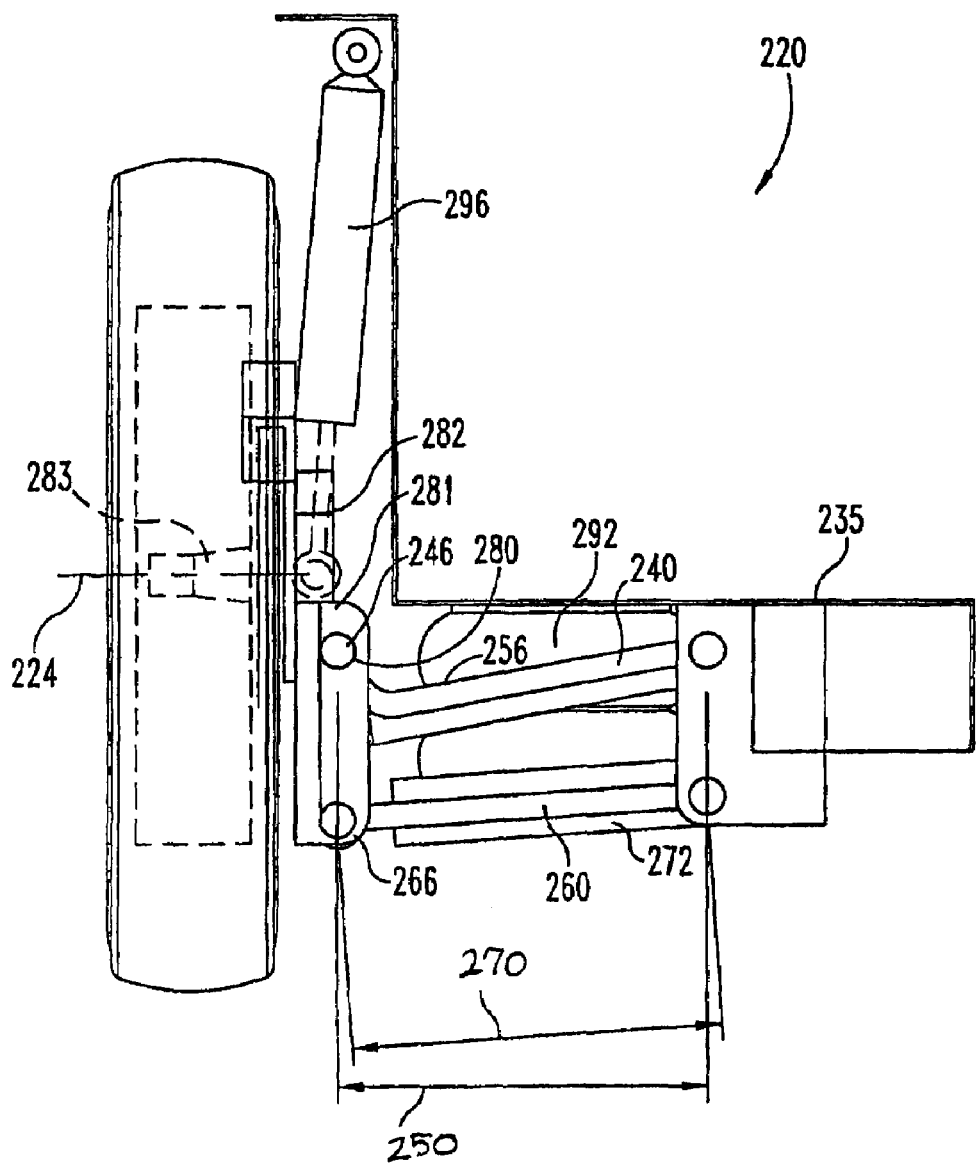
FIG. 7 is a rear elevational view of the suspension system of FIG. 6.
Figure 8:
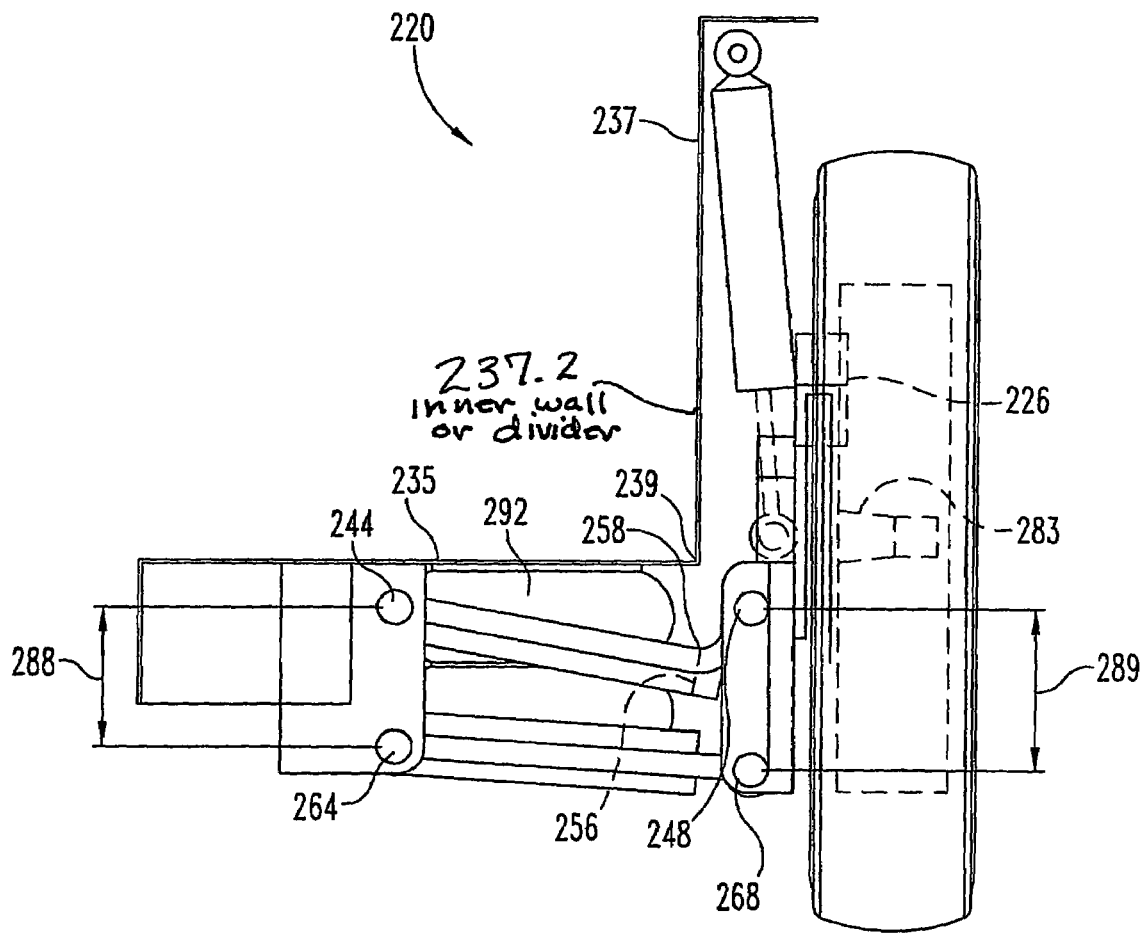
FIG. 8 is a front elevational view of the suspension system of FIG. 6.
Figure 9:
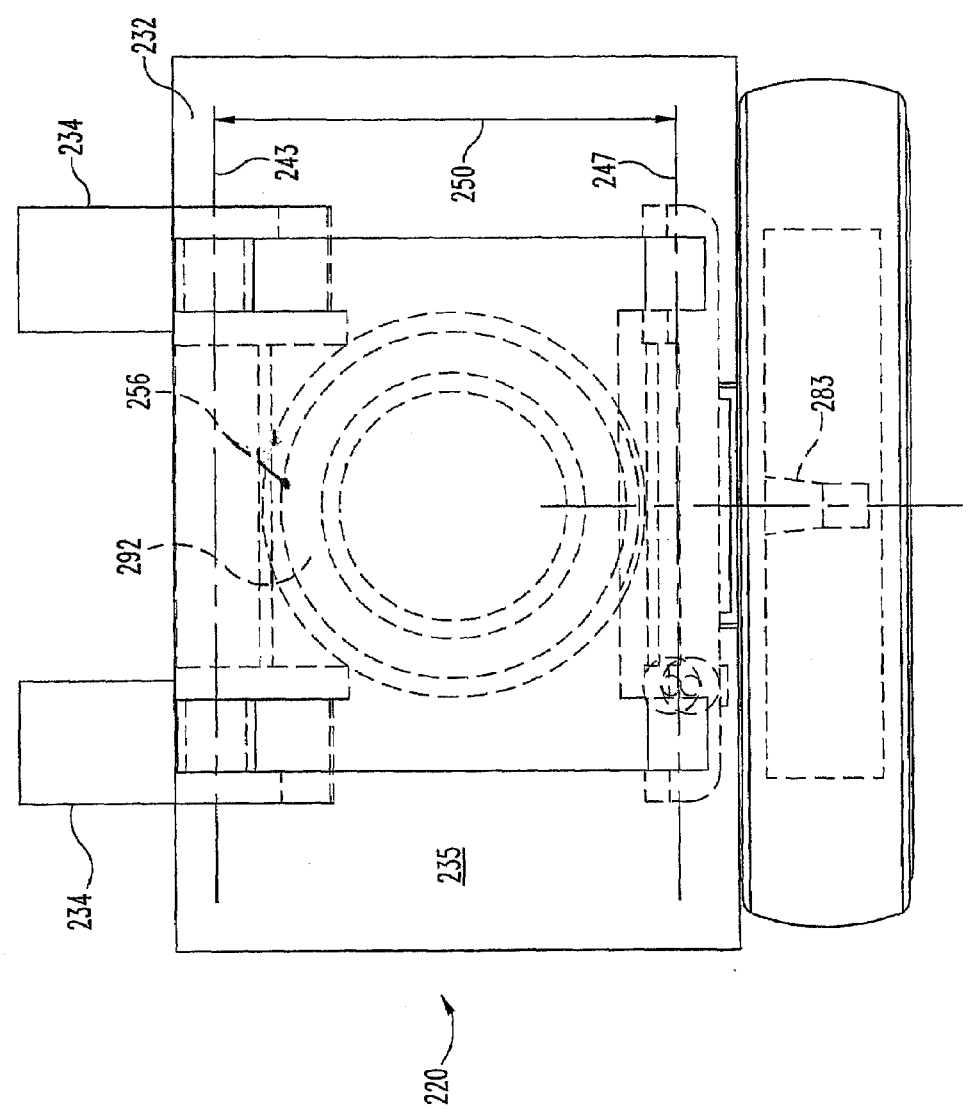
FIG. 9 is a top plan view of the suspension system of FIG. 6.
Figure 10:
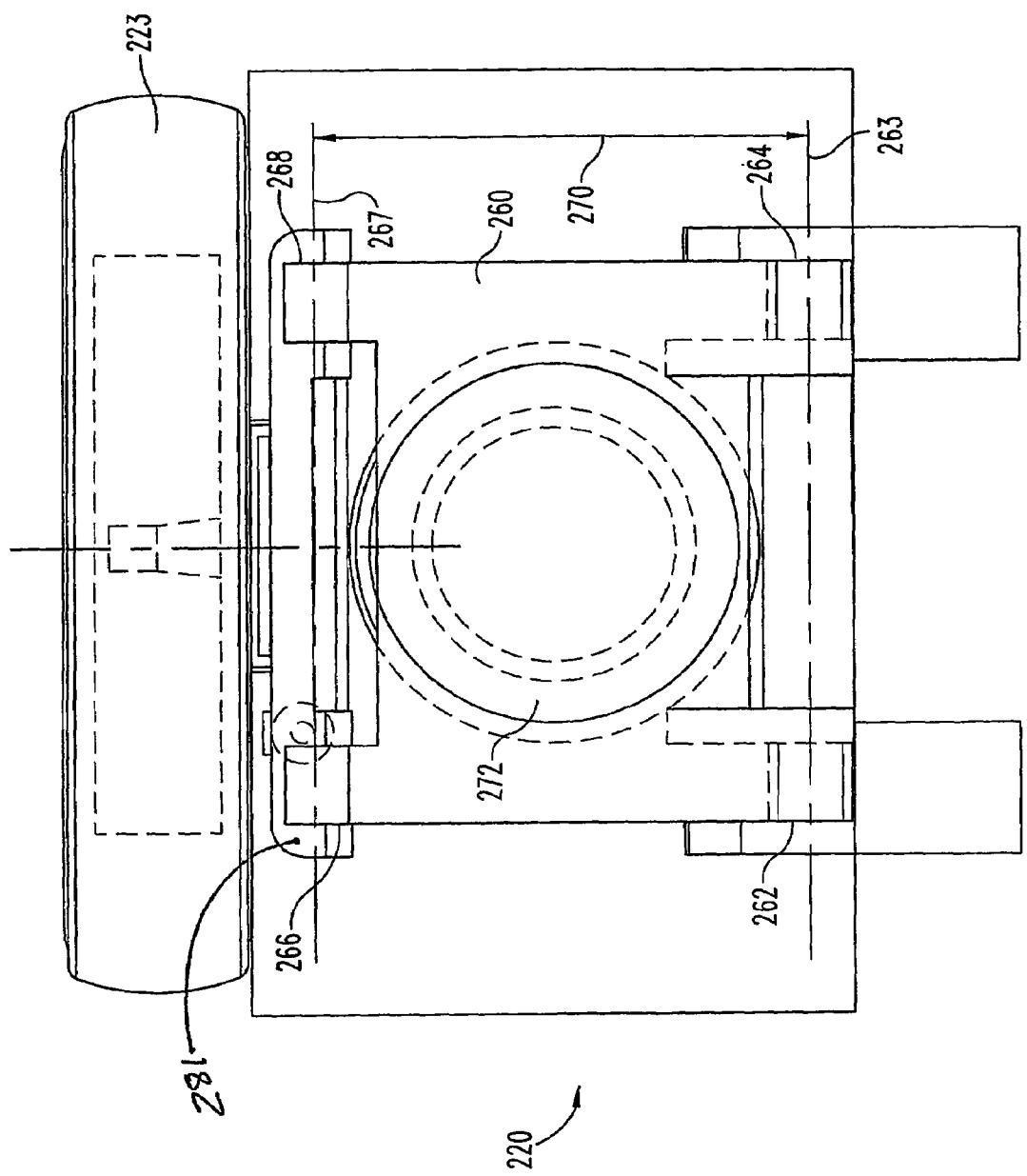
FIG. 10 is a bottom plan view of the suspension system of FIG. 6.
Figure 11:
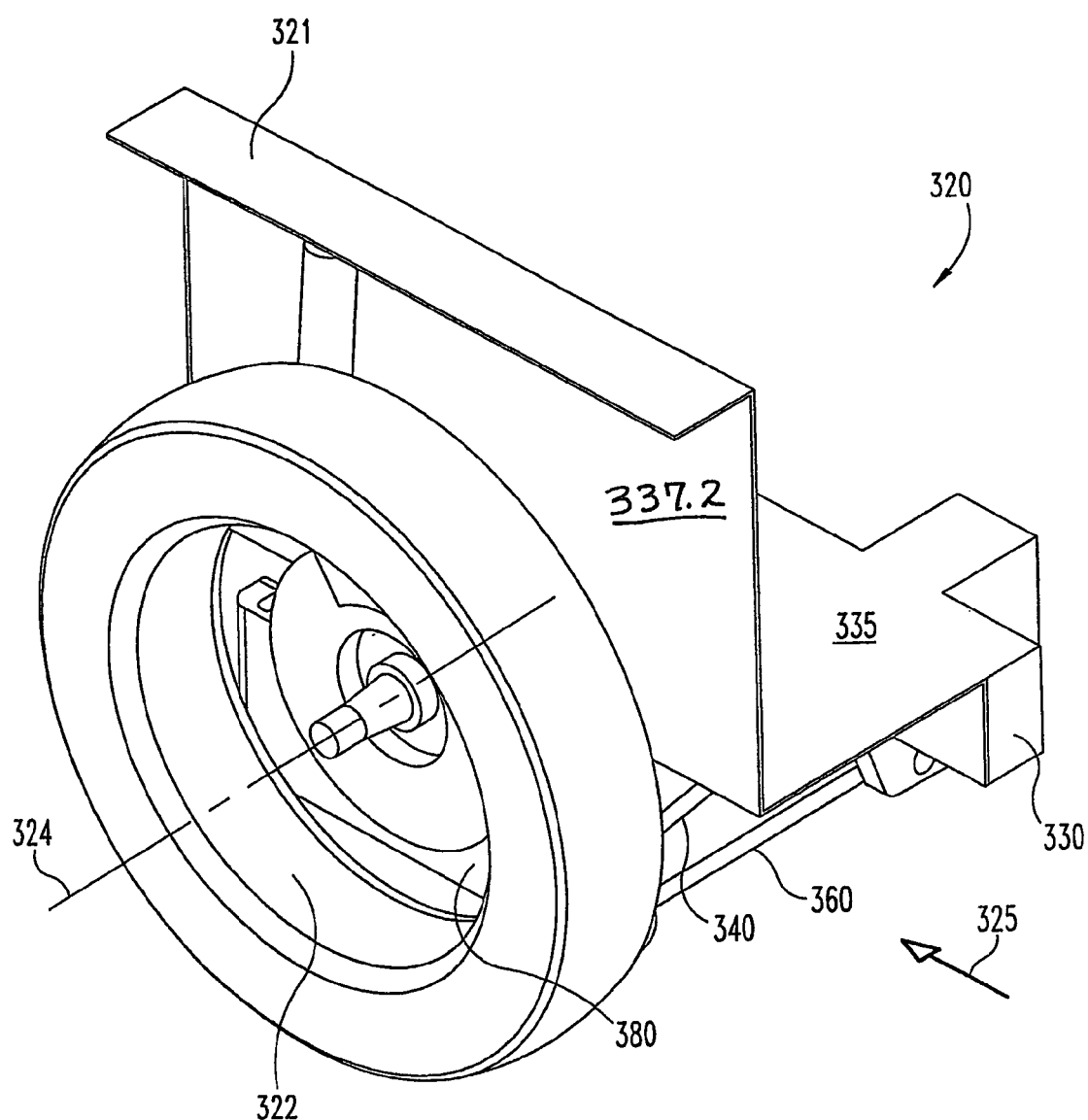
FIG. 11 is a top, rear, and left side perspective view of a wheel suspension system according to another embodiment of the present invention.

Referring to FIGS. 7, 8, and 10, lower support arm 260 includes a pair of inboard pivot joints 262 and 264, respectively, which are located fore and aft, respectively, of lower spring support 272. Support arm 260 further includes a pair of outboard front and rear pivot joints 266 and 268, respectively, located fore and aft, respectively, of spring support 272, and also located outboard of spring 292. Although a specific placement of the pivot joints for the lower support arm relative to the spring and spring support has been shown and described, the present invention is not so limited, and contemplates other configurations of pivot joint.

As can best be seen in FIGS. 7 and 8, the distance 250 between the outboard front pivot axis 247 and the inboard front pivot 243 of upper support arm 240 is less than the distance 270 between the outboard front pivot axis 267 and the inboard front pivot axis 263 of lower support arm 260. Further, the upper outboard pivot axis 247 of pivot joints 246 and 248 are preferably aligned generally above the lower outboard pivot axis 267. The upper inboard pivot axis 243 is preferably located generally above of the lower inboard pivot axis 263. In one embodiment, suspension system 220 is an unequal length, non-parallel arm suspension system. Both the inboard and outboard pivots of each arm are located below the rotational center line 224 of spindle 283. The difference in length provides for a change in wheel camber as the suspension arms roll up and down.

Suspension system 220 includes an air spring 292 which biases lower support arm 260 from chassis floor 235. Lower support arm 260 is also shown in FIGS. 42a, 42b, and 42c. Upper support arm 240 is shown in 43a, 43b, and 43c.

Referring to FIG. 8, the vertical spacing 288 between inboard pivot joints 244 and 264 is less than the vertical spacing 289 between outboard pivot joints 248 and 268. In one embodiment, the upper pivot axes 244 and 247 are coplanar and generally parallel to wheel rotational axis 224. In suspension system 220, the lower inboard pivot axis 263 is vertically spaced higher than the lower outboard pivot axis 267.

A suspension system 320 according to another embodiment of the present invention is shown in FIGS. 11-15.

Figure 12:
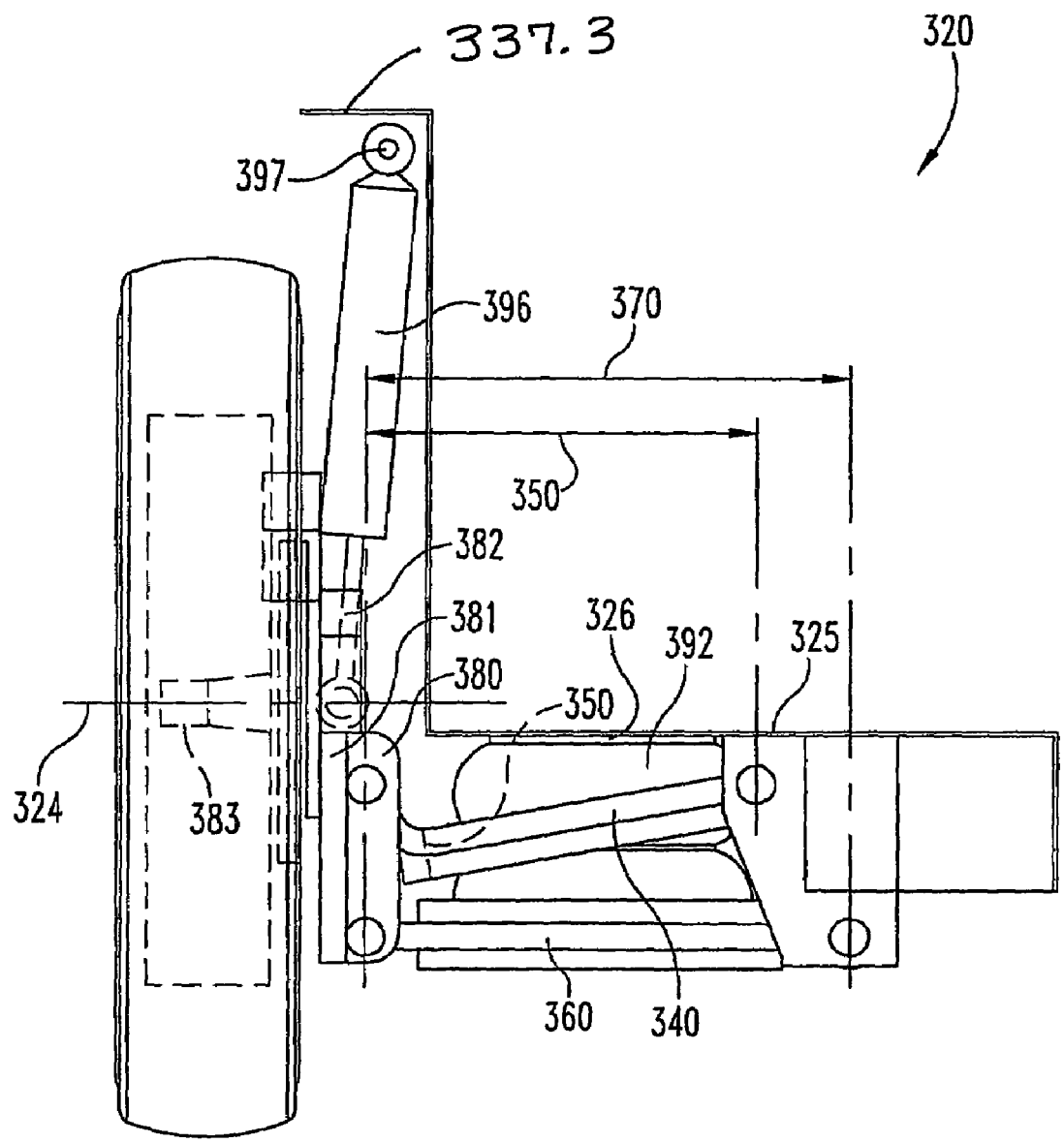
FIG. 12 is a rear elevational view of the suspension system of FIG. 11.
Figure 13:
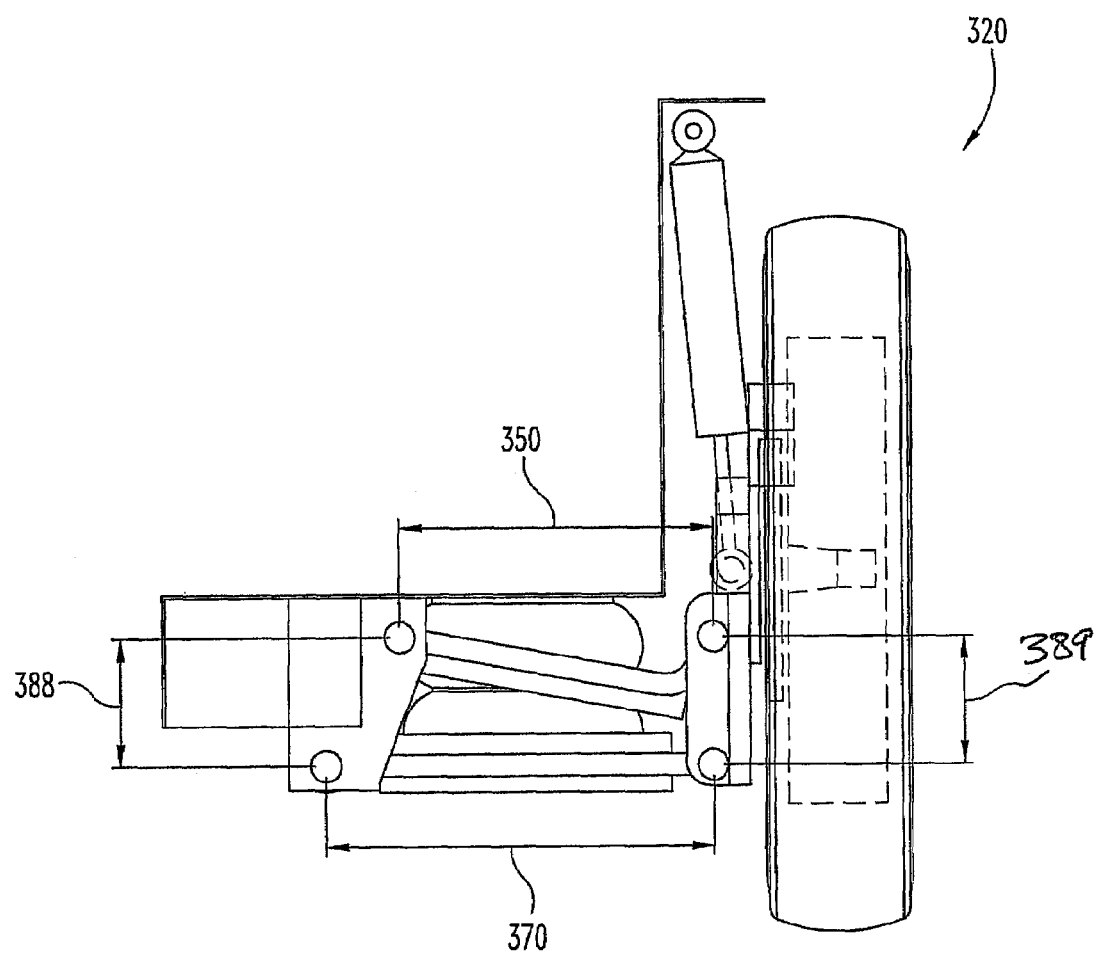
FIG. 13 is a front elevational view of the suspension system of FIG. 11.
Figure 14:
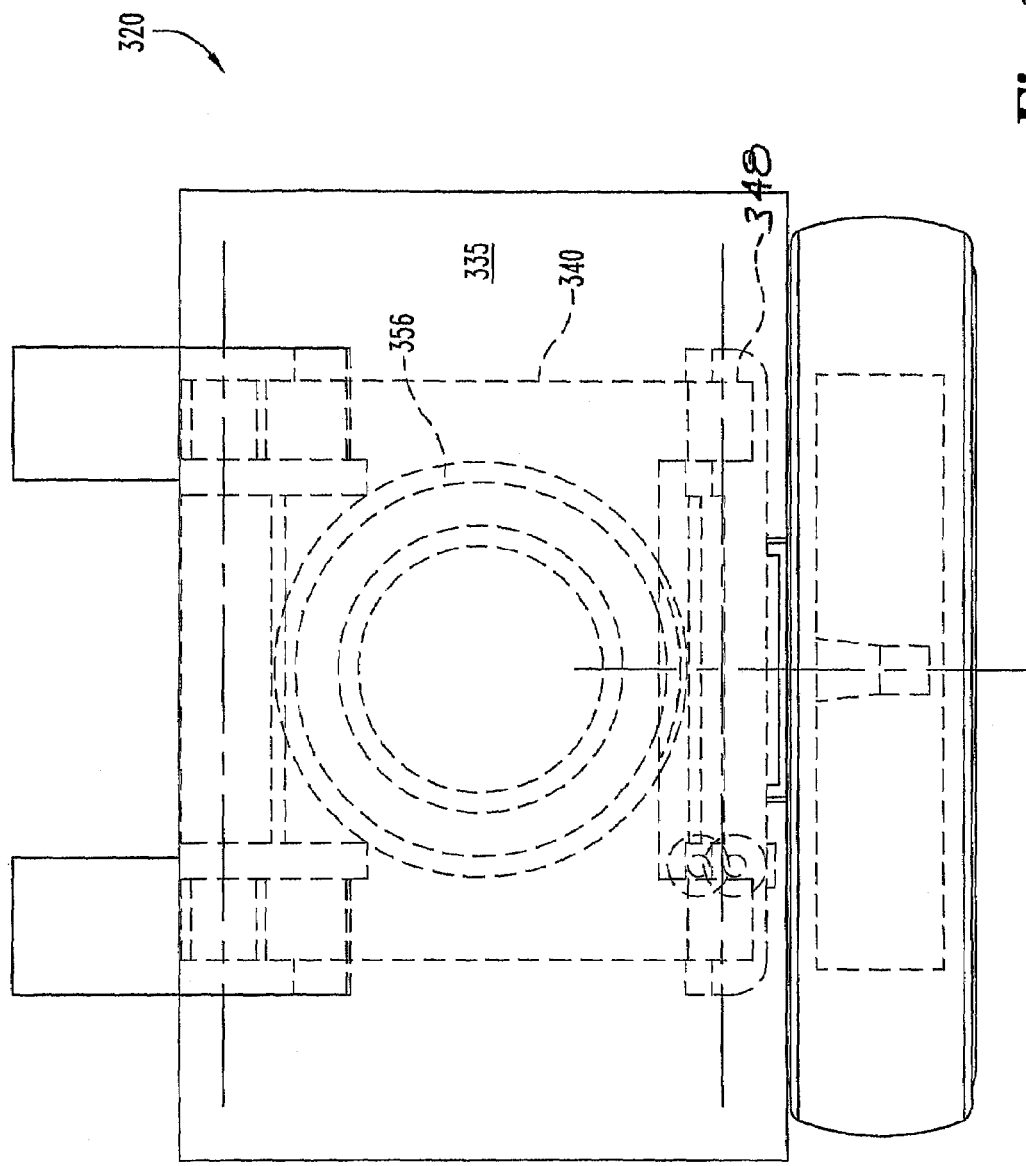
FIG. 14 is a top plan view of the suspension system of FIG. 11.
Figure 15:
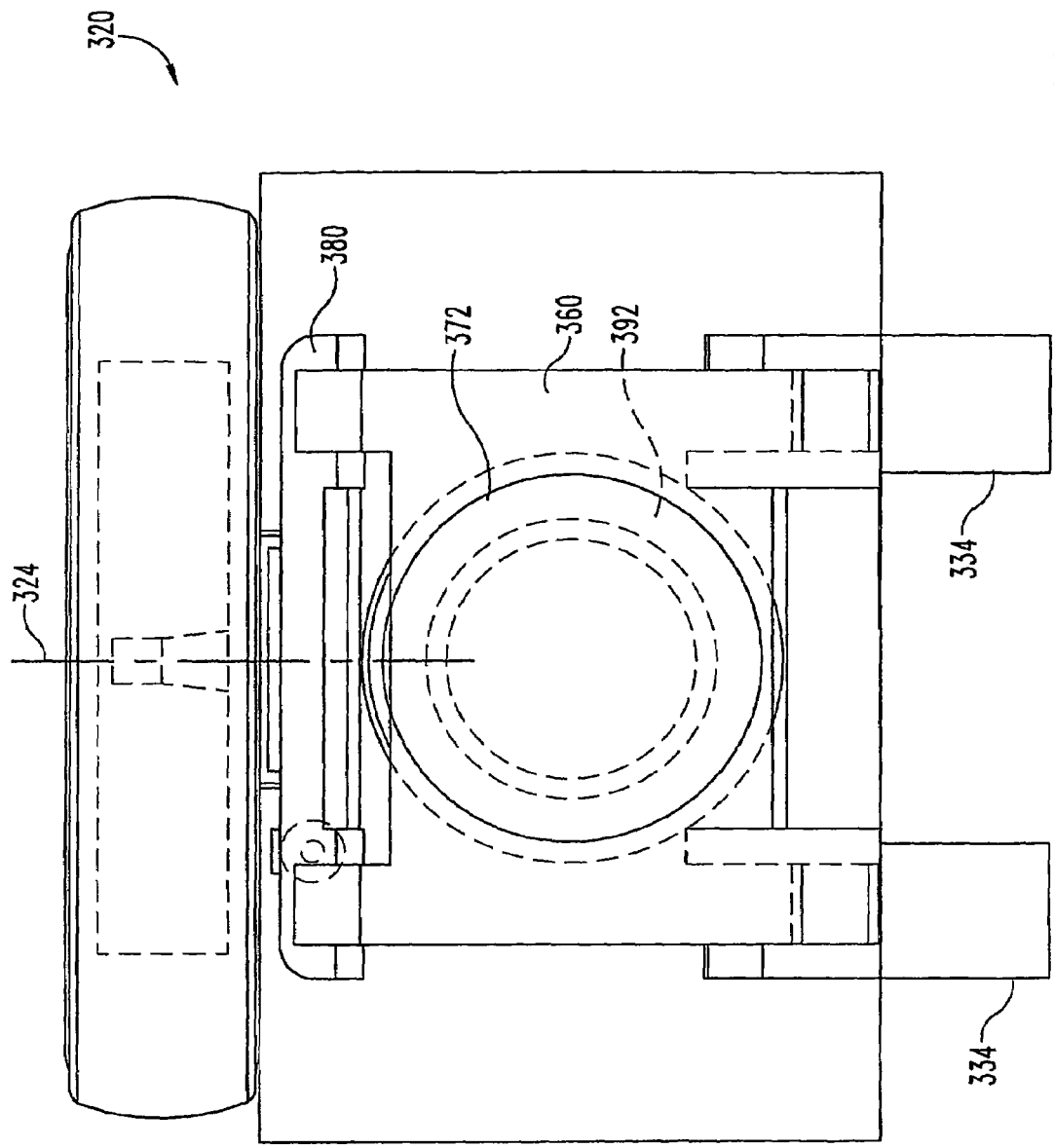
FIG. 15 is a bottom plan view of the suspension system of FIG. 11.
Figure 16:
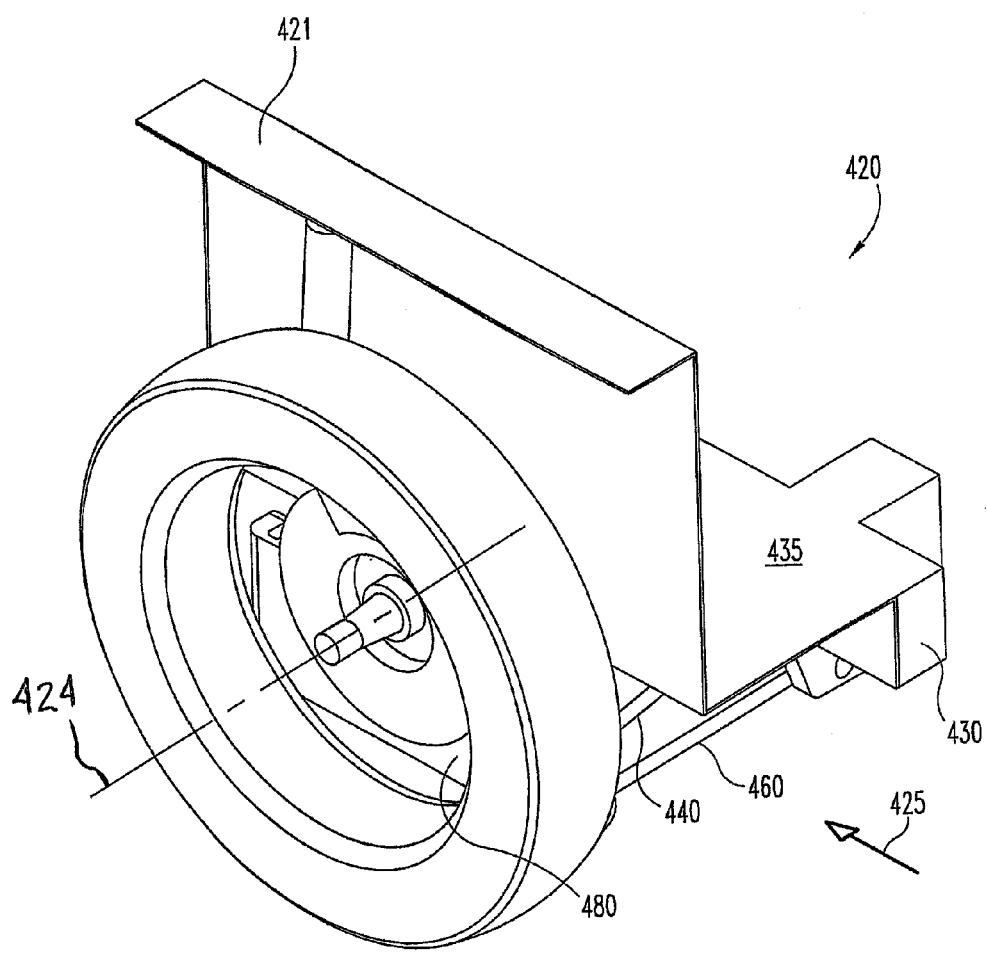
FIG. 16 is a top, rear, and left side perspective view of a wheel suspension system according to another embodiment of the present invention.

Referring to FIGS. 12, 13, and 15, lower support arm 360 includes a pair of inboard pivot joints 362 and 364, respectively, which are located fore and aft, respectively, of lower spring support 372. Support arm 360 further includes a pair of outboard front and rear pivot joints 366 and 368, respectively, located fore and aft, respectively, of spring support 372, and also located outboard of spring 392. Although a specific placement of the pivot joints for the lower support arm relative to the spring and spring support has been shown and described, the present invention is not so limited, and contemplates other configurations of pivot joint.

As can best be seen in FIGS. 12 and 13, the distance 350 between the outboard front pivot axis 347 and the inboard front pivot 343 of upper support arm 340 is less than the distance 370 between the outboard front pivot axis 367 and the inboard front pivot axis 363 of lower support arm 360. Further, the upper outboard pivot axis 347 of pivot joints 346 and 348 are preferably aligned generally above the lower outboard pivot axis 367. The upper inboard pivot axis 343 is preferably located outboard of the lower inboard pivot axis 363. The support arms of suspension system 320 are parallel but of different length. The difference in length provides for a change in wheel camber as the suspension arms roll up and down.

Suspension system 320 is the same as suspension system 120, except for the use of an air spring 392 to bias one of the support arms away from the vehicle frame.

A suspension system 420 according to another embodiment of the present invention is shown in FIGS. 16-20.

Figure 17:
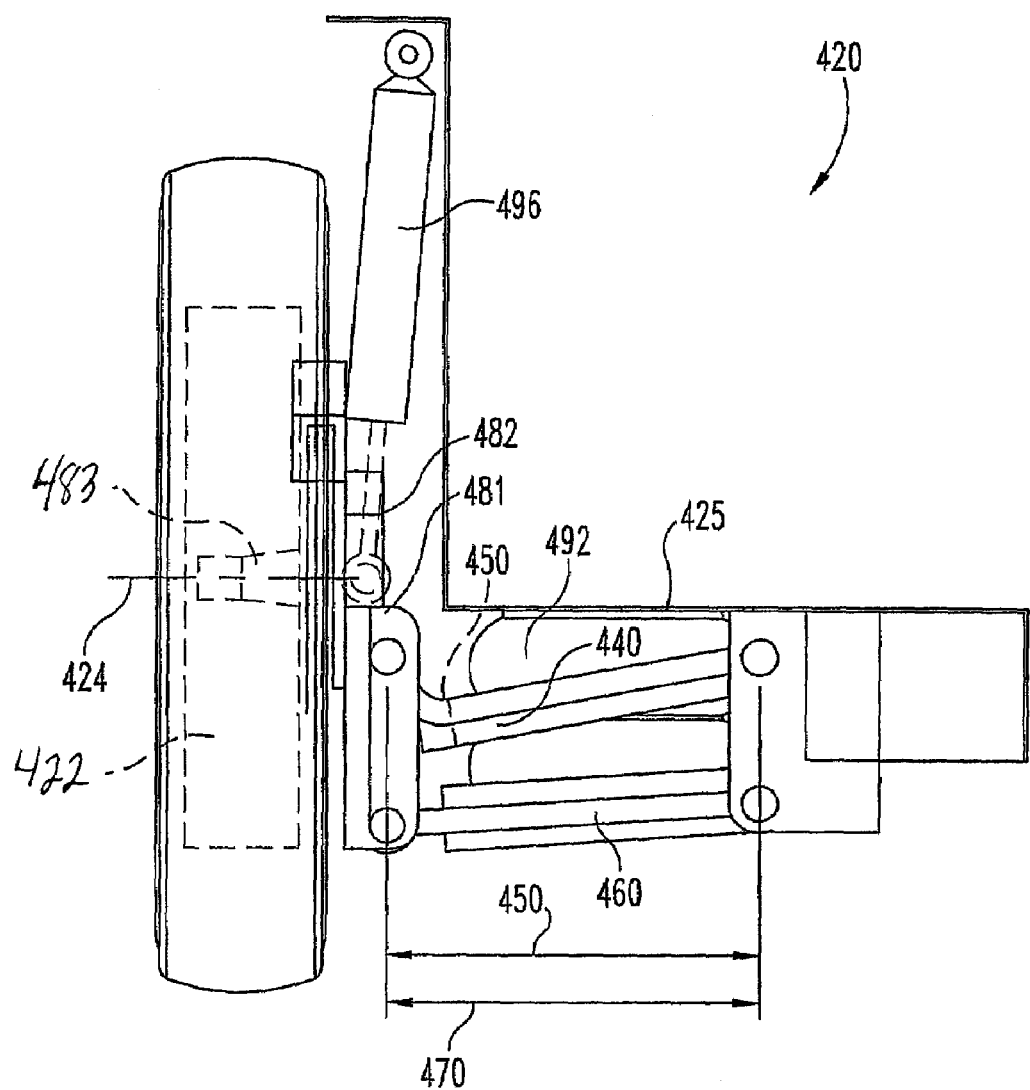
FIG. 17 is a rear elevational view of the suspension system of FIG. 16.
Figure 18:
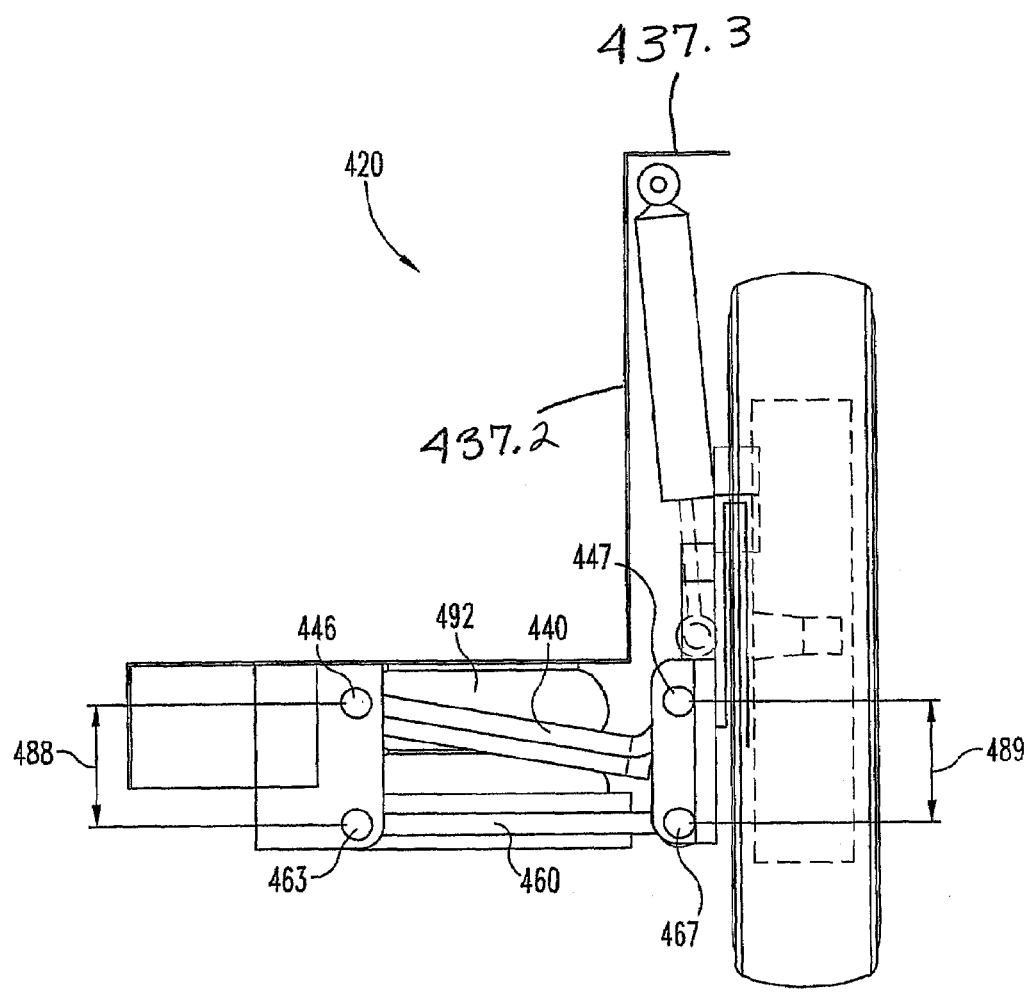
FIG. 18 is a front elevational view of the suspension system of FIG. 16.
Figure 19:
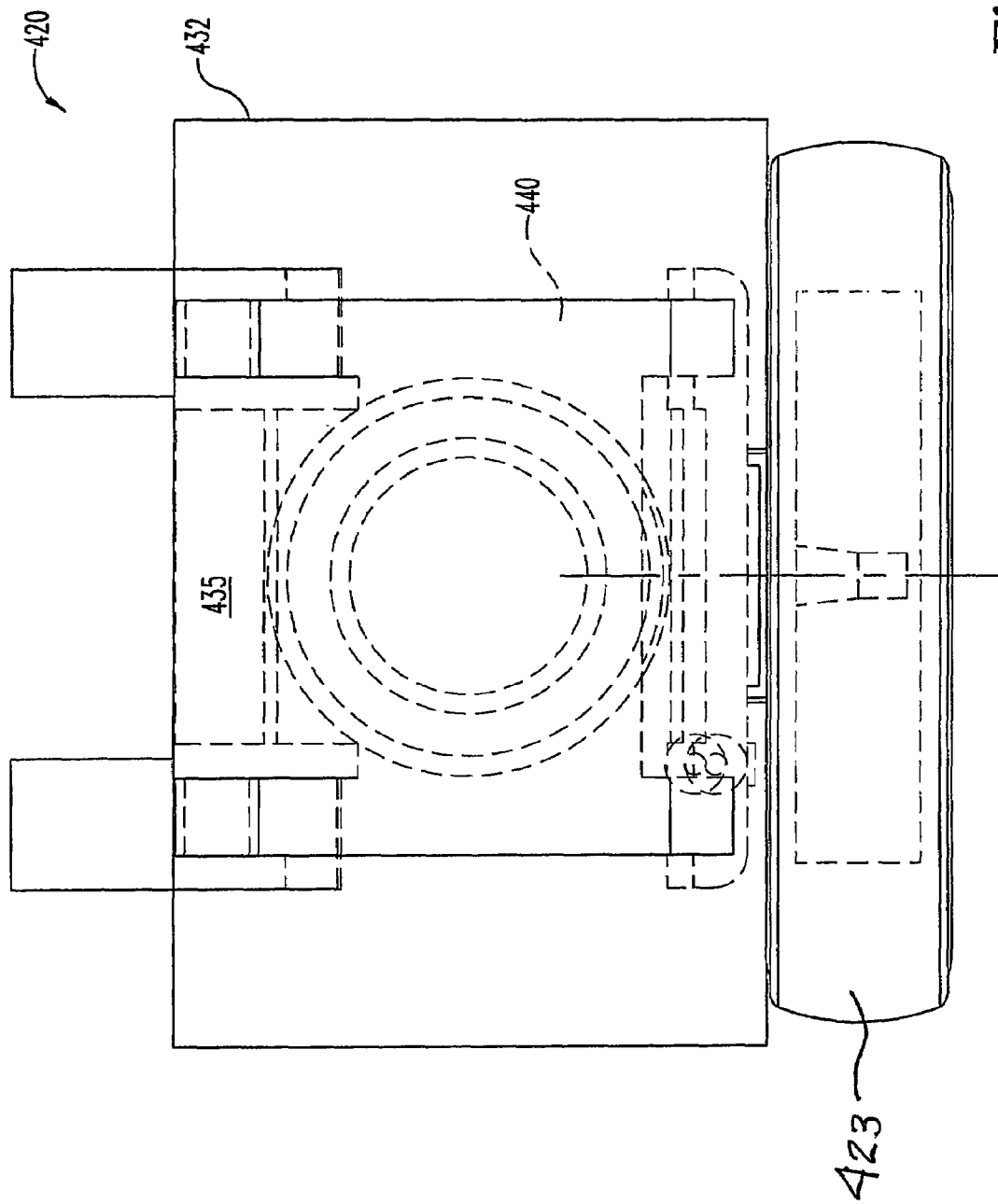
FIG. 19 is a top plan view of the suspension system of FIG. 16.
Figure 20:
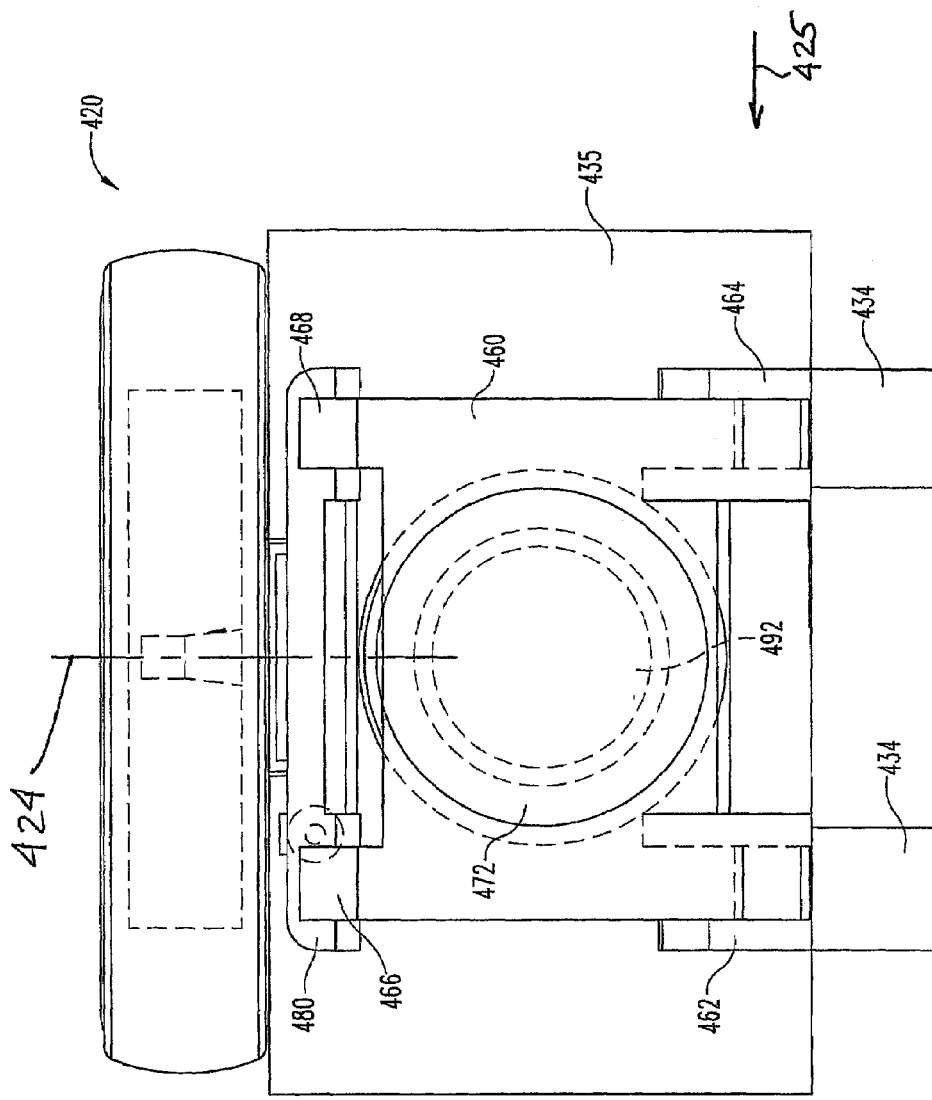
FIG. 20 is a bottom plan view of the suspension system of FIG. 16.
Figure 21:
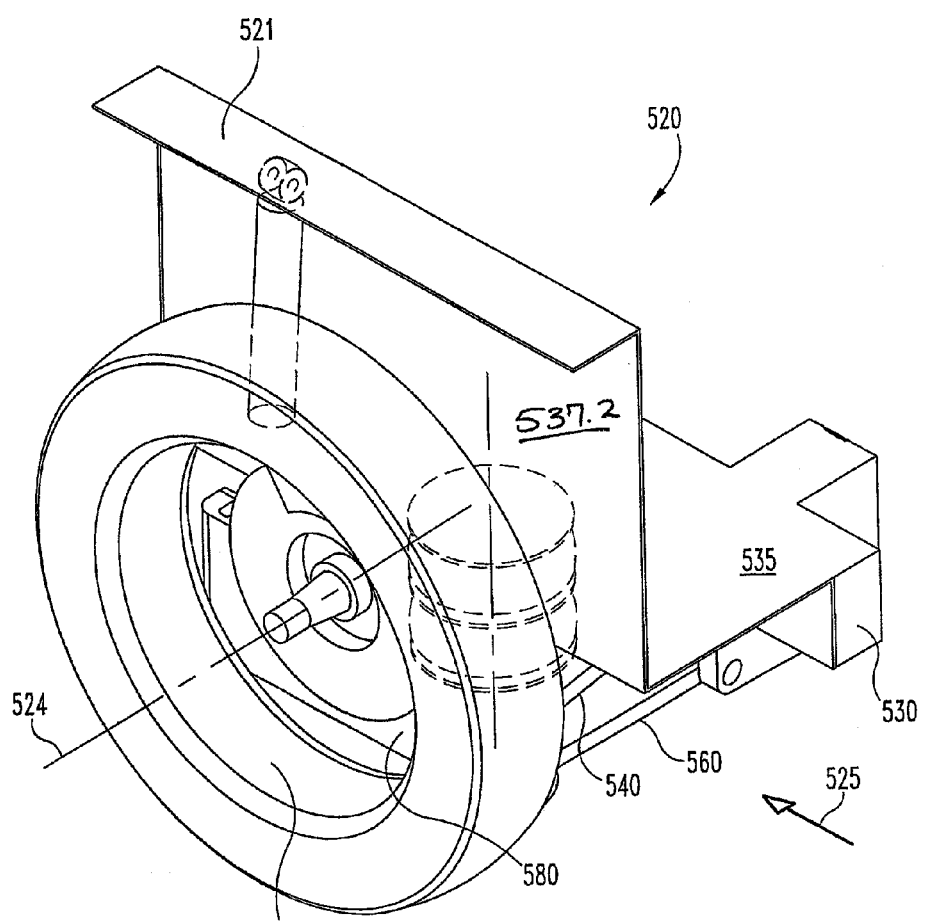
FIG. 21 is a top, rear, and left side perspective view of a wheel suspension system according to another embodiment of the present invention.

Referring to FIGS. 17, 18 and 20, lower support arm 460 includes a pair of inboard pivot joints 462 and 464, respectively, which are located fore and aft, respectively, of lower spring support 472. Support arm 460 further includes a pair of outboard front and rear pivot joints 466 and 468, respectively, located fore and aft, respectively, of spring support 472, and also located outboard of spring 492. Although a specific placement of the pivot joints for the lower support arm relative to the spring and spring support has been shown and described, the present invention is not so limited, and contemplates other configurations of pivot joint.

As can best be seen in FIGS. 17 and 18, the distance 450 between the outboard front pivot axis 447 and the inboard front pivot 443 of upper support arm 440 is about the same as the distance 470 between the outboard front pivot axis 467 and the inboard front pivot axis 463 of lower support arm 460. Further, the upper outboard pivot axis 447 of pivot joints 446 and 448 are preferably aligned generally above the lower outboard pivot axis 467. The upper inboard pivot axis 443 is preferably located generally above the lower inboard pivot axis 463.

Suspension system 420 includes an air spring 492 for biasing one of the support arms away from the vehicle frame. In all the embodiments shown herein, the upper spring support of the vehicle frame is located below the rotational axis of the wheel. However, the present invention also contemplates those embodiments in which the upper spring support is above the rotational axis of the wheel.

As best seen in FIG. 18, the vertical spacing 488 between the upper and lower pivot axes 443 and 463, respectively, is generally the same as the vertical spacing 489 between the outboard upper and lower pivot axes 447 and 467, respectively. Suspension arms 440 and 460 are equal length, parallel arms.

A wheel suspension system 520 according to another embodiment of the present invention is shown in FIGS. 21-25, FIGS. 37-41, and FIGS. 45a, 45b, and 45c.

Figure 22:
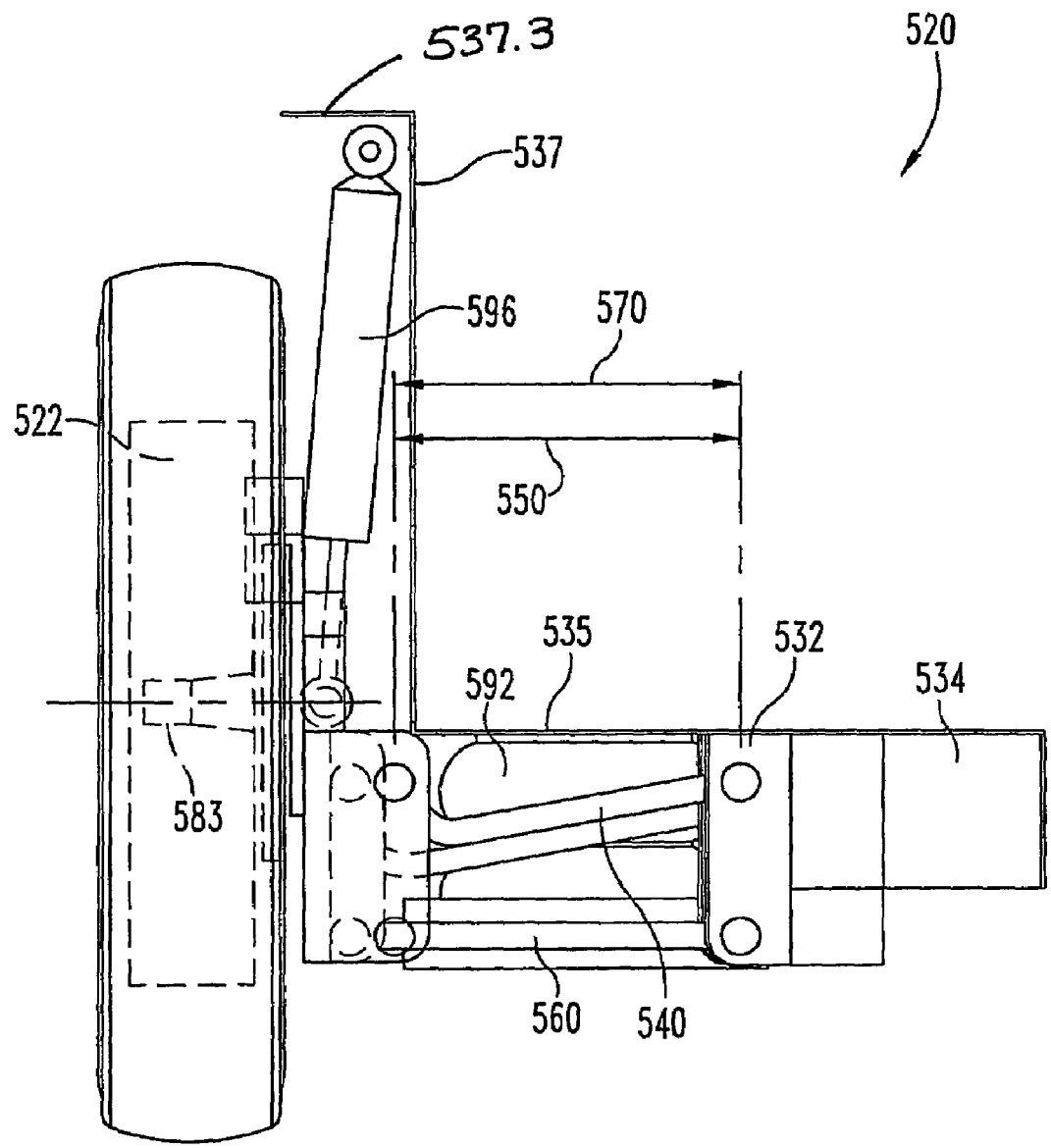
FIG. 22 is a rear elevational view of the suspension system of FIG. 21.
Figure 23:
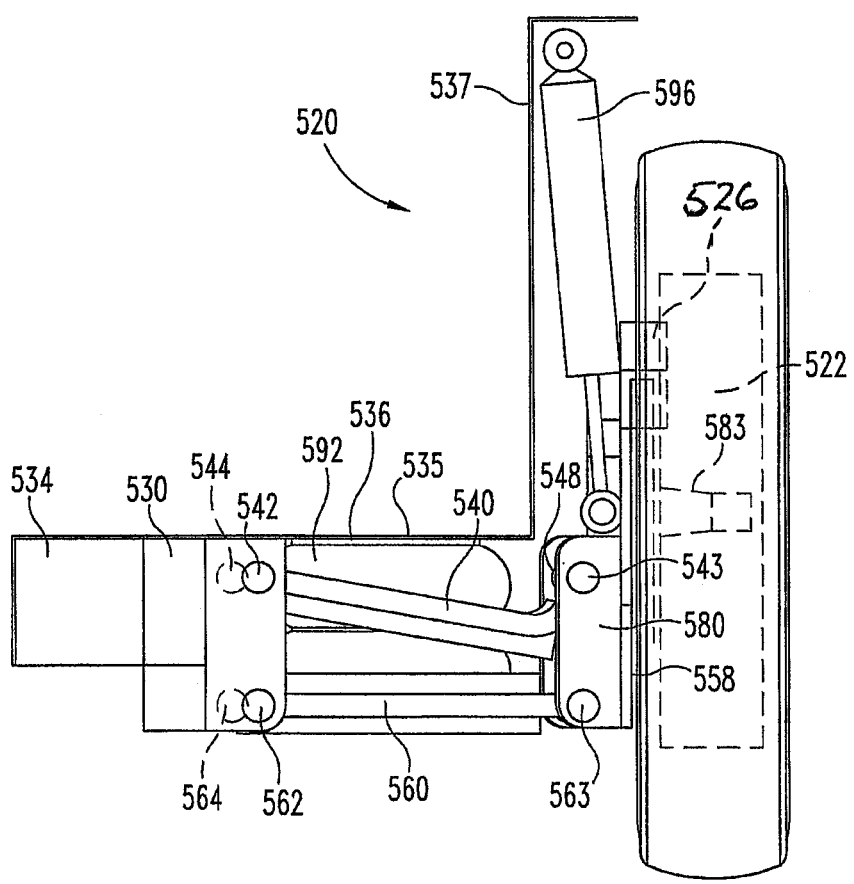
FIG. 23 is a front elevational view of the suspension system of FIG. 21.
Figure 24:
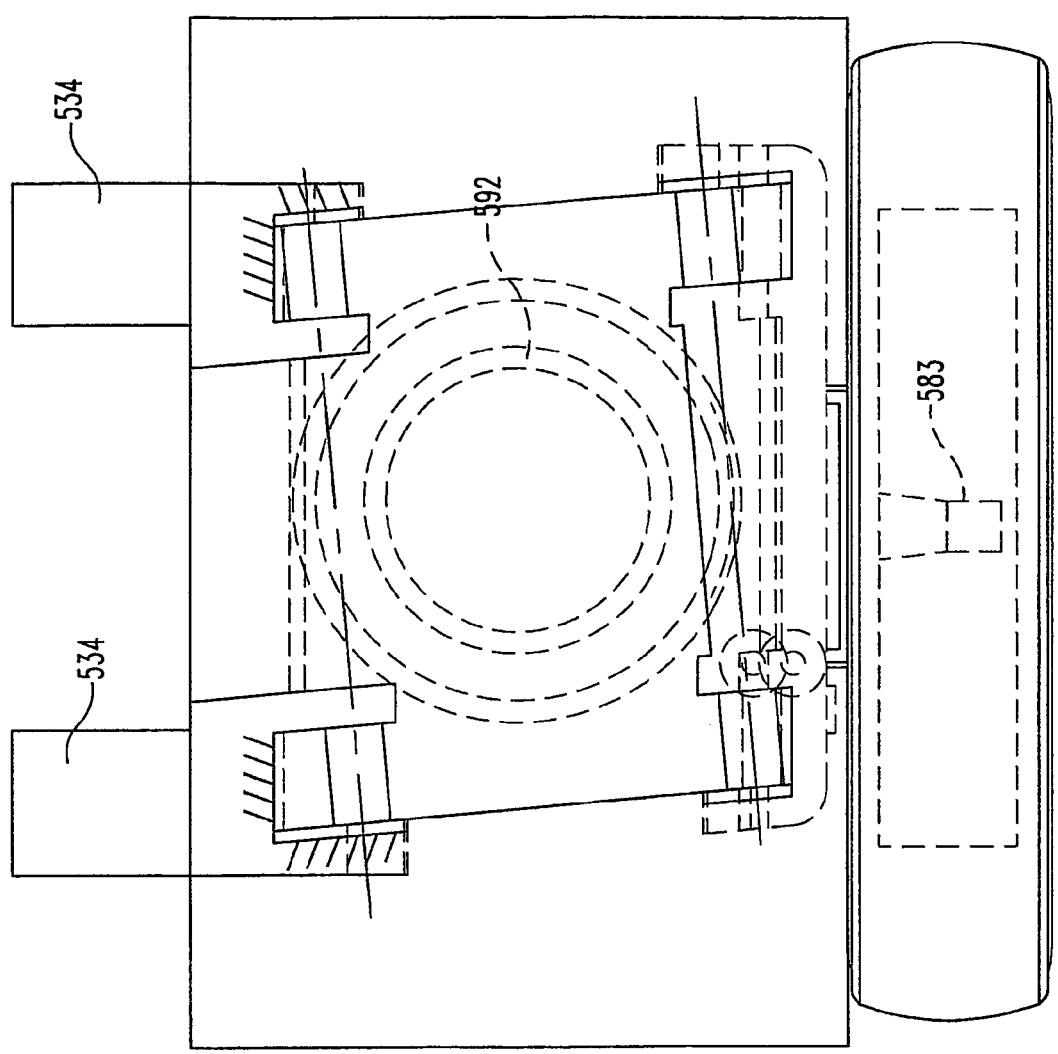
FIG. 24 is a top plan view of the suspension system of FIG. 21.
Figure 25:
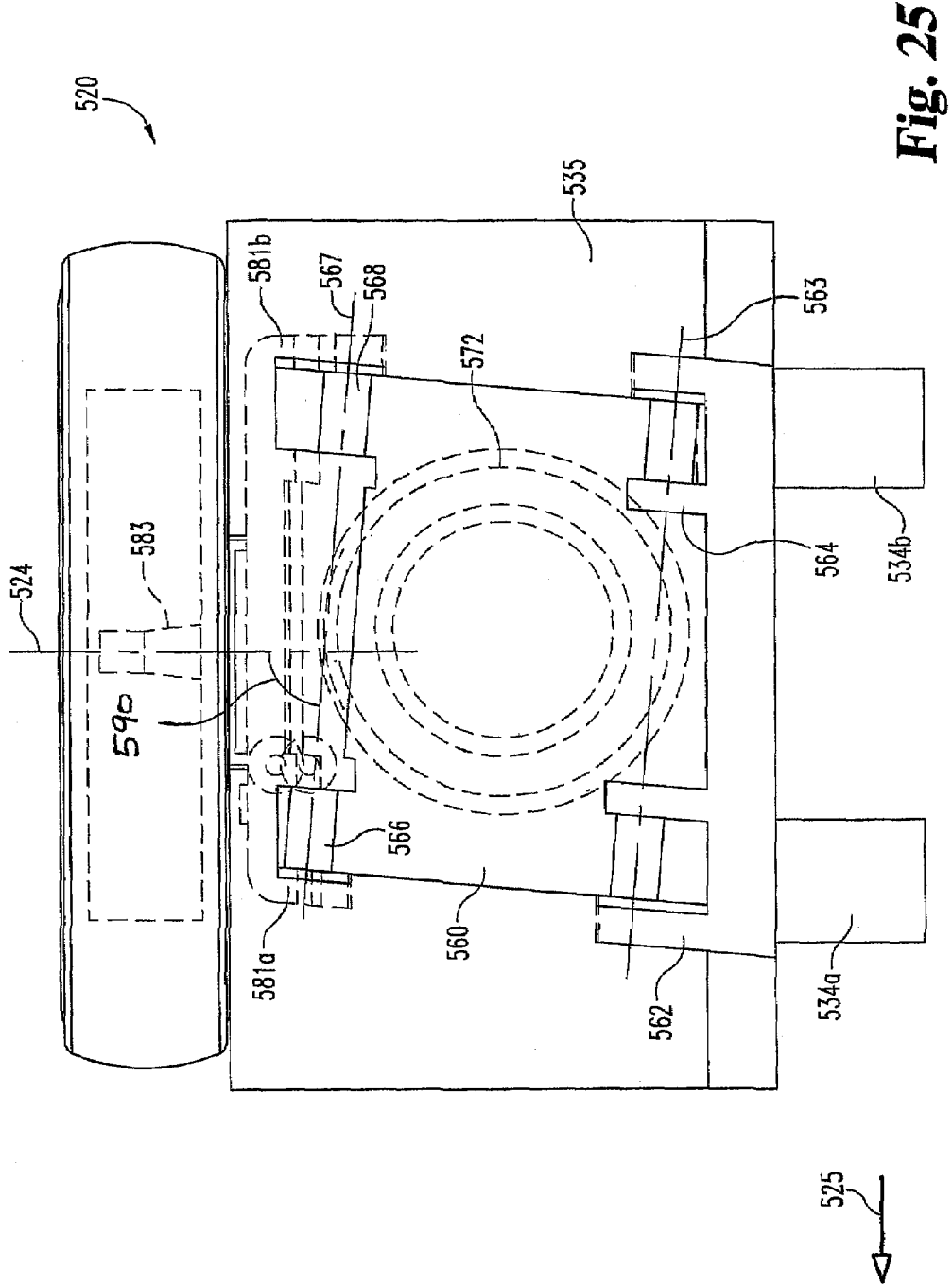
FIG. 25 is a bottom plan view of the suspension system of FIG. 21.
Figure 26:
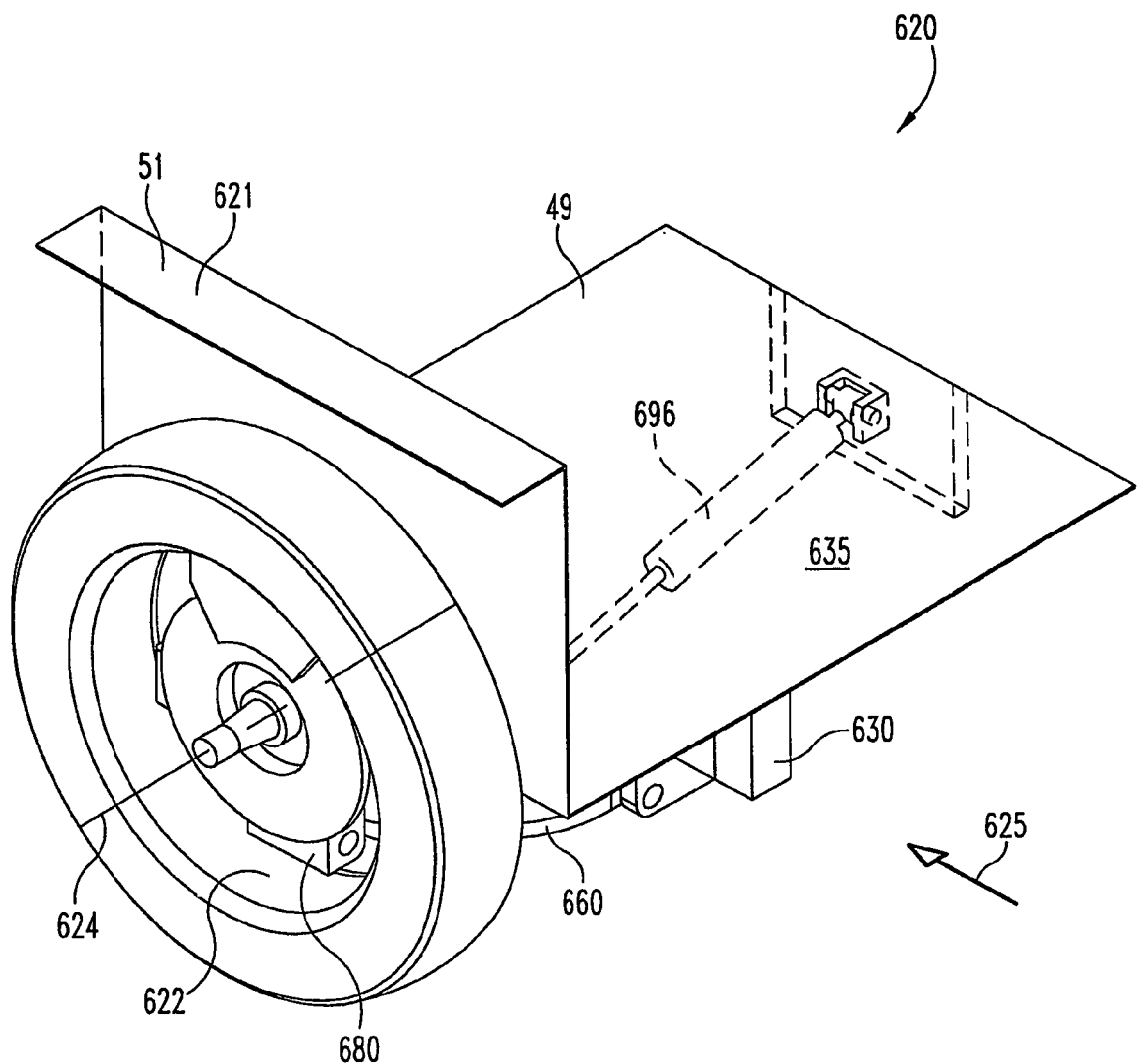
FIG. 26 is a top, rear, and left side perspective view of a wheel suspension system according to another embodiment of the present invention.

Referring to FIGS. 22, 23, and 25, lower support arm 560 includes a pair of inboard pivot joints 562 and 564, respectively, which are located fore and aft, respectively, of lower spring support 572. Support arm 560 further includes a pair of outboard front and rear pivot joints 566 and 568, respectively, located fore and aft, respectively, spring support 572, and also located outboard of spring 592. Although a specific placement of the pivot joints for the lower support arm relative to the spring and spring support has been shown and described, the present is not so limited, and contemplates other configurations of pivot joint.

As can best be seen in FIGS. 22 and 23, the distance 550 between the outboard front pivot axis 547 and the inboard front pivot axis 543 of upper support arm 540 is about the same as the distance 570 between the outboard front pivot axis 567 and the inboard front pivot axis 563 of lower support arm 560. Further, the upper outboard pivot axis 547 of pivot joints 546 and 548 are preferably aligned generally above the lower outboard pivot axis 567. The upper inboard pivot axis 543 is preferably located above the lower inboard pivot axis 563.

Wheel suspension system 520 includes a pair of support arms 540 and 560 which are angled relative to the wheel rotational axis in a semi-trailing arm configuration. As best seen in FIG. 25, angle 590 between pivot axis 567 and rotational axis 524 is less than 90 degrees. Inboard lower pivot axis 563 is generally parallel to outboard lower pivot axis 567. This angular offset between axes 524 and 567 preferably includes changes in the spacing of the pivot joints. Lower outboard rear pivot joint 568 couples with an angled extension 581b of arm connection member 581. Further, lower inboard front pivot joint 562 is pivotally coupled to an extended and angled portion of cross member 534a. Pivot joint 564 is coupled to an angled portion of cross member 534b. Lower outboard front pivot joint 566 is coupled to an angled portion 581a of arm connection member 581.

In one embodiment, the semi-trailing support arms 540 and 560 are equal length. However, the present invention also contemplates those embodiments in which the upper support arm is longer than the lower support arm, and those embodiments in which the lower support arm is longer than the upper support arm.

The wheel suspension system 620 according to another embodiment of the present invention is shown in FIGS. 26-30 and FIGS. 46a, 46b, 46c, 47a, 47b, 47c, 48a, 48b, and 48c.

Figure 27:
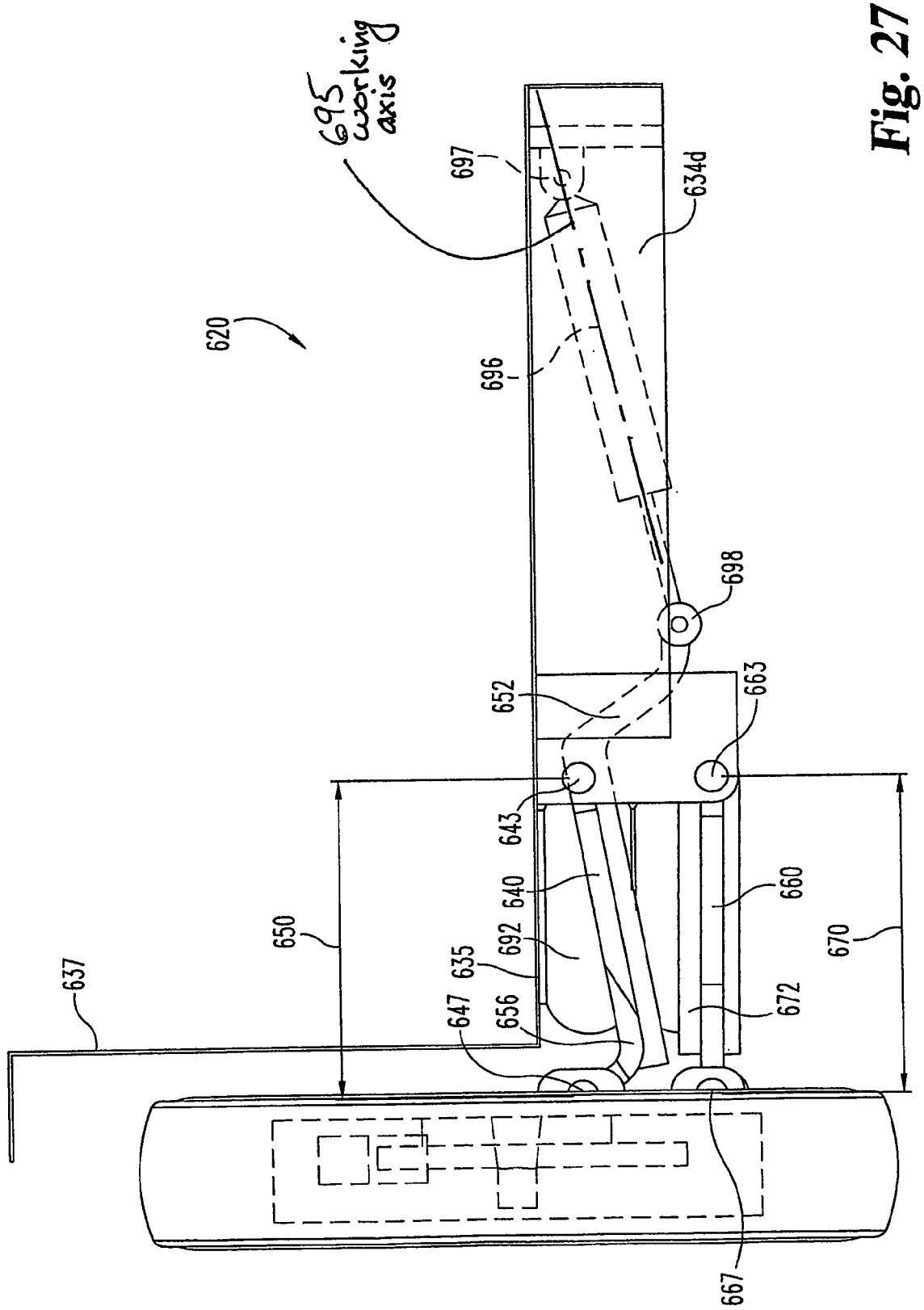
FIG. 27 is a rear elevational view of the suspension system of FIG. 26.
Figure 28:
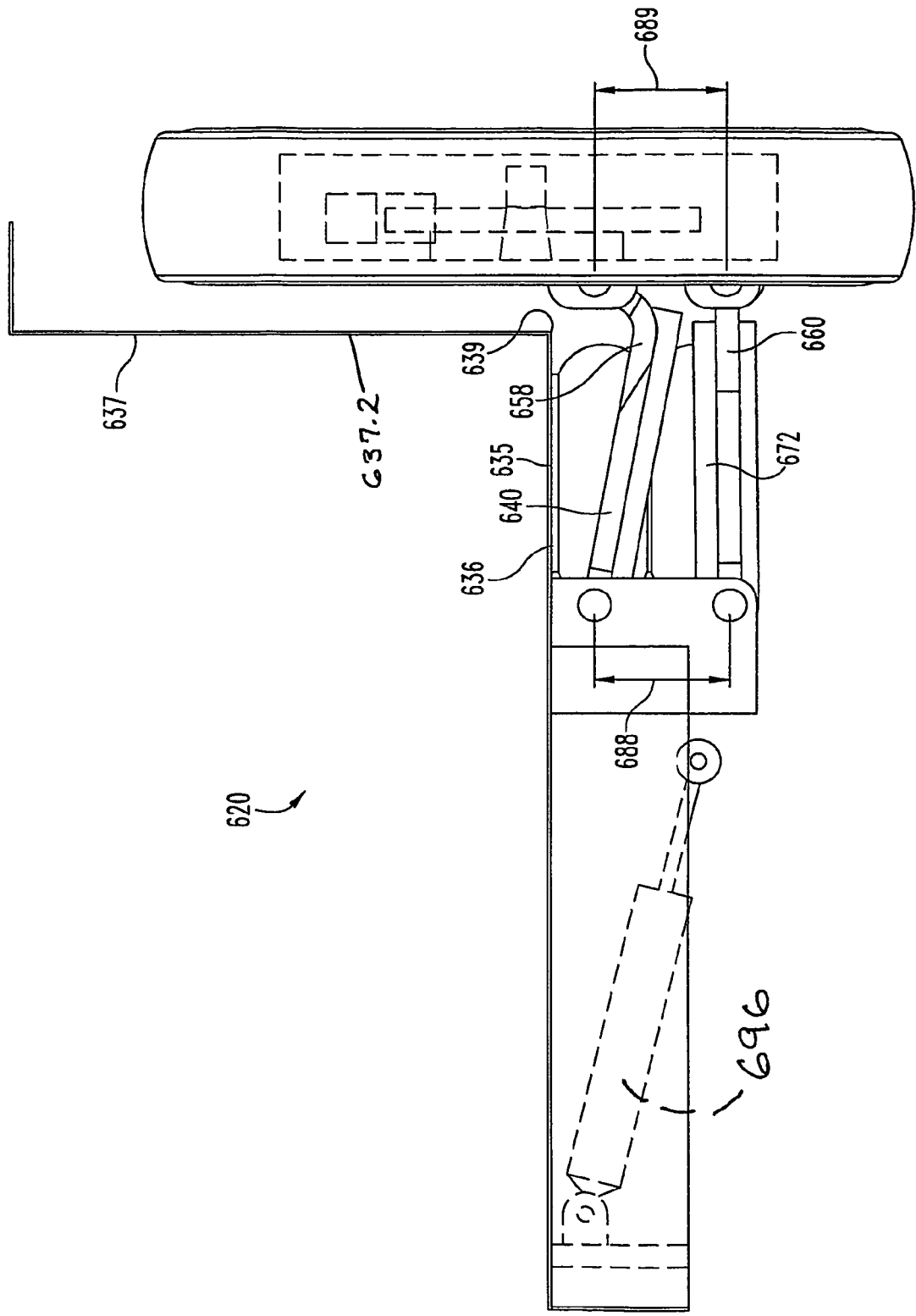
FIG. 28 is a front elevational view of the suspension system of FIG. 26.
Figure 29:
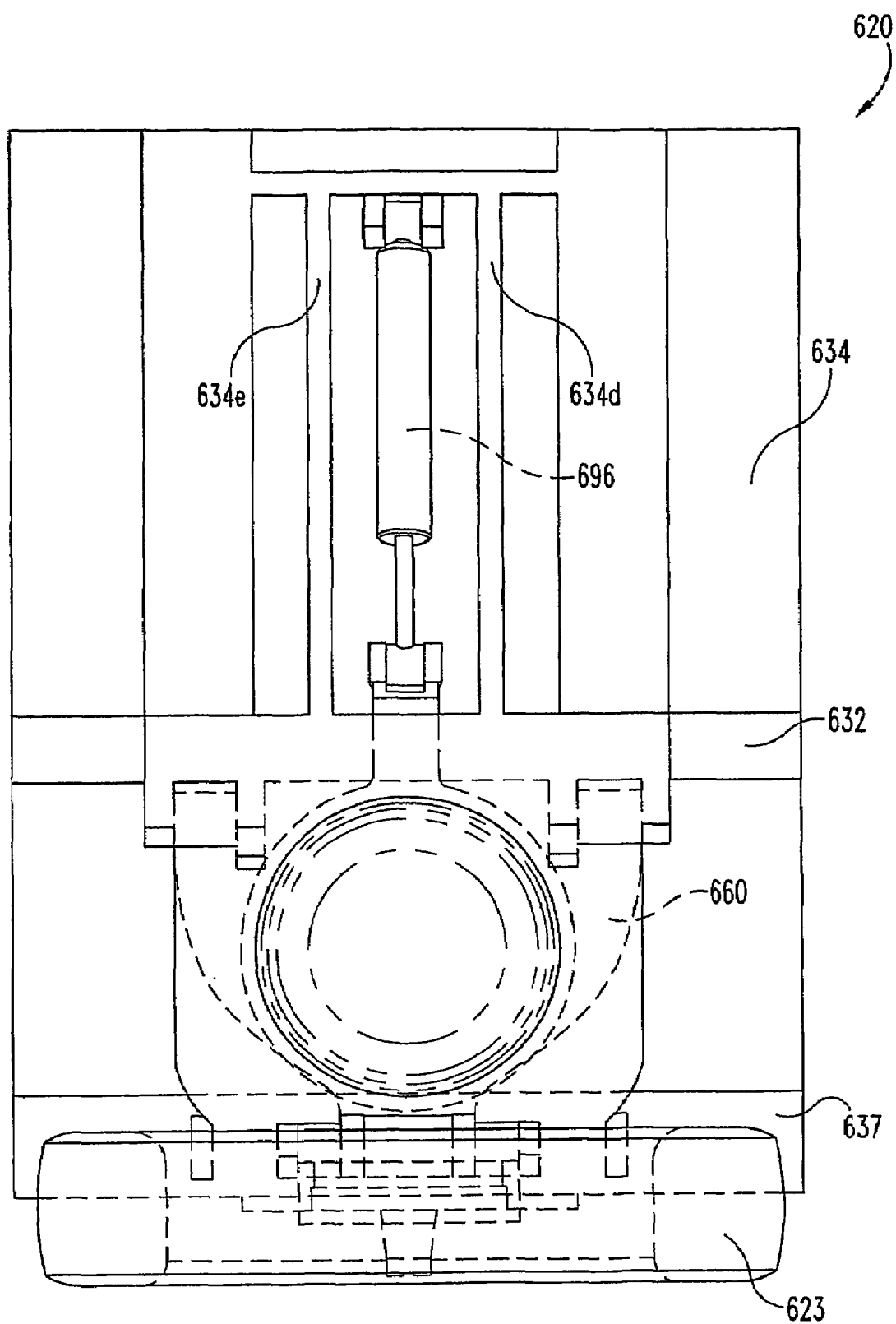
FIG. 29 is a top plan view of the suspension system of FIG. 26.
Figure 30:
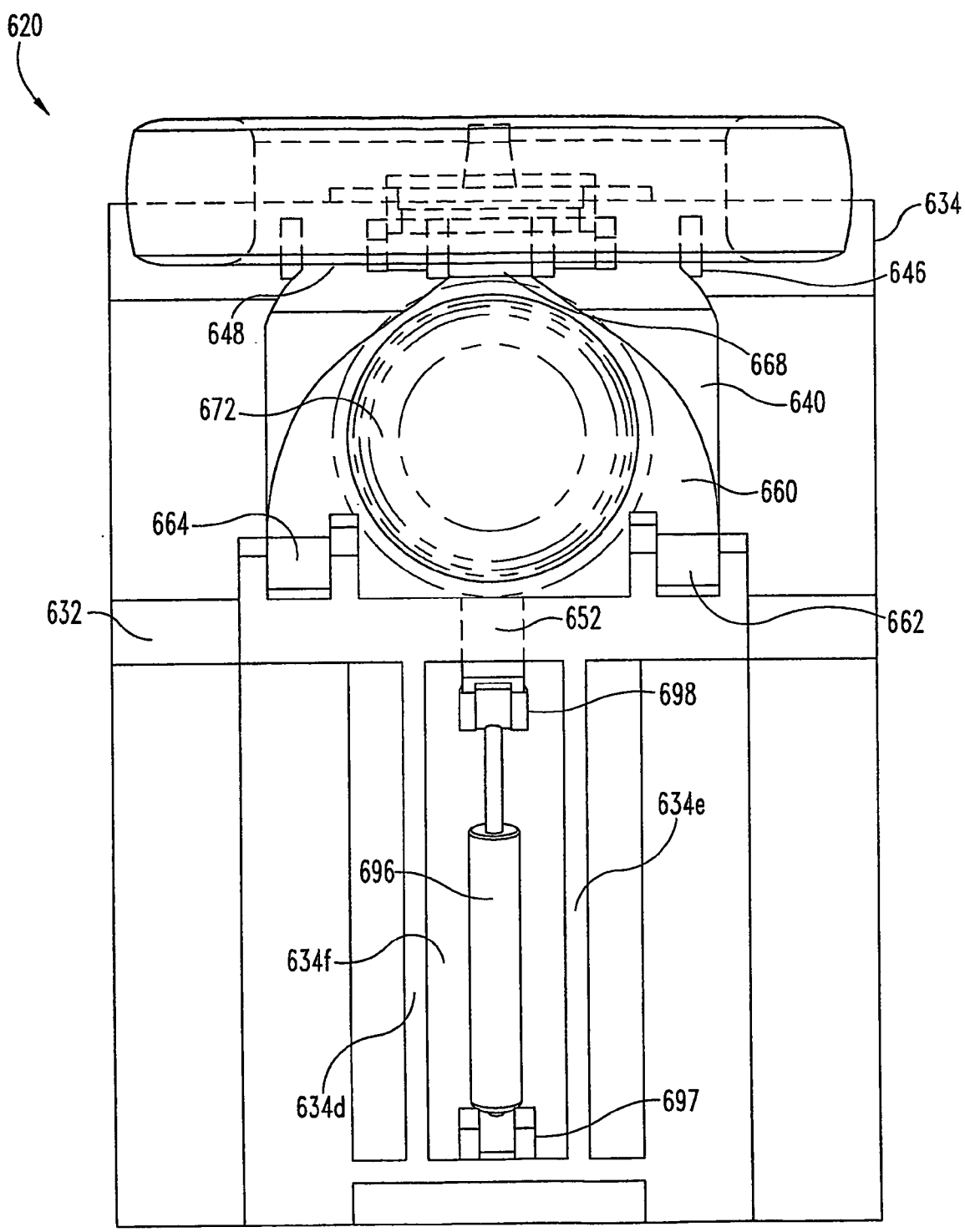
FIG. 30 is a bottom plan view of the suspension system of FIG. 26.

Referring to FIGS. 27, 28, and 30, lower support arm 660 includes a pair of inboard pivot joints 662 and 664, respectively, which are located fore and aft, respectively, of lower spring support 672. Support arm 660 further includes a single outboard pivot joint 668, which is approximately centered with the spindle 683, and also located outboard of spring 692. Referring to FIGS. 47a and 47b, spindle support 680 includes a single, lower support arm connection member 681 preferably located below spindle 683. Spindle support lateral section 681.1 and 681.2 are placed to either lateral side of the central, vertical spindle connection member 682. Although a spindle support 680 has been shown and described having a symmetric placement of the lower pivot joint 668, the present invention also contemplates those embodiments in which the lower pivot joint is placed more toward the right or left (again referring to FIG. 47b), and also those embodiments in which there are a pair of lower pivot joints and a single upper outboard pivot joint located either along the center of section 682 or to either side of section 682.

Although a specific placement of the pivot joints for the lower support arm relative to the spring and spring support has been shown and described, the present is not so limited, and contemplates other configurations of pivot joint. For example, the present invention also contemplates the use of a single lower inboard pivot joint and dual, aligned outboard pivot joints. Further, although the upper and lower inboard pivot axes are shown generally perpendicular to rotational axis 624, the present invention also contemplates those embodiments in which the upper and lower support arms are arranged in a semi-trailing arm configuration, similar to that described for suspension system 520.

As can best be seen in FIGS. 27 and 28, the distance 650 between the outboard front pivot axis 647 and the inboard front pivot axis 643 of upper support arm 640 is about the same as the distance 670 between the outboard front pivot axis 667 and the inboard front pivot axis 663 of lower support arm 660. Further, the upper outboard pivot axis 647 of pivot joints 646 and 648 are preferably aligned generally above the lower outboard pivot axis 667. The upper inboard pivot axis 643 is preferably located generally above the lower inboard pivot axis 663. Referring to FIG. 28, the vertical spacing 688 between upper and lower inboard pivot axes is about the same as the vertical spacing 689 between the upper and lower outboard pivot axes. Suspension system 620 includes a pair of upper and lower pivoting arms which are equal length between inboard and outboard pivot axes and generally parallel.

As best seen in FIGS. 27 and 30, suspension system 620 includes a motion dampener 696 which is placed inboard of spring 692 and below chassis floor 635. Motion dampener or shock absorber 696 extends and compresses along a working axis 695 formed by the shock pivot points 697 and 698. One end 697 of shock absorber 696 is pivotally connected to a portion of vehicle frame 630. The other end 698 of shock absorber 696 is pivotally connected to a shock support extension or projection 652 of upper pivot arm 640. Referring to FIG. 27, projection 652 is spaced inboard of pivot axis 643, such that rotation of support arm 640 about pivot axis 643 moves shock pivot point 698 up and down. Preferably, projection 652 is also angled downward, such that shock pivot point 698 is lower than pivot axis 643. With this lower placement the shock pivot point 698 moves laterally as support arm 640 pivots. As upper arm 640 pivots about pivot axis 643, shock support 652 also pivots. For example, upward motion of wheel 622 results in extension of shock 696. Downward motion of wheel 622 relative to frame 630 results in compression of shock 696. The present invention also contemplates those embodiments in which a shock support extension extends from lower support arm 660. Preferably, shock 696 is placed between parallel opposing frame members such as frame cross members 634d and 634e. The pair of frame members 634d and 634e form a channel 634f for shock 696. Frame member 634f and 634e protect shock 696 from objects on the roadway.

A wheel suspension system 720 according to another embodiment of the present invention is shown in FIGS. 31-35

Figure 35:
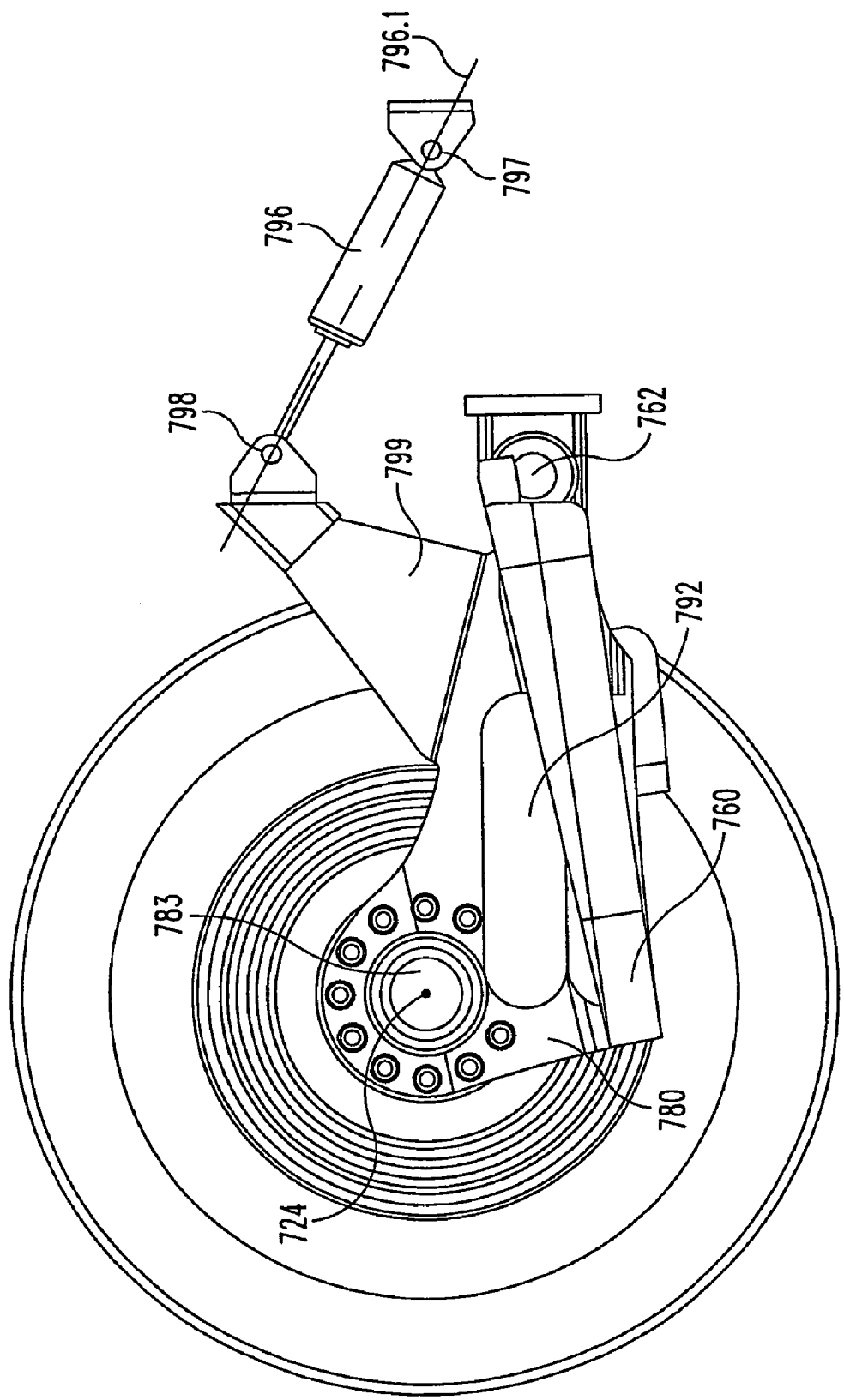
FIG. 35 is a right side elevational view of a portion of the suspension system of FIG. 31, with portions of the frame removed.

As best seen in FIG. 35, wheel suspension system 720 includes a single pivotal arm support 760 which is pivotally coupled to a transverse cross member 734a of frame 730. Support 760 pivots about a front pivot axis 763 that is located in front of the rotational axis 724 of wheel 722.

As best seen in FIG. 35, inboard and outboard pivot joints 766 and 762, respectively, are located below wheel rotational axis 724. An air spring 792 is also located at least in part below rotational axis 724. Air spring 792 interfaces on one end with a support arm spring support 772, and interfaces on the other end with the bottom of chassis floor 735 (not shown).

Wheel suspension system 720 includes a shock absorber 796 preferably located in front of wheel 722. The line of action 796.1 of shock 796 lies in a plane that is generally parallel to a vertical plane. One end of shock absorber 796 includes a pivotal attachment 797 to frame member 730. The other end of shock 796 includes a pivotal attachment 798 to a bracket 779 that is fastened to spindle support 780. As best appreciated in FIG. 35, upward pivotal motion of support arm 760 results in compression of shock absorber 796; downward pivotal motion of support arm 760 results in extension of shock absorber 796.

Figure 31:
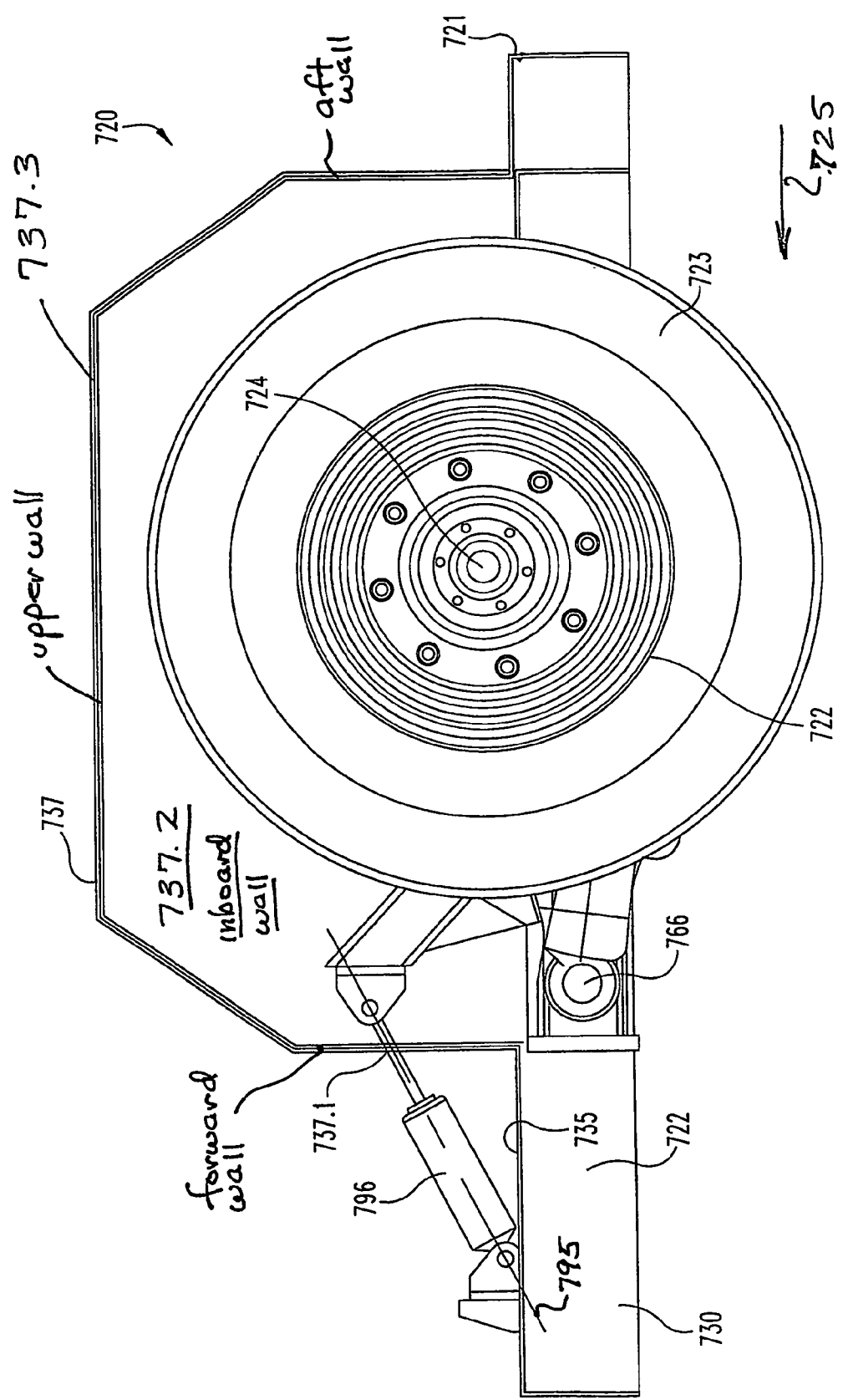
FIG. 31 is a left side elevational view of a wheel suspension system according to another embodiment of the present invention.
Figure 32:
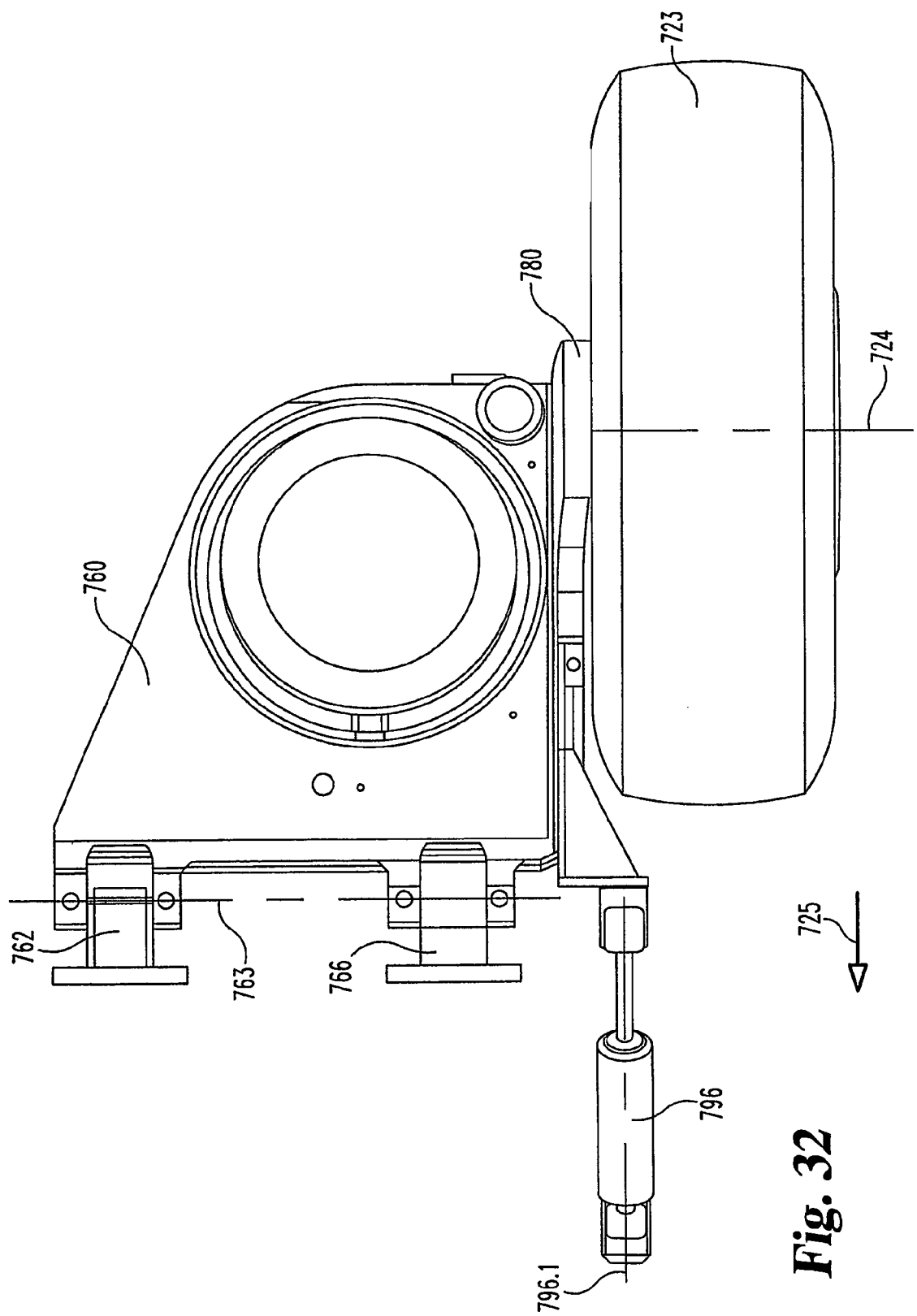
FIG. 32 is a top view of a portion of the suspension system of FIG. 31, with portions of the frame removed.
Figure 33:
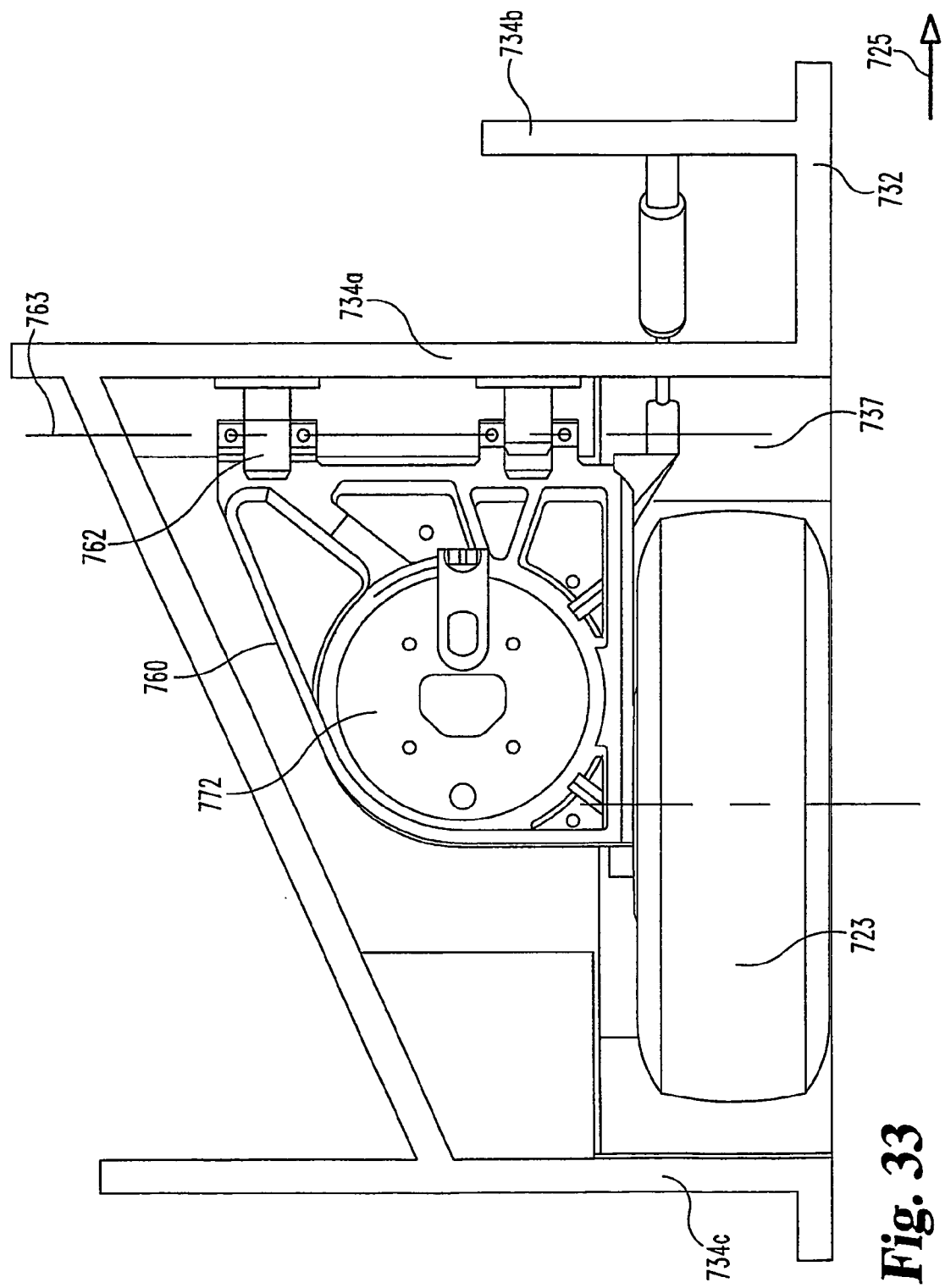
FIG. 33 is a bottom view of the suspension system of FIG. 31.
Figure 34:
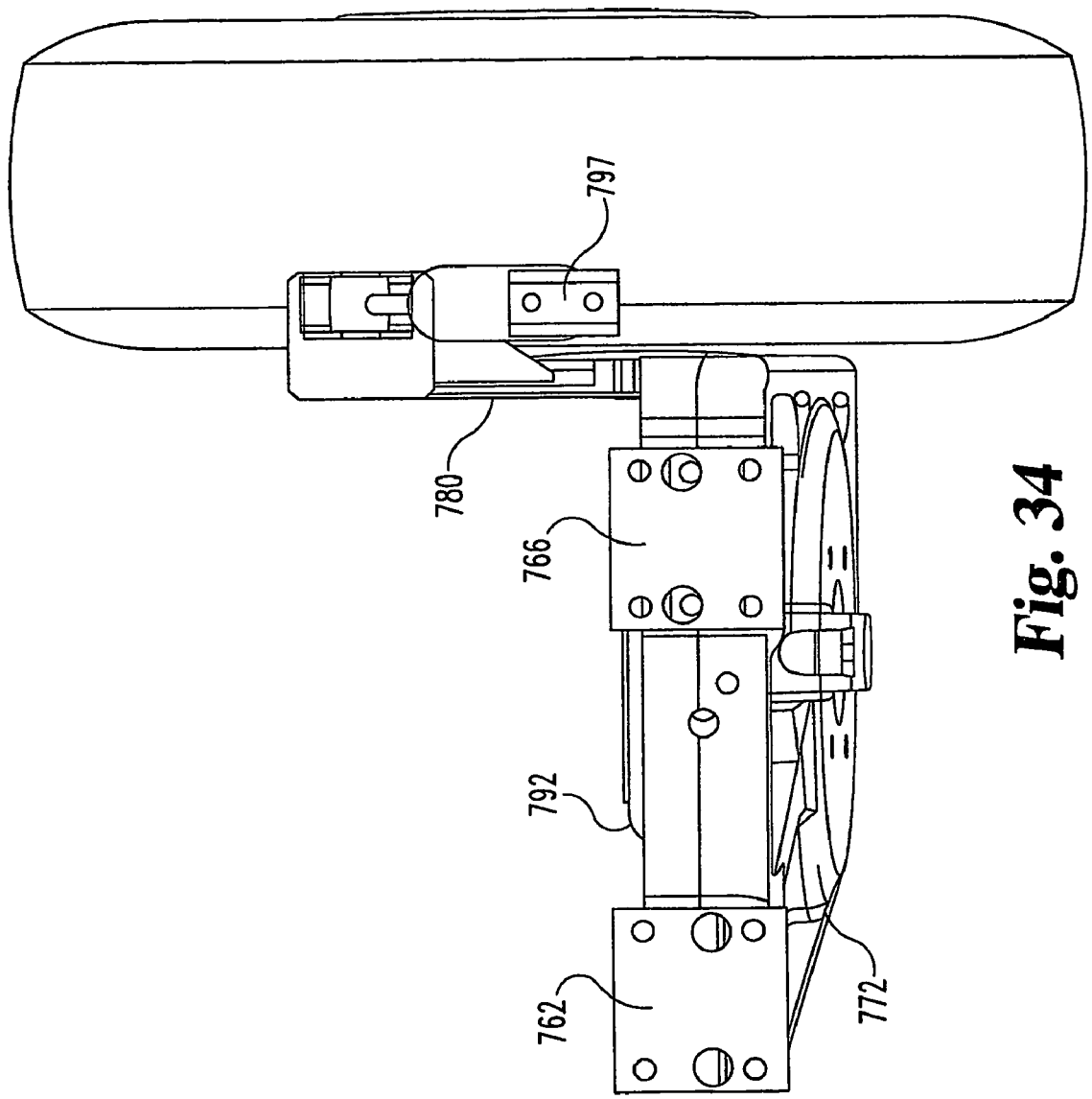
FIG. 34 is a front end view of a portion of the suspension system of FIG. 31, with portions of the frame removed.

Referring to FIG. 31, a portion of shock absorber 796 passes through an aperture 737.1 in wheel housing 737. Placement of shock absorber 796 in front of wheel 723 and outboard of pivot joint 766 maintains a low, in-line packaging arrangement that provides optimum payload space on frame 730. Further, as compared to those designs in which shock 796 is attached to the wheel housing, the frame attachment shown in suspension system 720 permits the use of a lighter weight wheel housing.

FIGS. 36a, 36b and 36c depict a shock absorber bracket 799 according to one embodiment of the present invention. Bracket 799 includes an arm 799b which extends from a fastenable base 799c. One end of arm 799b includes a portion of pivotal joint 798.

Yet further embodiments of the present invention relate to arrangements of vehicle suspensions in a compact manner, including suspensions contained within a wheel housing. The various embodiments to follow can be combined with the embodiments shown and described thus far. For example, the present invention contemplates packaging of a dual arm suspension within a wheel housing which is sufficiently reinforced to have the strength and stiffness desirable for the loads encountered by the upper and lower support arms. Further, although there may be slight differences in nomenclature between the aforementioned embodiments and the embodiments described hereafter, those of ordinary skill in the art will readily recognize the similarities. As one example, a "pivot joint" as used previously is the same as the "pivot assembly" used hereafter.

Some embodiments of the present invention relate to apparatus and methods for compactly arranging a vehicle suspension. In particular, some embodiments of the present invention pertain to vehicles, including cars, buses, trucks, towed trailers, and the like, in which a portion of the floor, and especially the rear floor, is at a level below the rotational axis of the rear axes of the rear wheels.

In some embodiments, the suspension is compactly arranged within a small volume of the vehicle, such as a wheelhouse. This compact arrangement can include the wheel support, a biasing member such as a spring, a shock absorber, the pivot joints for the wheel support, and various braking elements.

Yet other embodiments of the present invention pertain to methods and apparatus for supporting a wheel from a frame. In some embodiments, the wheels are attached to stub axles which are cantilevered from a wheel support. The wheel support can be of the trailing type or of the leading arm type. Preferably, the wheel support is coupled to the vehicle frame by a pair of spaced-apart pivot joints. In some embodiments, both of the wheel supports are contained within the corresponding wheelhouse of the vehicle.

Preferably, each pivot joint has a pivot axis and the pivot axis of the inboard pivot joint and the outboard pivot joint are preferably co-linear. In some embodiments the pivot axes are also parallel to the rotational axis of the supported wheel. In other embodiments, the pivot axis is coplanar with the rotational axis, but not parallel with the rotational axis. The present invention also contemplates those embodiments in which the pivot axis is forwardly inclined relative to the rotational axis, such that the two axes diverge in a direction laterally outwardly from the vehicle centerline. The present invention also contemplates those embodiments in which the pivot axis is rearwardly inclined such that the pivot axis and the rotational axis come closer together at a location laterally and outwardly from the vehicle centerline.

The present invention also contemplates those embodiments in which the rotational axis and the pivot axis are not co-planar, and further includes those embodiments in which the pivot and rotational axes are not co-planar and further include either rearward inclination or forward inclination.

In some embodiments of the present invention, there is a pivotal wheel support adapted and configured to be compactly arranged within a wheelhousing. In some embodiments, the wheel support includes two pivot joints acting along a common axis that are spaced apart to provide improved lateral support of the wheel. When the wheel support is pivotally coupled to a vehicle, one pivot joint is located outboard of the contacting face (for example, face 10144.1) which establishes the lateral location of the supported stub axle. The other pivotal coupling is preferably arranged along a common pivot axis, but located inboard of the outboard pivot joint. In some embodiments, this face defines a plane (such as plane 10144.2) which intercepts the common pivot axis at a location preferably in between the outboard and inboard pivot joints. In yet other embodiments, the compact arrangement is achieved with a wheel support in which the outboard-most pivotal coupling is generally located over the track of the supported tire (for instance, tire track 10130.2 for a tire 10130.1).

The present invention further contemplates various configurations and mounting arrangements for a biasing member. The biasing member can be an airbag, coil spring, leaf spring, oil over oil actuator, air over oil actuator, or electrical over oil actuator. In some embodiments, the forces exerted by the biasing member are aligned substantially vertically. As one example, the present invention includes those suspensions having an airbag which urges apart an upper surface of the support arm from a lower surface of the wheelhouse. As another example, the present invention contemplates an electric over oil actuator arranged such that the biasing forces are exerted against a rearward facing portion of forward frame structure and a forward facing portion of the wheel support.

Various embodiments of the present invention include different arrangements for mounting the dual pivot joints. In some embodiments, the pivot joints are attached to the frame such that the pivot axis is above the rotational axis of the wheel when the spacing between the wheel support and the vehicle frame is at a typical ride height. With such an arrangement the loads imparted by the tire to the wheel support and into the pivot joints are at least partly in tension during jounce (i.e., hitting a bump) because of the tendency of the wheel support to move aft as it moves along its constrained arc. Yet other embodiments of the present invention include a single pivot joint which extends across a substantial portion of the width of the wheel support.

Yet other embodiments of the present invention include suspensions where the pivot axis is placed below the rotational axis when the distance between the wheel support and the vehicle frame is representative of a typical ride height. In such embodiments the response of the wheel support to rebound (i.e., the wheel falling into a chuckhole) includes at least partly placing the support arm and the pivot joints in tension because of the movement of the wheel support along its constrained arc.

As used hereafter, the small letters a, b, c, and d refer to orientation of the component on the right or left. The suffixes -a and -c refer to forward and rearward components respectively, on the left side of the vehicle (as facing forward), and the suffixes -b and -d refer to forward and rearward components on the right side of the frame. Also, as used hereafter, the use of a 1RS-series prefix (1RS) in front of an element number (1RSXX) indicates an element that is the same as other elements with the same suffix (XX), except for the changes which are shown or described hereafter.

The FIGS. 55 and 56 show side and top views, respectively, of a portion of a vehicle 10020 having a low rear floor. Vehicle 10020 includes a chassis having a front frame 10022 supporting a cab section 10024. The front frame 10028 also supports a power train (not shown) and a pair of powered, steerable front wheels 10026. Rear frame 10022 supports a plurality of preferably unpowered, preferably non-steerable rear wheels 10030. Rear frame 10022 has a preferably flat, substantially planar top surface 10032 which can support any of a variety of payloads, including the rear sections of a passenger van, ambulance, delivery truck, or other sections. In some embodiments of the present invention, the top surface 10032 of rear frame 10022 is generally at or below the rotational axes of the rear wheels 10030. However, the present invention also contemplates those embodiments in which the top surface of the rear frame is above the rotational axes of the rear wheels. The bottom surface 10034 of rear frame 10022 is preferably 6 to 8 inches above the roadway.

Referring to FIG. 56, frame 10022 is of a ladder-type construction comprised of a plurality of longitudinal members 10082a and 10082b which are preferably coupled to each other by a plurality of internal transverse members 10086. In some embodiments, as will be seen later, there is a further plurality of outboard transverse members 10088 which extend the outboard edges of the frame to lateral positions proximate to the tracks of the rear tires. The tire tracks 10030.2 are shown with zigzag indications both in front of and behind the tires 10030.1a, b, c, and d. In the embodiment shown in FIG. 56, the outboard transverse members (sometimes referred to as outriggers) between the cab section 10028 and rear wheels 10030 have been removed to accommodate placement of a payload such as an ambulance. Although a vehicle 10020 with a front cab section 10026 such as the front end of a Ford F450® cab has been shown and described, the present invention also contemplates other types of cabs, and further contemplates a cab section having a front frame that is substantially the same height as the rear frame.

FIGS. 57, 58, and 59 show front and top perspective, top plan, and side elevational views of a portion of the rear suspension of vehicle 10020. Front left rear wheel 10030a and its tire are supported by a wheel support 10040a that is pivotally coupled to frame 10022. Wheel 10030a is supported by a stub axle 10043a that is cantilevered from an upright flange 10044a of wheel support 10040a. Further details of wheel support 10040a can be found U.S. Pat. No. 6,398,251 issued Jun. 4, 2002.

Wheel support 10040a is pivotally coupled by outboard and inboard pivot assemblies 10052a and 10056a, respectively which are bolted or otherwise affixed to a stationary pivot support 10062a of frame 10022. Each pivot assembly 10052a and 10056a include inner pivoting members 10053a and 10057a, respectively, which are preferably bonded by a resilient material (such as an elastomeric compound) to outer stationary members 10054a and 10058a, respectively. Preferably, the pivot assemblies 10052a and 10056a are coupled to wheel support pivot attachments 10055a and 10059a, respectively, which are adapted and configured such that shimming of one pivot accommodates changes to toe in, and shimming changes to the other pivot assembly accommodates changes to camber, similar to the toe in and camber adjustment features shown in U.S. Pat. No. 6,398,251.

In one embodiment, and as best seen in FIG. 59, the pivot assemblies 10052 and 10056 are bolted to a stationary pivot support 10062a that places the pivot axis 10060a above the top surface 10032 of frame 10022. In some embodiments, pivot axis 10060a is also placed at the same horizontal level as rotational axis 10043a, or above the rotational axis. As best seen in FIG. 58, pivot axis 10060a is parallel to rotational axis 10043a, although in other embodiments to be described later this parallel relationship is not maintained.

As seen in FIGS. 57, 58, and 59, wheel 10030a and wheel support 10040a are biased to a position relative to frame 10022 by a biasing unit or actuator 10070. Some embodiments of the present invention contemplate the use of a biasing unit 10070 such as in air bag or coil spring. Yet other embodiments of the present invention contemplate the use of an actuator 10070 such as an electric over oil actuator. In some embodiments of the present invention, biasing units or actuator 10070 applies a load that urges apart a static portion of the frame from the pivoting wheel support. As best seen in FIG. 57, actuator 10070a is coupled to frame 10022 by a stationary flange or bracket 10072a which is preferably rigidly coupled to pivot support 10062a by a method such as welding. The other end of actuator 10070a is pivotally coupled to a pivoting flange or a bracket 10071a that is preferably attached to or integrally cast with wheel support 10040a.

FIGS. 61-68 depict another embodiment of the present invention. Rear frame 10122 of a vehicle 10120 includes a pair of opposed rear wheels 10130a and 10130b. Rear wheels 10130a and 10130b are pivotally supported from frame 10122 by a suspension system that is compactly arranged to fit within wheelhousings 10180a and 10180b, respectively. As best seen in FIGS. 61, 62, 63, and 68, a wheelhousing 10180a is preferably fabricated from sheet metal and preferably rigidly coupled fore and aft transverse structural members 10188 of frame 10122. Some embodiments of the present invention include right side outboard longitudinal members 10182.2a and 10182.4a, and left side outboard longitudinal members 10182.2b and 10182.4b which are laterally placed preferably in the path of the tire track of that same side (as best seen in FIG. 66). In such embodiments there is a rigid connection between the fore or aft portion of the wheelhousing and the corresponding longitudinal and transverse frame members.

As best seen in FIG. 63, the forward end 10180.2b of wheelhousing 10180b and forward right side outboard longitudinal member 10182.2b and transverse member 10188.2b are preferably rigidly connected. Further, there is preferably a rigid connection among the rear section 10180.4b of wheelhousing 10180b and aft, outboard, right side longitudinal member 10182.4b and transverse member 10188.4b. For sake of clarity, the innermost panel or wall of wheelhousing 10180a has been removed. However, in some embodiments of the present invention, this inner panel interconnects the forward, top, and rear panels at a location just inboard of the wheel support. Referring again to FIG. 66, the wheelhousing (not shown) preferably provides a load path from the aft outboard longitudinal member 10182.4a to the front outboard longitudinal member 10182.2a. However, the present invention is not constrained to the use of a structural wheelhousing, and also contemplates those embodiments in which the wheelhousing is non structural including those embodiments in which the wheelhousing is fabricated into the payload section which sits on top of the rear frame.

As best seen in FIGS. 60, 65, and 68, rear wheels 10130a and 10130b are pivotally coupled to a frame structural member 10162a or 10162b, respectively, that locates corresponding pivot axes 10160a and 10160b, respectively, above the corresponding rotational axis 10143a and 10143b, respectively, when the wheel 10130*a* or 10130*b* is in a position of the typical ride height. FIG. 65 shows a wheel 10130*b*' at its typical ride height, that same wheel 10130*b*'' at a position known as rebound (corresponding to the tire falling into a chuckhole), and the tire 10130*b*''' shown at a position corresponding to jounce (corresponding to the tire hitting a bump in the roadway). As the wheel 10130 swings from a position of full rebound to full jounce the rotational axis 10143*b* follows a circular arc in space established by the pivotal motion about the fixed pivot axis 10160*b*. The tire track 10130.2' is shown both in front of and behind tire 10130.1'*b*.

The longitudinal distance from the front of wheelhousing 10180*b* to rotational axis 10143*b* is shown along the top of FIG. 65 as 33.81 inches at typical ride height; 32.61 inches for rebound; and 34.19 inches for jounce. In comparing these numbers, it can be seen that a bump in the roadway (jounce) temporarily causes the wheel 10130*b* to move aft by the difference between distances 10145*b*' and 10145*b*'''. Conversely, as wheel 10130*b* moves from its typical ride height position to the rebound position, the wheel moves forward by the difference between ride height position 10145*b*' and the rebound position 10145*b*''. Therefore, by placing the pivot axis above the rotational axis of the wheel at typical ride height position, the wheel support 10140*b* can be thought of as having a tension component as it moves to jounce and the distance 10145*b* lengthens, and a compressive component as it moves to rebound and the distance 10145*b* shortens. As will be seen later, the correspondence of jounce to tension and rebound to compression for a pivot axis above the rotational axis changes if the pivot axis is placed below the rotational axis at typical ride height, as will be discussed with FIGS. 70 and 71. Therefore, some embodiments of the present invention permits the designer to tailor the stresses in the wheel support (and also the stresses in the tire sidewall) based upon the designer's expectation that the vehicle will encounter primarily jounce or primarily rebound.

Referring to FIGS. 61, 62, 66, and 68, it can be seen that in some embodiments of the present invention the components of the suspension are compact plate arranged within the wheelhousing. As best seen in FIG. 68, structural member 10162*a*, airbag 10150*a*, and other components are contained within the lateral extent of wheelhousing 10180*a*. Wheelhousing 10180*a* extends laterally from the outboard faces of longitudinal members 10182.2*a* and 10182.4*a*, in a direction inboard to a plane located just inboard of the inner surface of wheel support 10140*a* and the inboard face of stationary pivot support 10162*a*. The longitudinal extent of wheelhousing 10180*a* is from a position just aft of tire 10130.1 to a position just in front of pivot assemblies 10152*a* and 10156*a*. The upper extent of wheelhousing 10180 is to a point just above the full rebound position of the supported tire 10130.1*a*

As previously discussed, in referring to FIG. 66, wheel support 10140*a* is pivotally coupled by inboard and outboard pivot assemblies 10152*a* and 10156*a* to a frame member 10162*a* that permits placement of the pivot axis 10160*a* above the rotational axis 10143*a* of the wheel when it is in its typical ride height position. Preferably, structural member 10162*a* is contained within the lateral extent of wheelhousing 10180*a* as shown in FIG. 68. FIGS. 61, 62, and 66 depict an embodiment in which the lateral extent of the frame support 10162*a* extends inboard beyond the inboard plane of the wheelhousing. However, by removing the cross-hatched portion of the frame member a low floor 10132*a* is maintained, as seen in FIG. 61. FIG. 66 shows with a zigzag pattern the forward tire track 10132.2*a* of tire 10130.1*a*.

FIGS. 63 and 66 show other components of the compactly arranged suspension. Wheel support 10140*a* and 10140*b* are pivotally supported by a pair of pivot joints that are spaced apart yet adapted and configured to fit within the wheelhousing. Biasing members or springs 10150*a* and 10150*b* urge apart wheel support 10140*a* and 10140*b*, respectively, from the upper surface of the wheelhousing. Each air spring is coupled at one end to a spring stationary support 10181 that extends downward from the top surface of the wheelhousing 10180. The bottom end of the air spring 10150 is coupled to the pivoting spring support portion 10146 of wheel support 10140. Although the wheelhousings 10180*a* and 10180*b* and stationary wheel supports 10181*a* and 10181*b* are shown being laterally open, the present invention also contemplates those embodiments in which the spring support 10181 is of any configuration sufficient to transfer loads from the biasing unit into the frame 10122, and also where the wheelhousings are closed along the laterally inboard openings or otherwise structurally supported to maintain their shape.

FIG. 65 also shows other components in their relative positions as the wheel moves from jounce to rebound. Actuator 10170*b* is shown in the typical ride height (10170*b*'), rebound (10170*b*''), and jounce (10170*b*''') positions. Further, wheel support 10140*b* is shown in the jounce, typical ride height, and rebound positions of 10140*b*''', 10140*b*', and 10140*b*'', respectively.

In one embodiment of the present invention, wheel support 10140 is urged apart from the frame by a biasing member or spring 10150, and further by an actuator 10170. Preferably, actuator 10170 is a shock absorber, but can also be any of the types of actuators or biasing members previously discussed for element 1070. Preferably, biasing member 10150 is an airbag, but could also be a leaf spring, or oil actuator, air over oil actuator or electric over oil actuator. Actuator 10170 is pivotally connected to a stationary flange or bracket 10172 into a pivoting flange or bracket 10171.

Referring to FIG. 67, it can be seen that in some embodiments of the present invention there is a skewing of about 2-6 degrees between pivot axis 10160*a* and rotational axis 10143*a* as identified by angle 10164*a* in FIG. 67. Thus, pivot axes 10160*a* and 10143*a* converge in a direction laterally inboard, and diverge in a direction laterally outboard from frame 10122. Preferably, pivot axis 10160*a* and rotational axis 10143*a* are coplanar, although the present invention also contemplates those embodiments in which the two axes are not coplanar, such that pivot axis 10160 is inclined vertically up in the inboard direction and vertically down in the outboard direction, and also those embodiments in which the pivot axis is inclined laterally downward in the inboard direction and laterally upward in the outboard direction.

Referring to FIGS. 65 and 67, it can be seen that in some embodiments of the present invention the pivot axis and rotational axis can be positioned to influence tension and compression components and jounce and rebound as previously described, but by skewing the axis as shown in FIG. 67 the wheel 10130 and its associated tire can be made to move inboard and outboard (i.e., a scrubbing motion on the tire contact surface) as the wheel pivots from its typical ride height to jounce or rebound. For a pivot axis forwardly inclined as shown in FIG. 67, wheel 10130*a* and its associated tire will move slightly inboard as wheel support 10140*a* pivots away from its typical ride height position. However, the present invention also contemplates those embodiments in which the pivot axis is rearwardly inclined (i.e., about 2 to 6 degrees of skew in a direction opposite to that shown in FIG. 67), in which case wheel 10130*a* and its associated tire will move outwardly as wheel support 10140 pivots along its arc. This lateral motion of the wheel and tire places a side load on the laterally spaced apart pivot joints 10152 and 10156. Thus, the suspension designer can predictably alter the ratio of loading between the inboard and outboard pivot joints based upon whether the anticipated roadway environment for the vehicle includes more bumps (jounce) or chuckholes (rebound). For example, some public roadways tend to have more chuckholes than bumps, whereas some private roadways have more bumps, which as speed bumps, than chuckholes.

Referring to FIGS. 66 and 67, it can be seen that the stub axle 10142a is established laterally (inboard versus outboard) by contacting a face 10144.1a of wheel support 10140a. This contacting face 10144.1a establishes a plane 10144.2a that preferably intercepts pivot axis 10160a at a position in between the inboard and outboard pivot assemblies. Further, as best seen in FIG. 66, at least a portion of outboard pivot assembly 10152a is located over the track 10130.2a of tire 10130.1a. FIG. 66 also shows that in some embodiments an actuator 10170a is located above the inboard and outboard pivot assemblies and also in between the inboard and outboard pivot assemblies. It is believed that the arrangement of the pivot assemblies, actuator, and stub axle permit the design of a compact wheel support of acceptable weight and sufficient lateral stability to be located within a wheelhousing.

FIG. 69 is a side elevational view of a portion of a low floor, substantially flat frame 10222 according to another embodiment of the present invention. FIG. 69 shows the suspension for a right side wheel 10230b which is pivotally supported from frame 10222 by a leading arm wheel support 10240b. Frame 10222 is adapted and configured for a motion in the forward direction 10221. In some embodiments, pivot axis 10260b for the pair of pivotal supports is located above the rotational axis 10243b when the vehicle is at a typical ride height. The views of this wheel and suspension from above and the front are substantially the same as those shown for frame 10122, except for the leading arm orientation of wheel support 10240b.

FIGS. 70 and 71 are side elevational views according to another embodiment of the present invention. A portion of a rear frame 10322 for a low floor vehicle is shown in FIG. 70 with the wheel and tire shown in both the typical ride height and rebound positions. FIG. 71 depicts the same view as FIG. 70 except that the tires and the wheel are transparent. Frame 10322 is substantially the same as frame 10122, except that the stationary pivot support 10362a is located below the top surface 10332 of frame 10322, such that the pivot axis 10360a for wheel support 10340a is located below the rotational axis 345a' (i.e., when the wheel 10340a is at the typical road height). It can be seen that the stationary pivot support 10362a is closer to the surface of the roadway than lower surface 10334 of frame 10322. Therefore, there is reduced ground clearance in the vicinity of inboard and outboard pivot joints 10356a and 10352a, respectively. However, proximity of support 10362 and the corresponding pivot joints 10352 and 10356 to the wheel 10345 and the associated tire provides protection from many ground objects.

FIGS. 70 and 71 show that the suspension components of frame 10322 are compactly arranged within wheelhousing 10380a. Unlike the compact arrangement of frame 10122, the stationary pivot support 10362a and the pivot joints 10356 and 10352a are preferably located below the top surface of wheelhousing 10380, and preferably within the fore and aft panels of wheelhousing 10380a. However, the present invention also contemplates those embodiments in which stationary pivot support 10362a is located forward of the forward end of wheelhousing 10380.

FIG. 72 is a side, elevational, schematic representation according to another embodiment of the present invention. A wheel 10430 and its associated suspension is shown as a part of a rear frame 10422. Wheel 10438a and its associated tire are shown in a typical ride height position. In this embodiment, the rotational axis 10445a' is substantially parallel and coplanar with pivot axis 10460a. However, the present invention also contemplates those embodiments in which rotational axis 10445a' is below the pivot axis at its typical ride height, and also those embodiments in which the rotational axis 10445a' is above the pivot axis at its typical ride height position.

Wheel 10430a is pivotally supported by a wheel support 10440a that is adapted and configured to be biased to a position by a biasing member 10450a that applies a biasing force in a substantially horizontal direction. Wheel support 10440a includes a vertically oriented spring support section 10480a which is preferably coupled to one end of an airbag 10450a. The other end of airbag 10450a is preferably coupled to static portion 10472a of rear frame 10422.

Wheel support 10440a preferably rearwardly extending support arm 10447 that pivotally couples to an actuator or shock absorber 10470a. The other end of actuator 10478 is preferably pivotally coupled to wheel housing 10480a by a stationary support member 10481a. In some embodiments of the present invention, the suspension supporting wheel 10430a is compactly arranged within wheel housing 10480a.

FIGS. 73, 74, and 75 are perspective views of a frame 10522 according to another embodiment of the present invention. In FIGS. 74 and 75, frame 10522' is the same as frame 10522, except that frame 1022' has not been modified to accommodate a pivot axis placed above the rotational axis.

It has been discovered that there are several geometric ratios and dimensions that are preferable in the design of chassis, frames, and suspensions for vehicles having a floor that is below the rotational axis of the rear wheels. These geometric relationships are applicable to the chassis, frame, and suspension disclosed herein, as well as those disclosed in the patents and applications incorporated herein by reference, as well as many other types of chassis, frame, and suspension systems for low floor vehicles. In some cases, the recommendations below make references to FIGS. 73, 74, and 75, although some of the elements will be found in other figures. It is understood that none of these recommendations are not requirements for a low floor vehicle. Rather, it is been discovered that these relationships are useful in designing a low floor vehicle which is convenient for users, relatively simple to manufacture, compactly arranged and packaged for minimal intrusion into the payload space.

A low floor chassis wherein the longitudinal members 10582 are of a vertical height dimension A equal to but not less than about 40 percent of the vertical dimensional height of the chassis ground clearance B between bottom surface 10534 of said longitudinal member and the road surface said chassis 10522 is traveling.

A low floor chassis wherein the transverse cross members 10589 (outriggers) which connect to the longitudinal members 10582 and which support the mounting of the wheel suspension arms 10540 have a vertical height dimension C equal to but not less than about 75 percent of the vertical height dimension A of the longitudinal members of the vehicle chassis 10522.

A low floor chassis wherein the longitudinal members 10582 have a centerline separation D from the vehicle centerline X equal to or less than about 50 percent of the dimensional length E of the transverse cross member 10586.

A low floor chassis wherein the pivot shafts dimensional diameters are equal to or greater than about 30 percent of the vertical dimensional height C of the cross member 10562 or 1086 or 10588 that it mounts to.

A low floor chassis wherein the bushings 10554 or 556 which support the pivot arm 10540 through the pivot shafts 10553 or 10557 shall have a dimensional diameter F equal to but not less than about 50 percent of the vertical height dimension C of the cross member 10562 or 10586 or 10588 that is mounts to.

A low floor chassis wherein a resilient arm pivot joint 10552 or 51056 wherein the inside diameter H of the bearing that supports an arm pivot shaft 10553 or 10557 is not less than about 50 percent of the dimensional outside diameter G of the bearing.

A low floor chassis wherein the distance I between the inboard arm pivot joint 10556 and the outboard pivot joint 10552 is not less than two times the outside diameter G of the arm pivot bearing.

A low floor chassis wherein a pivot arm joint 10552 or 10556 wherein the outside diameter of the bearing G is a greater dimension than the longitudinal length dimension J.

A low floor chassis wherein pivot joint 10552 or 10556 outside diameter G is at least about 40 percent of the dimensional vertical height A of the frame 10522 longitudinal members 10582 to support wheel capacities of about 4500 pounds or greater, or about 6000 pounds vehicle weight or greater.

Yet other examples of the geometric ratios and dimensions preferable in the design of low floor vehicles can be found in the following table. This table provides dimensions, in inches, that have been found to be preferably associated with the amount of weight supported by a single wheel. The table shows supported weights of 3500 pounds, 6000 pounds, and 7000 pounds per wheel. The range of dimensions and preferable dimensions are shown in inches. Dimension (K) is the dimension from a substantially planar top surface of the frame to the rotational axis of the wheel (see FIG. 51). Dimension (L) is the distance from the roadway to the rotational axis (see FIG. 61). Dimension (M) and Dimension (N) are the diameters of the wheel and tire, respectively (see FIG. 69).

| Dim., inches | 3500 pounds range | 3500 pounds Preferable | 6000 pounds range | 6000 pounds preferable | 7000 pounds range | 7000 pounds preferable |
| --- | --- | --- | --- | --- | --- | --- |
| A | 4 to 6 | 4 | 4 to 6 | 5 | 5 to 6 | 5 |
| B | 7 to 8 | 7 | 7 to 8 | 8 | 7 to 8 | 8 |
| K | 3 to 4 | 4 | 2 to 4 | 2 | 3 to 4 | 4 |
| L |  | 15 |  | 15.5 |  | 17 |
| M |  | 16.5 |  | 19.5 |  | 22.5 |
| N |  | 29.2 |  | 31.4 |  | 34.4 |

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A suspension system for a vehicle comprising: a first wheel; a second wheel; a first stub axle providing support to said first wheel about a first rotational axis, said first stub axle being coupled to a first spindle support; a second stub axle providing support to said second wheel about a second rotational axis, a frame including a substantially flat portion having a top surface, said first wheel being located on one side of said frame, said second wheel being located on an opposing side of said frame, said portion being disposed generally beneath the first and second rotational axes; an upper pivotal support arm pivotally coupled to said first spindle support, said upper pivotal support arm being pivotally coupled to said frame below the top surface; and a lower pivotal support arm pivotally coupled to said first spindle support, said lower pivotal support arm being pivotally coupled to said frame below the top surface, said lower pivotal support arm being below said upper pivotal support arm.

2. The suspension of claim 1 wherein said upper support arm is pivotally coupled to said first spindle support below said first stub axle and above the pivotal coupling of said lower support arm and said first spindle support.

3. The suspension of claim 1 wherein said upper support arm is pivotal relative to said frame about an upper pivot axis, said lower support arm is pivotal relative to said frame about a lower pivot axis, the upper pivot axis is substantially perpendicular to the first rotational axis and the upper pivot axis is substantially parallel to the lower pivot axis.

4. The suspension system of claim 1 wherein the pivotal coupling of said upper pivotal support arm to said frame is below the top surface when the vehicle is transporting cargo or people.

5. The suspension system of claim 1 wherein said first spindle support provides cantilevered support of said first stub axle.

6. A vehicle comprising: a first unpowered rear wheel; a second unpowered rear wheel; a first stub axle providing support to said first wheel about a first rotational axis, said first stub axle being coupled to a first spindle support; a second stub axle providing support to said second wheel about a second rotational axis, a frame including a substantially flat portion having a top surface, said first wheel being located on one side of said frame, said second wheel being located on an opposing side of said frame, said portion being disposed generally beneath the first and second rotational axes; a payload section for transporting cargo or persons, said payload section having a floor supported at least in part by the top surface of said frame; a first pivotal support arm pivotally coupled to said first spindle support, said first support arm being pivotally coupled to the vehicle; a second pivotal support arm pivotally coupled to said first spindle support, said second pivotal support arm being pivotally coupled to said frame; and a biasing member urging apart one of said first support arm or said second support arm from one of said floor or said frame, said biasing member being located under said floor.

7. The vehicle of claim 6 wherein said second support arm is below said first support arm, said first support arm defines an aperture, said biasing member urges apart said second support arm from one of said floor or said frame, and said biasing member extends through the aperture.

8. The vehicle of claim 7 wherein said biasing member is an air spring.

9. The vehicle of claim 7 wherein said biasing member is electronically actuated.

10. The vehicle of claim 6 wherein said first and second support arms are pivotal about pivot axes that are forward and below the rotational axis of said first rear wheel.

11. The vehicle of claim 6 wherein the pivot axes are perpendicular to the rotational axes of said first and second rear wheels.

12. The vehicle of claim 6 which further comprises a first pair of pivot joints laterally spaced apart and coupling said first support arm to said frame, and a second pair of pivot joints laterally spaced apart and coupling said second support arm to said frame.

13. The vehicle of claim 6 wherein the top surface is substantially parallel to the roadway when the vehicle is transporting cargo or people.

14. A vehicle comprising: a first unpowered rear wheel; a second unpowered rear wheel; a first stub axle providing support to said first wheel about a first rotational axis; a second stub axle providing support to said second wheel about a second rotational axis; a frame including a substantially flat portion having a top surface, said first wheel being located on one side of said frame, said second wheel being located on an opposing side of said frame, said portion being disposed generally beneath the first and second rotational axes; a first pivotal support arm pivotally supporting said first stub axle by first and second pivotal attachments, said first support arm being pivotally coupled to said frame by third and fourth pivotal attachments, said first and second pivotal attachments being spaced apart and being pivotal about a first pivot axis, said third and fourth pivotal attachments being spaced apart and being pivotal about a second pivot axis; and a second pivotal support arm pivotally supporting said first spindle support, said second pivotal support arm being pivotally coupled to said frame.

15. The vehicle of claim 14 wherein said first pivot axis is substantially parallel to said second pivot axis.

16. The vehicle of claim 14 wherein said second support arm is pivotally coupled to said frame by fifth and sixth pivotal attachments, said fifth and sixth pivotal attachments being spaced apart and being pivotal about a third pivot axis.

17. The vehicle of claim 16 wherein said second support arm pivotally supports said first stub axle by seventh and eighth pivotal attachments, said seventh and eighth pivotal attachments being spaced apart and being pivotal about a fourth pivot axis.

18. The vehicle of claim 14 wherein said second pivot axis and said first rotational axis are substantially perpendicular.

19. The vehicle of claim 18 wherein said second pivot axis and said first pivot axis are substantially parallel.

20. The vehicle of claim 14 wherein said second pivot axis and said first pivot axis are substantially parallel.

21. A suspension system for a vehicle comprising: a first wheel; a second wheel; a first stub axle providing support to said first wheel about a first rotational axis; a second stub axle providing support to said second wheel about a second rotational axis, a frame including a substantially flat portion having a top surface, said first wheel being located on a first side of said frame, said second wheel being located on a second side opposing said first side of said frame, said portion being disposed generally beneath the first and second rotational axes; a first pivotal support arm pivotally supporting said first stub axle, said first pivotal support arm being pivotally coupled to said frame below the top surface; a second pivotal support arm pivotally supporting said first stub axle, said second pivotal support arm being pivotally coupled to said frame; and a first wheelhousing carried by said frame and located inboard and above said first wheel, said first wheelhousing including a dividing member located inboard of said first wheel, said dividing member having a lower, outboard section proximate to said first stub axle and proximate to said first pivotal support arm; wherein said first pivotal support arm includes a downwardly concave portion adapted and configured to provide clearance from the section of said dividing member during jounce of said first wheel.

22. The suspension system of claim 21 wherein the lower outboard section of said dividing member is below the first rotational axis.

23. The suspension system of claim 21 wherein said first pivotal arm support is below the first rotational axis.

24. The suspension system of claim 21 which further comprises a shock absorber and a first wheel support, said first wheel support supporting said first stub axle, said first wheel support being pivotally coupled to said first support arm and to said second support arm, said shock absorber being pivotally coupled to said wheelhousing, said shock absorber being pivotally coupled to said first wheel support.

25. An apparatus for suspending a stub axle of a vehicle, comprising: a wheel support having a vertical section including means for attachment of the stub axle, a first lateral section to one side of said vertical section and a second lateral section to the other side of said vertical section; said first lateral section including a first upper pivot attachment for pivotal coupling to the vehicle and a first lower pivot attachment for pivotal coupling to the vehicle, said first upper pivot attachment being spaced above said first lower pivot attachment and being spaced below the rotational axis of an attached stub axle; and said second lateral section including a second pivot attachment for pivotal coupling to the vehicle, said second pivot attachment being spaced below the rotational axis of an attached stub axle, said second pivot attachment being adapted and configured to establish a common pivot axis with one of said first upper pivot attachment or said first lower pivot attachment.

26. The apparatus of claim 25 wherein said second pivot attachment is a second upper pivot attachment, said second lateral section including a second lower pivot attachment for pivotal coupling to the vehicle, said second lower pivot attachment being spaced below said second upper pivot attachment, said second upper pivot attachment establishing a first common pivot axis with said first upper pivot attachment, said second lower pivot attachment establishing a second common pivot axis said first lower pivot attachment.

27. The apparatus of claim 26 wherein said first common pivot axis is generally parallel to said second common pivot axis.

28. The apparatus of claim 25 wherein said wheel support includes means for attaching a shock absorber.

* * * * *